US012117838B1

(12) United States Patent
Sigurdsson et al.

(10) Patent No.: US 12,117,838 B1
(45) Date of Patent: Oct. 15, 2024

(54) OBJECT TRACKING AND ENTITY RESOLUTION

(71) Applicant: Amazon Technologies, Inc., Seattle, WA (US)

(72) Inventors: Gunnar Atli Sigurdsson, Pittsburgh, PA (US); Robinson Piramuthu, Oakland, CA (US); Gokhan Tur, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 817 days.

(21) Appl. No.: 17/218,621

(22) Filed: Mar. 31, 2021

(51) Int. Cl.
| | |
|---|---|
| *G06T 7/70* | (2017.01) |
| *G05D 1/00* | (2006.01) |
| *G05D 1/02* | (2020.01) |
| *G06T 7/73* | (2017.01) |
| *G10L 13/08* | (2013.01) |
| *G10L 15/18* | (2013.01) |
| *G10L 15/22* | (2006.01) |

(52) U.S. Cl.
CPC ......... *G05D 1/0219* (2013.01); *G05D 1/0088* (2013.01); *G05D 1/0251* (2013.01); *G05D 1/0274* (2013.01); *G06T 7/73* (2017.01); *G10L 13/08* (2013.01); *G10L 15/1807* (2013.01); *G10L 15/22* (2013.01); *G10L 2015/223* (2013.01)

(58) Field of Classification Search
USPC ...... 381/110–122; 382/103–285; 704/1–275; 706/1–62, 900–903
See application file for complete search history.

(56) References Cited

U.S. PATENT DOCUMENTS

| | | | |
|---|---|---|---|
| 10,624,525 B2 * | 4/2020 | Hou | A61B 1/0016 |
| 11,407,118 B1 * | 8/2022 | Augenbraun | B25J 9/1612 |
| 11,460,849 B2 * | 10/2022 | Deyle | G05D 1/0219 |

(Continued)

OTHER PUBLICATIONS

Anderson, et al. "Vision-and-language navigation: Interpreting visually-grounded navigation instructions in real environments", Computer Vision and Pattern Recognition, 2018, pp. 3674-3683.

(Continued)

*Primary Examiner* — Marcellus J Augustin
(74) *Attorney, Agent, or Firm* — Pierce Atwood LLP

(57) ABSTRACT

Described herein is a system for tracking objects and performing dynamic entity resolution using image data. For example, the system may build an environment map and populate the map with objects present in the environment. As the devices move about the environment it may capture image data and, based on its position and/or configuration of its components, may determine updated locations of objects that move in the environment. Upon receiving a query from a user, based on the location of the objects relative to the device/user, the system can interpret gestures and voice commands to infer which object is specified by the voice command. To build the environment map, the system performs object detection to generate bounding boxes associated with an object, then clusters the bounding boxes into a three-dimensional (3D) object associated with 3D coordinates. As the system tracks the object using the 3D coordinates while maintaining two-dimensional (2D) information (e.g., bounding boxes and other features), the system can use existing 2D models to process objects in 3D.

21 Claims, 35 Drawing Sheets

(56) References Cited

U.S. PATENT DOCUMENTS

| | | | |
|---|---|---|---|
| 2015/0055821 A1* | 2/2015 | Fotland | G06V 10/255 382/103 |
| 2018/0225524 A1* | 8/2018 | Fujita | G06V 20/56 |
| 2019/0377345 A1* | 12/2019 | Bachrach | B64C 39/024 |
| 2021/0383806 A1* | 12/2021 | Kim | G06F 3/16 |
| 2022/0066456 A1* | 3/2022 | Ebrahimi Afrouzi | G06F 3/04883 |
| 2023/0418287 A1* | 12/2023 | Cristache | G06F 3/167 |

OTHER PUBLICATIONS

Blukis, et al. "Learning to map natural language instructions to physical quadcopter control using simulated flight", 3rd Conference on Robot Learning, 2019, pp. 1-24.

Chang, et al. "Matterport3D: Learning from RGB-D Data in Indoor Environments", International Conference on 3D Vision, 2017, pp. 1-25.

Chen, et al. "Learning to interpret natural language navigation instructions from observations", AAAI Conference on Artificial Intelligence, 2011, pp. 859-865.

Chen, et al. "History aware multimodal transformer for vision-and-language navigation", 35th Conference on Neural Information Processing Systems (NeurIPS), 2021, pp. 1-14.

Chen, et al. "Think global, act local: Dual-scale graph transformer for vision-and-language navigation", Computer Vision and Pattern Recognition (CVPR), 2022, pp. 16537-16547.

Chou, et al. "Visual Question Answering on 360° Images", Winter Conference on Applications of Computer Vision (WACV), 2020, pp. 1607-1616.

Cirik, "Understanding Language Referring to the Visual World", PhD thesis, Language Technologies Institute; School of Computer Science; Carnegie Mellon University, 2022.

Cirik, et al. "Refer360°: A referring expression recognition dataset in 360° images", Association for Computational Linguistics (ACL), 2020.

Fried, et al. "Speaker-follower models for vision-and-language navigation", 32nd Conference on Neural Information Processing Systems (NeurIPS), 2018, pp. 1-12.

Gu, et al. "Vision-and-language navigation: A survey of tasks, methods, and future directions", Association for Computational Linguistics (ACL), 2022.

Guhur, et al. "Airbert: In-domain pretraining for vision-and-language navigation", International Conference on Computer Vision (ICCV), 2021.

Hahn, et al. "Where are you? Localization from Embodied Dialog", Empirical Methods in Natural Language Processing (EMNLP), 2020.

He, et al. "Mask R-CNN", International Conference on Computer Vision (ICCV), 2017, pp. 2961-2969.

Hong, et al. "VLN BERT: A recurrent vision-and-language BERT for navigation", Computer Vision and Pattern Recognition (CVPR), 2021, pp. 1643-1653.

Kurenkov, et al. "Semantic and Geometric Modeling with Neural Message Passing in 3D Scene Graphs for Hierarchical Mechanical Search", arXiv preprint arXiv:2008.07792, 2020.

Li, et al. "REVE-CE: Remote Embodied Visual Referring Expression in Continuous Environment", Robotics Automation and Letters (RAL), 2022.

Lin, et al. "Scene-Intuitive Agent for Remote Embodied Visual Grounding", Computer Vision and Pattern Recognition (CVPR), 2021, pp. 7036-7045.

Lu, et al. "ViLBERT: Pretraining task-agnostic visiolinguistic representations for vision-and-language tasks", 33rd Conference Neural Information Processing Systems (NeurIPS), 2019, pp. 1-11.

Ma, et al. "Self-monitoring navigation agent via auxiliary progress estimation", International Conference on Learning Representations (ICLR), 2019, pp. 1-18.

MacMahon, et al. "Walk the talk: Connecting language, knowledge, and action in route instructions", AAAI Conference on Artificial Intelligence, 2006, pp. 1475-1482.

Majumdar, Arjun, et al. "Improving vision-and-language navigation with image-text pairs from the web." Computer Vision—ECCV 2020: 16th European Conference, Glasgow, UK, Aug. 23-28, 2020, Proceedings, Part VI 16. Springer International Publishing, 2020.

Qi, Yuankai, et al. "Reverie: Remote embodied visual referring expression in real indoor environments." Proceedings of the IEEE/CVF Conference on Computer Vision and Pattern Recognition. 2020.

Sharma, Piyush, et al. "Conceptual captions: A cleaned, hypernymed, image alt-text dataset for automatic image captioning." Proceedings of the 56th Annual Meeting of the Association for Computational Linguistics (vol. 1: Long Papers). 2018.

Tan, Hao, et al. "Learning to navigate unseen environments: Back translation with environmental dropout." arXiv preprint arXiv:1904.04195 (2019).

Thomason, Jesse, et al. "Vision-and-dialog navigation." Conference on Robot Learning. PMLR, 2020.

Wang, Hanqing, et al. "Structured scene memory for vision-language navigation." Proceedings of the IEEE/CVF conference on Computer Vision and Pattern Recognition. 2021.

Wang, Hanqing, et al. "Active visual information gathering for vision-language navigation." Computer Vision—ECCV 2020: 16th European Conference, Glasgow, UK, Aug. 23-28, 2020, Proceedings, Part XXII 16. Springer International Publishing, 2020.

Xin Wang, et al. Reinforced Cross-Modal Matching and Self-Supervised Imitation Learning for Vision-Language Navigation. CVPR 2019.

Yamauchi, Brian. "A frontier-based approach for autonomous exploration." Proceedings 1997 IEEE International Symposium on Computational Intelligence in Robotics and Automation CIRA'97. 'Towards New Computational Principles for Robotics and Automation' (1997): 146-151.

Zhu, Fengda, et al. "SOON: Scenario Oriented Object Navigation with Graph-based Exploration," 2021 IEEE/CVF Conference on Computer Vision and Pattern Recognition (CVPR), Nashville, TN, USA, 2021, pp. 12684-12694.

* cited by examiner

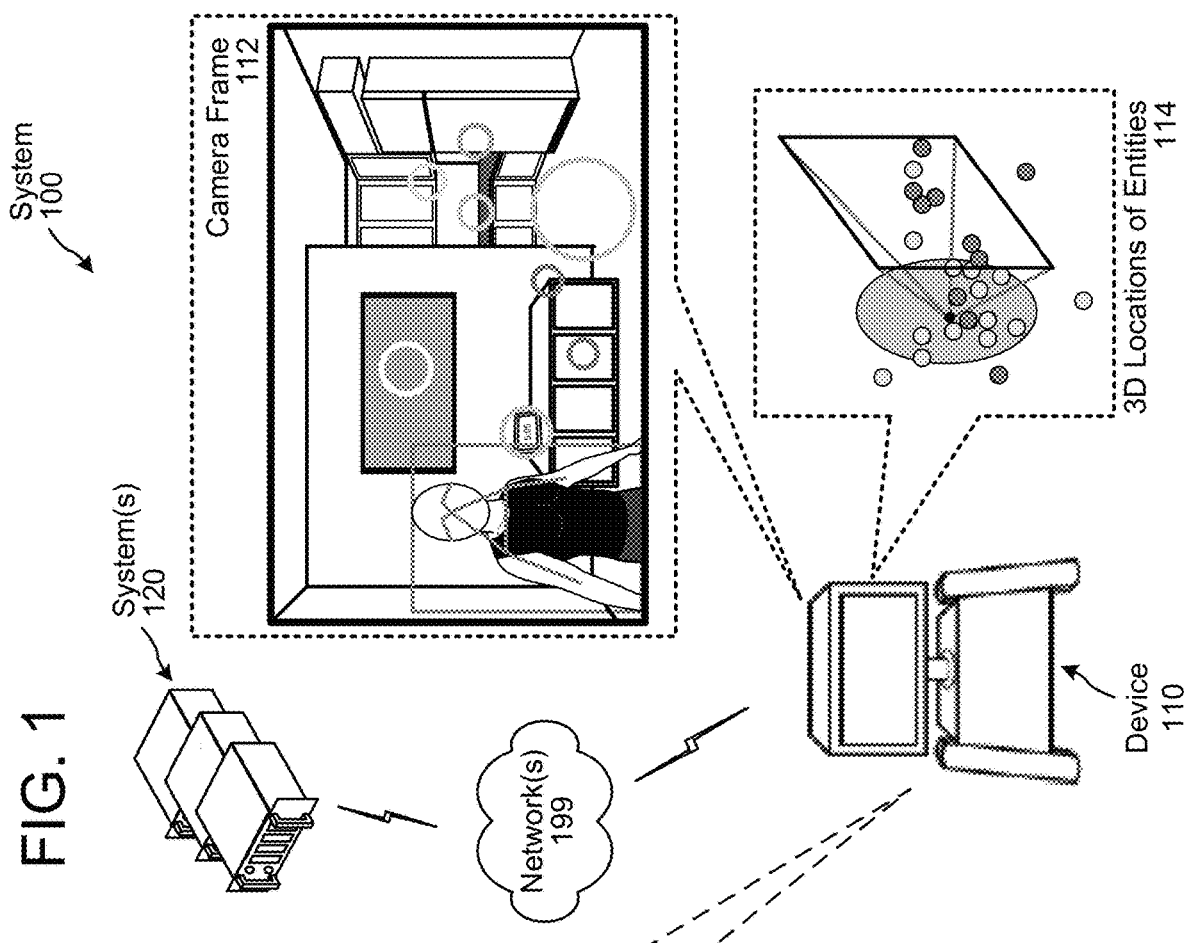
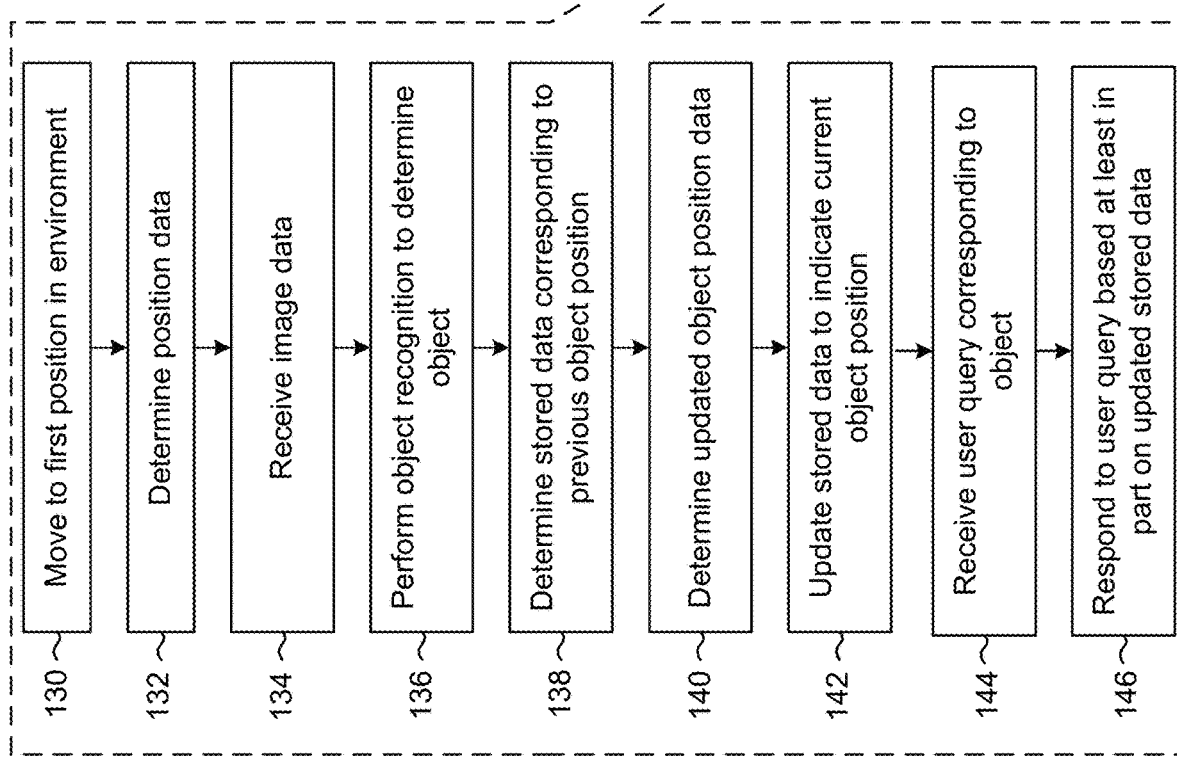
FIG. 1

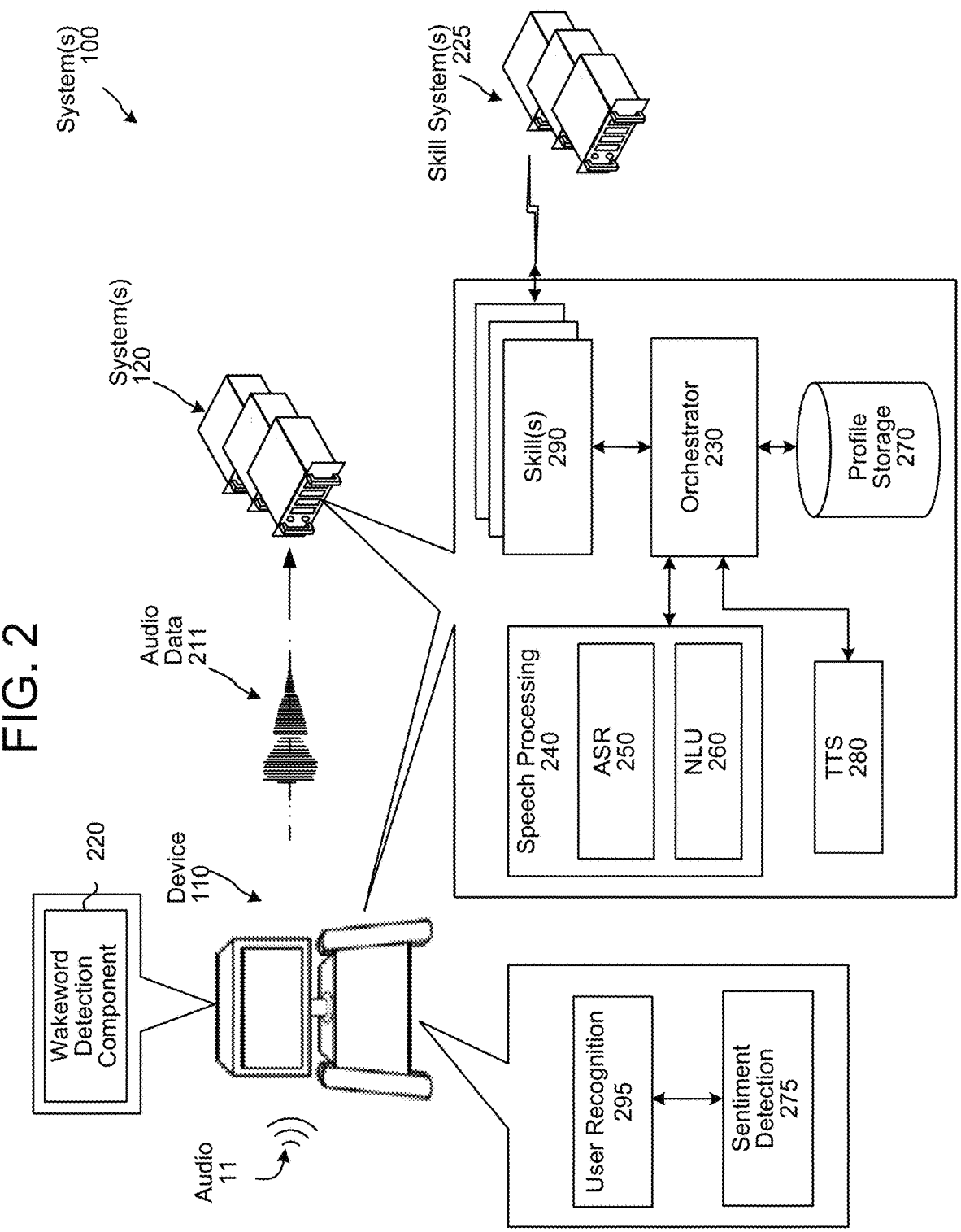

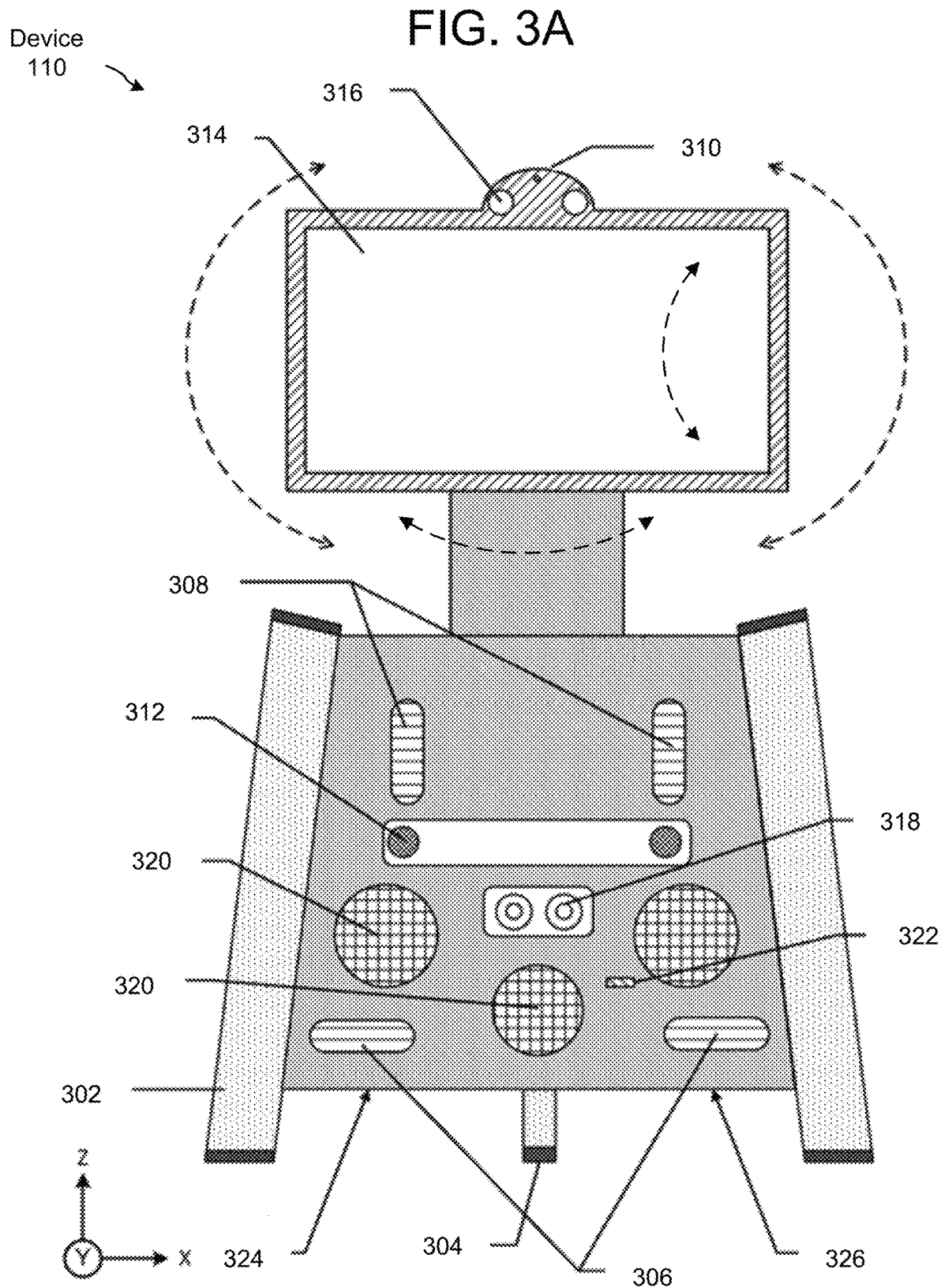

FIG. 4
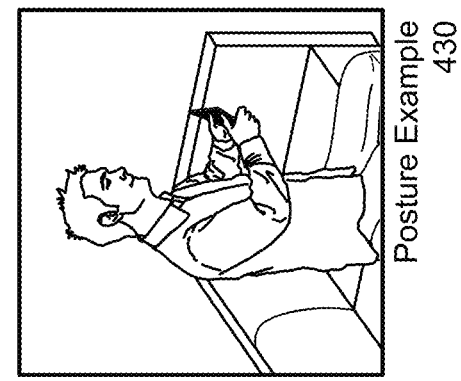
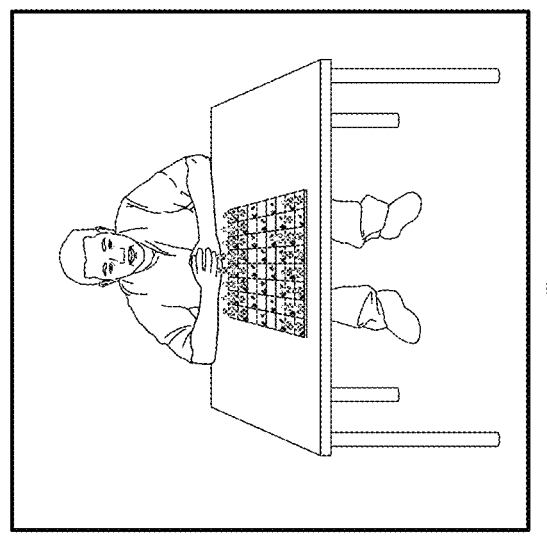
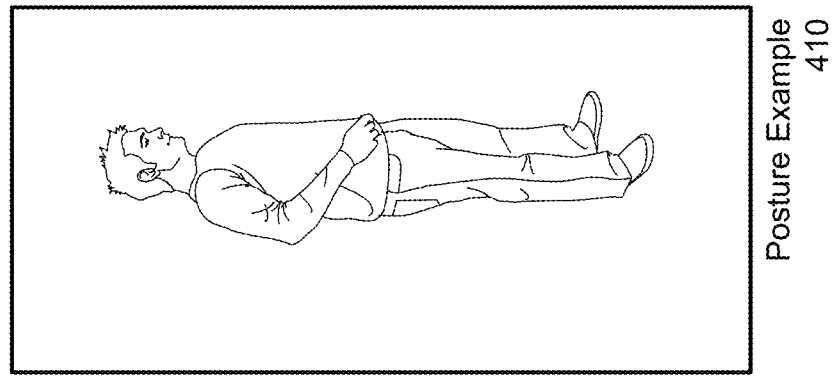

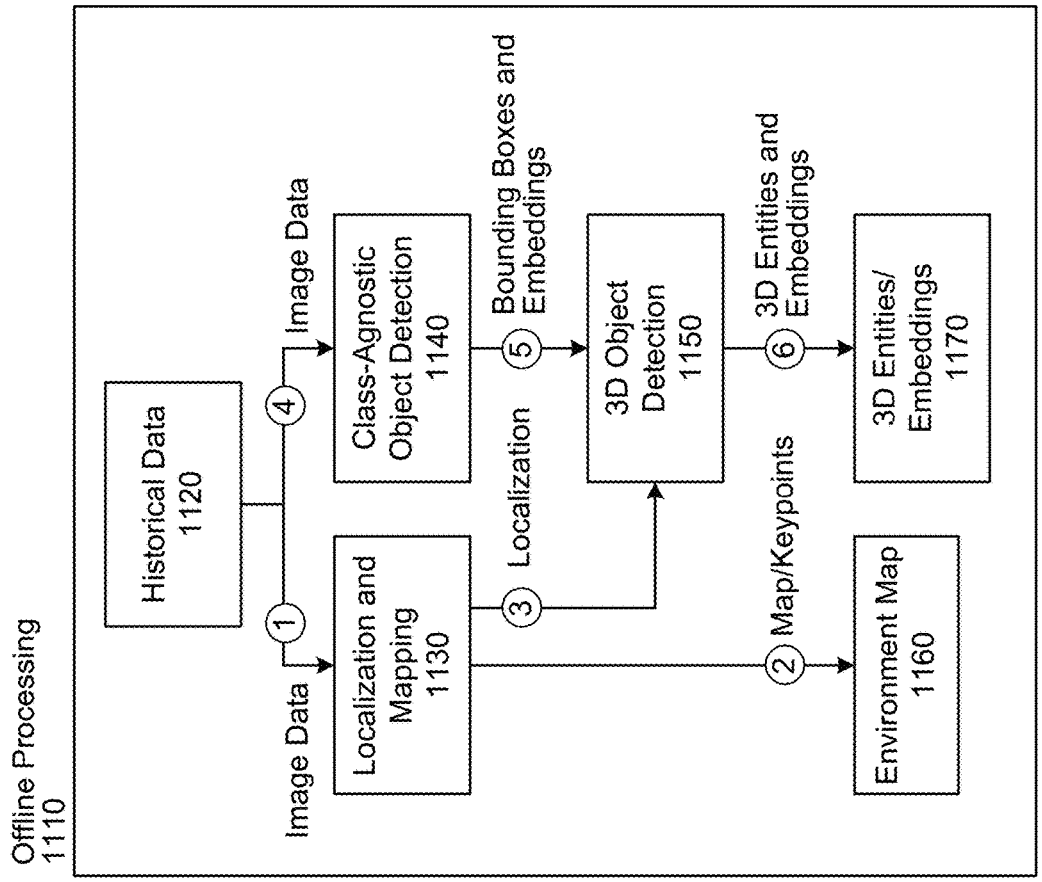

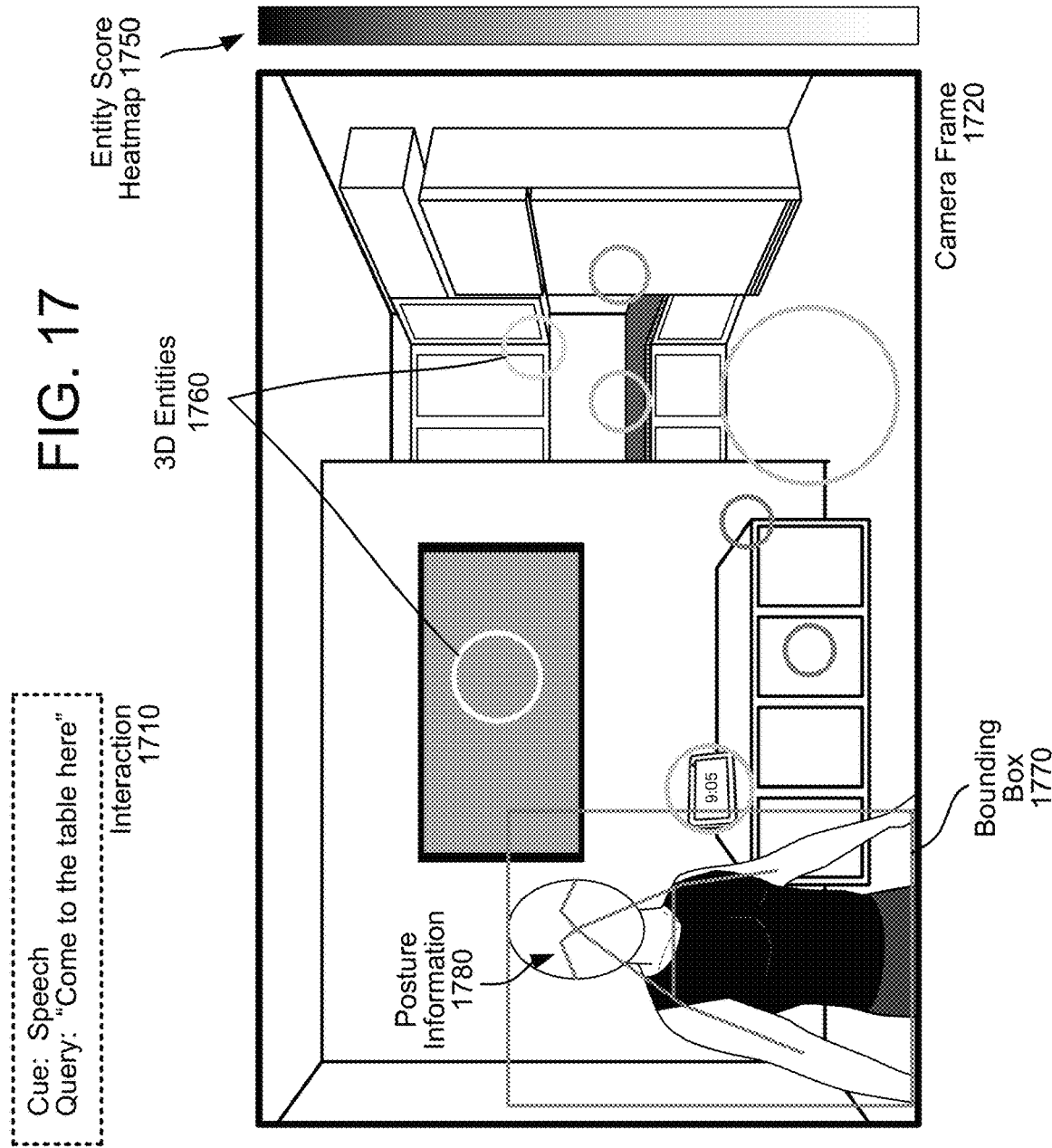
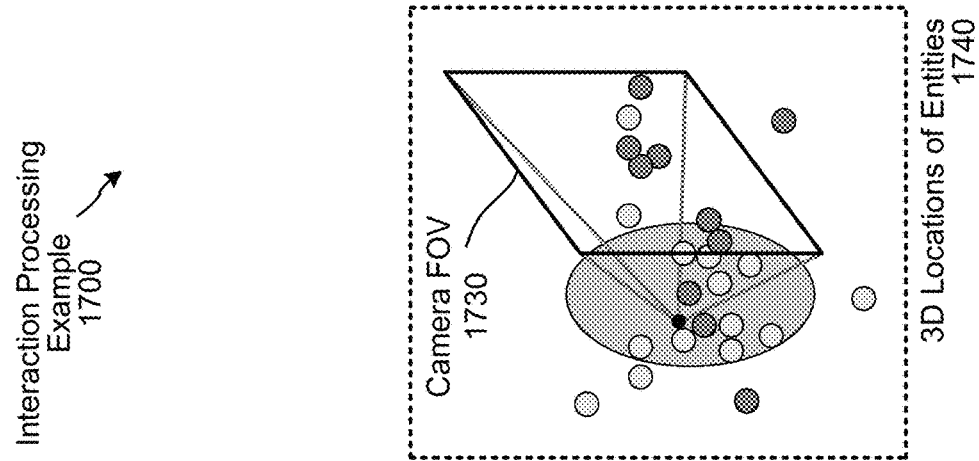
FIG. 17

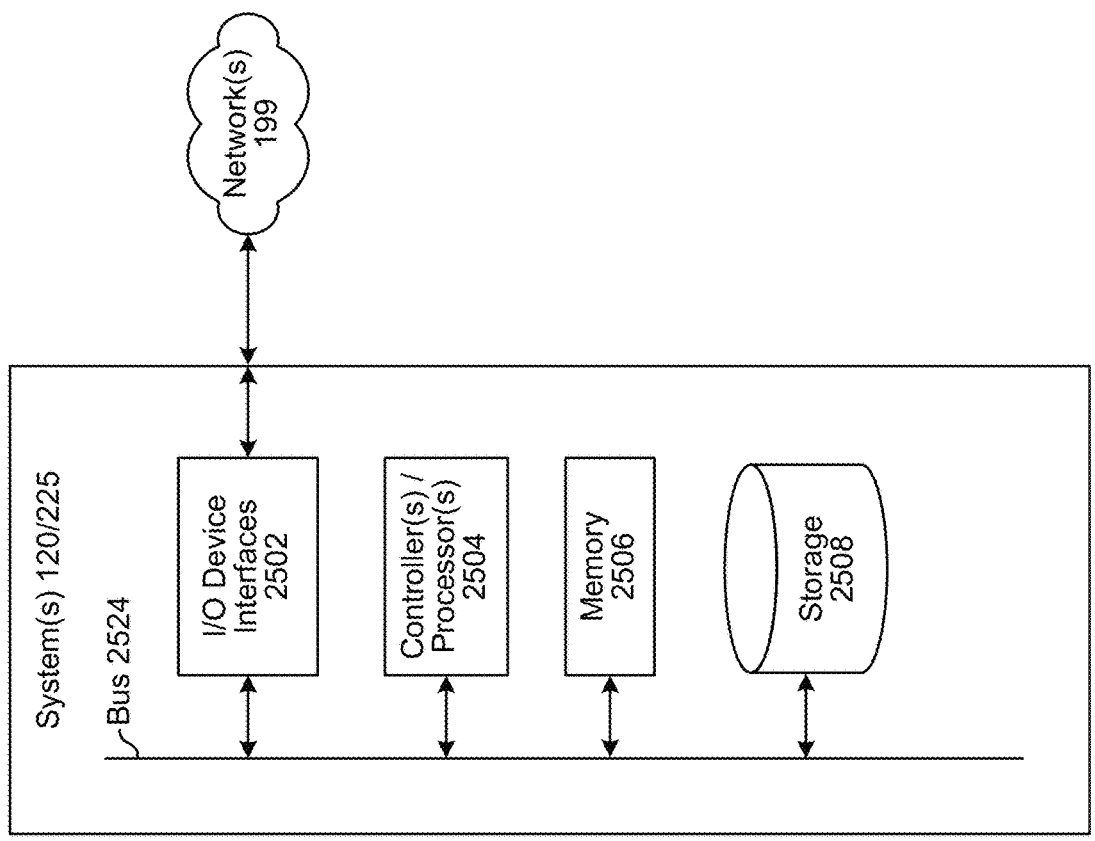

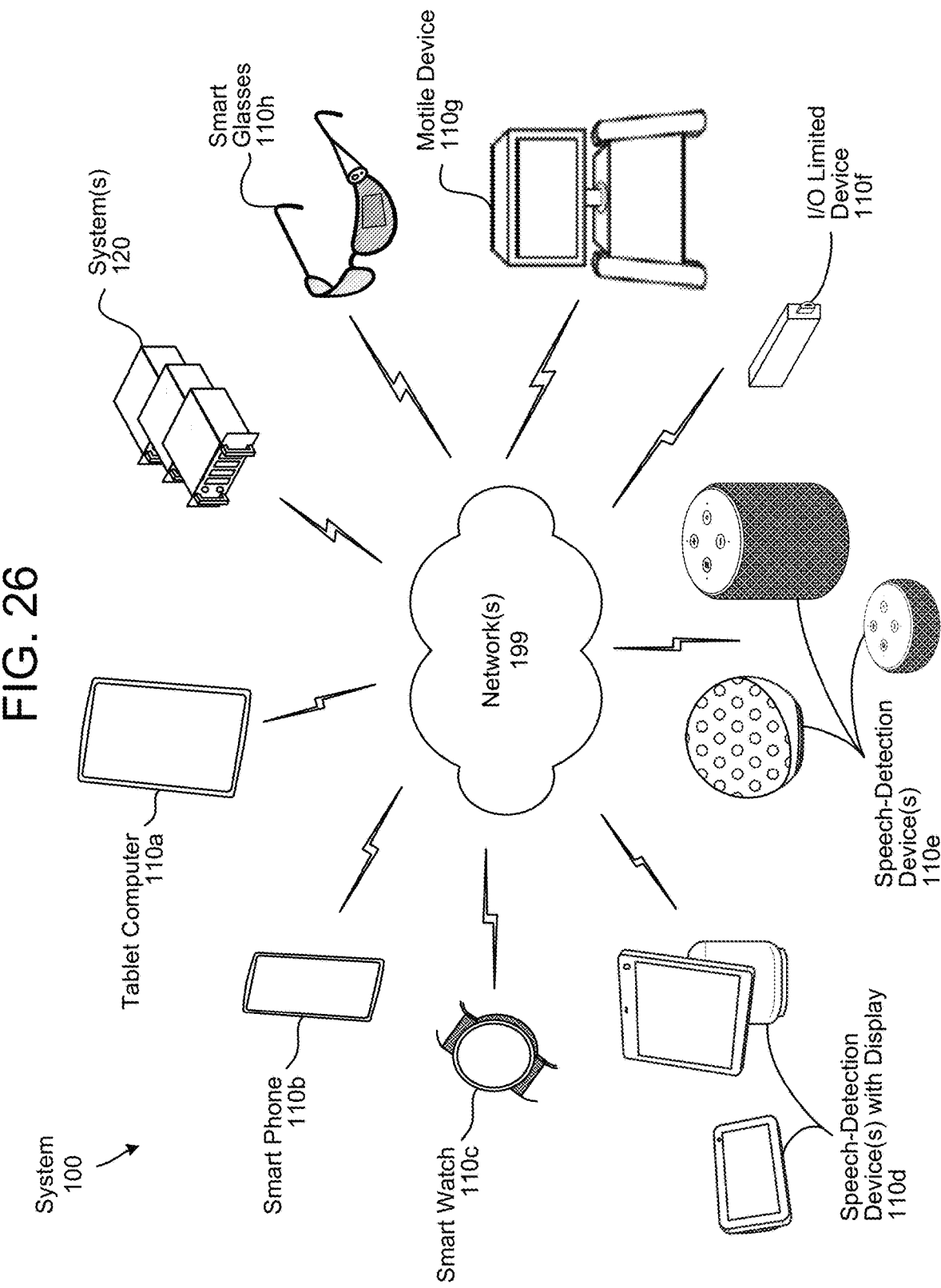

OBJECT TRACKING AND ENTITY RESOLUTION

BACKGROUND

Speech recognition systems have progressed to the point where humans can interact with computing devices using their voices. Such systems employ techniques to identify the words spoken by a human user based on the various qualities of a received audio input. The audio input may also indicate an emotion or sentiment of the user when speaking the words.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to update object location information and perform dynamic entity resolution processing according to embodiments of the present disclosure.

FIG. 2 is a conceptual diagram of speech processing components of a system according to embodiments of the present disclosure.

FIGS. 3A, 3B, and 3C illustrate views of an autonomously motile device according to embodiments of the present disclosure.

FIG. 4 illustrates examples of the autonomous motile device determining posture data according to embodiments of the present disclosure.

FIG. 11 is a system flow diagram illustrating offline environment processing to generate an environment map and three-dimensional (3D) entities according to embodiments of the present disclosure.

FIG. 17 illustrates an interaction processing example involving input speech and posture information according to embodiments of the present disclosure.

FIG. 25 is a block diagram conceptually illustrating example components of a server according to embodiments of the present disclosure.

FIG. 26 illustrates an example of a computer network for use with the overall system according to embodiments of the present disclosure.

DETAILED DESCRIPTION

Figure 3B:
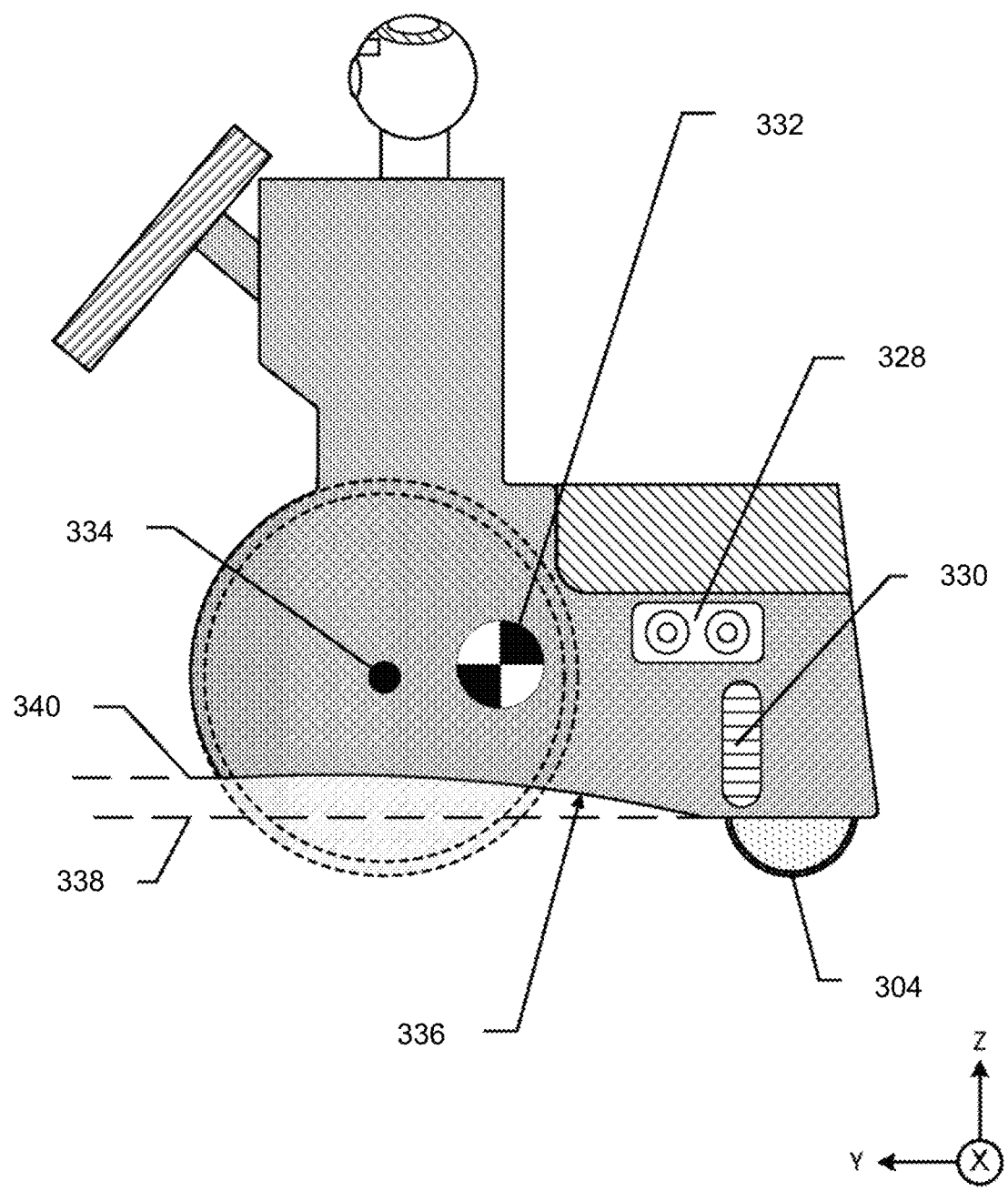

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

Certain systems may be configured to perform actions responsive to user inputs. For example, for the user input of "Alexa, play Mozart music," a system may output music composed by an artist named Mozart. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

To improve a user experience, devices, systems and methods are disclosed that perform dynamic entity resolution using image data. An entity may be a physical object, location, person, or other object (in the grammatical sense) that a user may refer to during a spoken command and which the system should be able to interpret in order to perform the user's desired command. In order to identify potential entities in an environment (e.g., identify objects a user may refer to either by name or by pointing or looking at it), the system may build an environment map and populate the map with objects present in the environment. Based on the location of the objects relative to the device/user, the system can interpret gestures and voice commands to infer which object is specified by the voice command. To build the environment map, the system performs object detection to generate bounding boxes associated with an object's representation in an image, then clusters the bounding boxes into a three-dimensional (3D) object associated with 3D coordinates. Thus, as the system tracks the object using the 3D coordinates while maintaining two-dimensional (2D) information (e.g., bounding boxes and other features associated with the object), the system can use existing 2D models to determine an estimated 3D representation of the object allowing the system to recognize and process objects in 3D (e.g., being able to determine different 2D representations of a same object from different angles, distances, etc. all belong to the same 3D object). The environment map and the 3D objects enable the system to interpret voice commands and identify an object when the user gestures to the object and/or move to a location associated with the object. For example, in response to a first voice command (e.g., "Come to the table here"), the device may use the environment map, data describing the 3D objects in the environment, and/or image data to determine that the user is gesturing to a first object (e.g., table), determine a first location associated with the first object, and then navigate to the first location from a current location. To illustrate another example, in response to a second voice command (e.g., "Where are my keys"), the device may determine that the voice command is referring to a second entity (e.g., car keys), determine a second location associated with the second entity (e.g., last known location of the car keys), and generate a response indicating the second location.

In order to properly interpret a user's command/query, and to be able to provide detailed information about entities, the system may regularly update its stored information about entities in an environment which may, for example, track objects as they are moved about the environment (for example when a user moves an object from one room to another). The system may use a device's position information (such as when it moves from one position to another), image data, environment map data, etc. to track a position of an object in an environment and, if applicable, identify which users may have interacted with an object and at what times so the system can assist a user to locate an object at different times. In order to perform these operations the system may track the devices position and pose information so the system can properly process incoming image data (e.g., know where the device is and in what direction/angle its camera is pointing). The system may also update its own data systems as the device navigates an environment and detects objects (or other entities) in the environment.

FIG. 1 illustrates a system configured to update object information perform dynamic entity resolution processing using image data according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110 local to a user, and one or more system(s) 120 connected across one or more network(s) 199. In some examples, the system(s) 120 may be associated with a first location that is remote from a second location associated with the device 110. Thus, the device 110 may communicate with the system(s) 120 using a plurality of different networks. However, the disclosure is not limited thereto and in some examples, the system(s) 120 may be associated with the second location in proximity to the device 110 without departing from the disclosure. For example, the system(s) 120 may correspond to a home server and the device 110 may communicate with the system(s) 120 using a single local area network (LAN) or wireless local area network (WLAN). The operations are generally described herein as being performed by the device 110. However, it should be understood that one or more of the operations may also be performed by the system(s) 120.

As illustrated in FIG. 1, the device 110 may be associated with a user/user profile and may communicate with system(s) 120 using one or more network(s) 199. The user may interact with the device 110, such as requesting that the device 110 and/or the system(s) 120 perform an action. Additionally or alternatively, the device 110 may interact with the user, such as following the user and/or moving sensors relative to the user to improve input data generated by the sensors.

In some examples, the device 110 may be a speech-enabled device and may detect audio 11 spoken by the user. The device 110 may determine that the audio 11 includes a wakeword and may then send audio data corresponding to the audio 11 to the system(s) 120. The system(s) 120 may receive the audio data from the device 110 and process the audio data, for example using speech processing such as automatic speech recognition (ASR) processing, natural language understanding (NLU) processing, and/or the like, to determine that the audio data represents a request to perform an action. The system(s) 120 may perform the action and/or send a command to another device (not illustrated) to perform the action. Additionally or alternatively, the user may provide input data other than audio data without departing from the disclosure. Although FIG. 1 illustrates a single example of a device 110, many other devices may be used without departing from the disclosure, such as a smartphone, television, computer, appliance, or other device depending on system configuration.

In some examples, the device 110 may be motile (e.g., capable of motion) and may be referred to as a motile device, autonomously motile device, etc., although the disclosure is not limited thereto. Thus, a motile device 110 may perform additional actions by moving towards the user, relative to the user, and/or the like without departing from the disclosure. For example, the device 110 may be at a first location and may move to a location of the user to perform the action for the user. In another example, the device 110 may be capable of limited motion (e.g., rotation about a fixed point, movement of a component of the device rather than the entire device itself, etc.) rather than full motion throughout an environment. The device 110 may also be capable of being moved by a user such as in the case of a smart phone 110*b* and/or be capable of being worn and moved by a user such as in the case of smart glasses 110*h* (both shown in FIG. 26).

As illustrated in FIG. 1, the device 110 may be a motile device (e.g., autonomously motile device) capable of moving within the environment independently of the user without departing from the disclosure. In some examples, the device 110 may determine a location of the device 110 and/or the user using sensor data (e.g., location sensor data, such as Global Positioning System (GPS) data), wireless signals (e.g., (Ultra)-Sound signals, Bluetooth, etc.), wireless network data (e.g., wireless communication networks in range, such as WiFi, Long Term Evolution (LTE) network, WiMAX network, 3G network, 4G network, 5G network, etc.), audio processing (e.g., beamforming relative to other devices), image processing (e.g., object recognition and/or the like), and/or a combination thereof without departing from the disclosure.

Additionally or alternatively, the device 110 may determine a location of the user relative to the device 110 by remotely sensing (e.g., directly observing) the user using various techniques known to one of skill in the art, including sound localization (e.g., audio beamforming), audio processing (e.g., speech recognition), image processing (e.g., facial recognition, object recognition, and/or the like), sensor data (e.g., sensors configured to detect human presence, measure distance(s), and/or the like), and/or the like without departing from the disclosure. While in some examples the system 100 may track a location of the user using tracking data associated with a mobile device (e.g., smartphone and/or wearable device associated with the user), the tracking data is not an example of remotely sensing the user and is not considered observation data. In other examples the device 110 may associate its own location as a location of a user, particularly if the device 110 is configured to be worn by a user.

As shown in FIG. 1, the device 110 may move (130) to a first position in an environment. For example, the device 110 may move from a previous location to the first position. The device 110 may determine (132) position and/or pose data corresponding to the first position. For example, the position data may indicate a current position of the device 110 relative to the environment/user, whereas the pose data may indicate a current position of one or more sensors (e.g., the camera(s)), appendages, mechanical components, etc. relative to the device 110 and/or the user. The device 110 may use environment map data (as explained below) to determine the device's position within the environment, which may be represented by the position data.

The position data may indicate the current position of the device 110 using multiple techniques known to one of skill in the art. In some examples, the position data may indicate a relative position of the device 110 with respect to the user. For example, the position data may indicate a direction of the user relative to a fixed origin of the device 110 (e.g., front of the device 110) as well as a distance from the device 110 to the user. However, the disclosure is not limited thereto, and in other examples the position data may indicate a location of the device 110. For example, the position data may include coordinates of the device 110 within an environment (e.g., coordinates within an individual room, coordinates within a building, etc.), may include absolute coordinates (e.g., GPS coordinates, local coordinates, etc.), and/ or the like. Thus, the device 110 may generate position data identifying the position of the device 110 relative to the user, a location of the device 110 in the environment, an exact location of the device 110, and/or the like without departing from the disclosure.

The position data may also include information about the pose of the device 110. As explained herein, the pose may include the configuration of various device components (e.g., camera angle, mast height, etc.) which may provide further information about how the device is situated in its environment. In some examples, the pose data may indicate the current position of a sensor relative to a fixed origin or point of reference on the device 110, such as the wheels, chassis, a point on top of the device 110, and/or the like. For example, the pose data may indicate coordinates of the sensor relative to a fixed position on the device 110 (e.g., center point between the two front wheels) using a three dimensional coordinate system. In other examples, the pose data may indicate the current position of the sensor relative to the device 110 using other techniques known to one of skill in the art, such as a height of the sensor, a length of extension associated with the sensor, and/or the like. For example, the camera may extend from a first position (e.g., retracted) to a second position (e.g., extended) and the pose data may indicate an amount of extension ranging from the first position to the second position. Similarly, the camera may rotate from a first position (e.g., first azimuth, such as 90 degrees to the left) to a second position (e.g., second azimuth, such as 90 degrees to the right). In some examples, the camera may rotate in 360 degrees, and the pose data may indicate a current azimuth associated with the camera without departing from the disclosure. The current azimuth may be determined relative to the fixed position on the device 110 (e.g., center point between the two front wheels), as described above, although the disclosure is not limited thereto. Additionally or alternatively, the pose data may indicate the current position of the sensor relative to the user. For example, the pose data may indicate a current perspective of the user, a distance to the user, and/or the like without departing from the disclosure.

The device 110 may also receive (134) first input image data representing a portion of the user and/or an environment of the device 110. For example, the device 110 may capture the first input image data using one or more cameras and the first input image data may include a representation of the environment and the objects therein (which may include the user, although the disclosure is not limited thereto). The image data may be associated with the position data, thus indicating where the device was (and potentially what direction it was pointing, what angle the camera was at, etc.) when the image data was captured.

The device 110 may perform (136) object recognition processing to determine an object represented in the image data. For example, the device may perform object detection, e.g., determining an object is represented in the image data (for example, "that image shows something") and then perform object recognition, e.g., determining which particular object is actually represented, such associating the detected object with an object identifier, name, etc. corresponding with a known object (for example, "that object is the user's stapler"). Object detection/recognition may be performed as detailed below as well as using other techniques known in the art. For example, the device 110 may recognize the object because the angled two-dimensional representation of the object in the image as taken by the device matches object data known to the system to correspond to the particular three-dimensional object.

The device may then use information about the recognized object (e.g., an object identifier to determine (138)

stored data corresponding to a previous position of the object. For example, using object data (such as object data 1170 described in detail below) the system/device may determine location data corresponding to the object at a previous time. This stored data may indicate that at the previous time the object was in a different location. The device may determine updated object position data indicating a current position of the object. The device may do so using its position data, the image data, etc. For example, if the device knows that it is in Room A and its camera is pointed toward Room B at a certain angle, given the representation of the object in the image data and the information available to the device about the environment the system may determine that the object is in Room A on the floor, in Room B on a table, or the like.

The device may then update (142) the stored information to indicate the current position of the object. Put another way, the device may store second position data corresponding to the object, where the second position data corresponds to the position of the object as the device was able to determine using the first image data. This second position data may also be associated with time data corresponding to the capture of the image represented in the first image data.

Figure 12A:
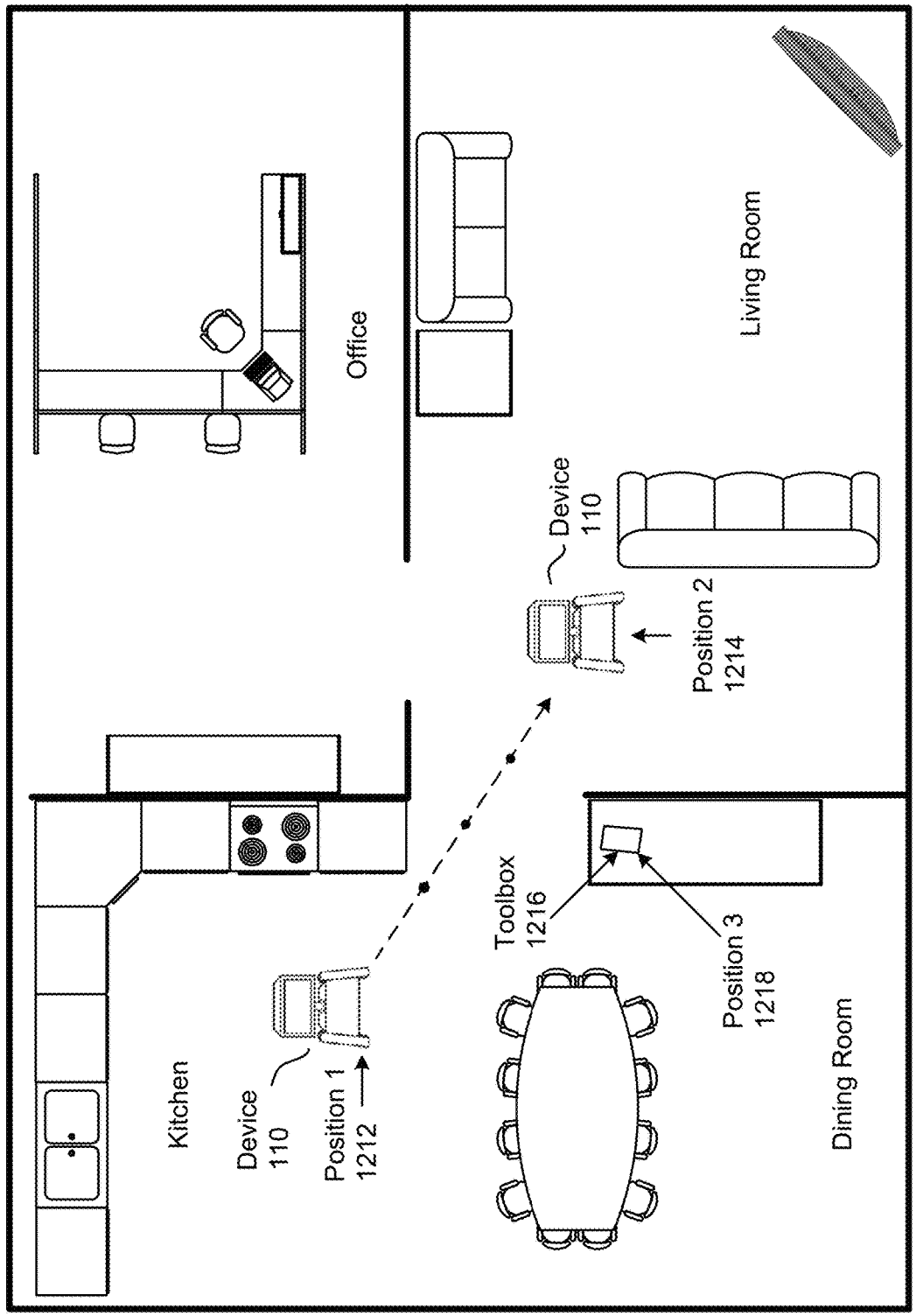
FIGS. 12A-12B illustrate a system updating object information as the object moves about an environment according to embodiments of the present disclosure.
Figure 12B:
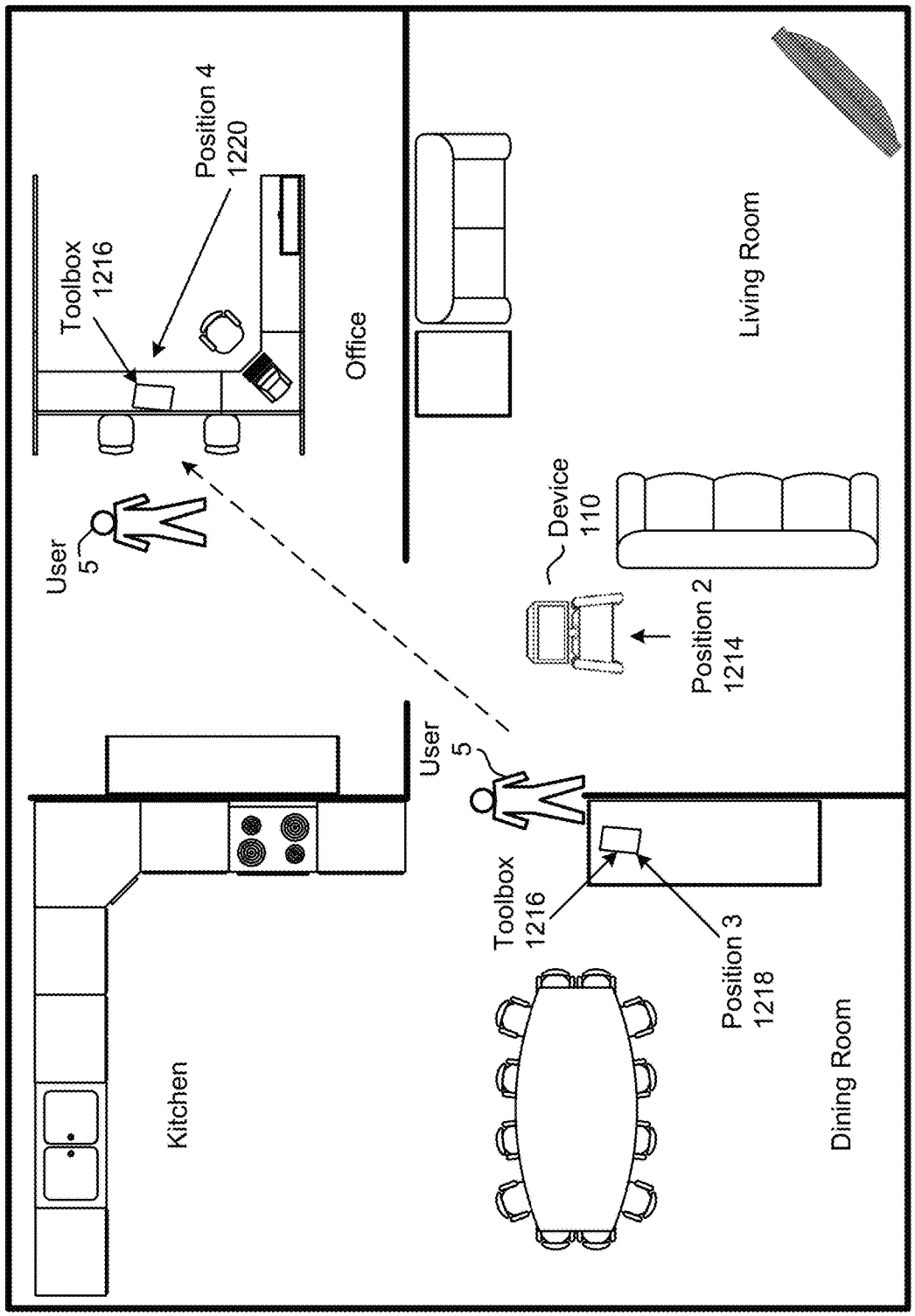

At some point later the device may receive (144) a user query corresponding to the object. For example, the device 110 may capture first input audio data using a microphone and perform speech processing to determine the first input audio data comprises a query or command related to the object. The device 110 may then respond (146) to the user query based at least in part on the updated stored data. Further details and examples of how these operations are performed are explained herein, such as in FIGS. 12A-12B illustrating updating information regarding an object as it moves from one location to another.

As also described in greater detail below, for example with regard to FIG. 13, the device 110 may improve dynamic entity resolution using the input image data. For example, the system 100 may build an environment map and populate the map with objects present in the environment. Based on the location of the objects relative to the device 110 and/or the user, the system 100 can interpret gestures and voice commands to infer which object is specified by the voice command. To build the environment map, the system 100 performs object detection to generate bounding boxes associated with an object, then clusters the bounding boxes into a three-dimensional object associated with 3D coordinates (e.g., 3D entity data). As the system 100 tracks the object using the 3D coordinates while maintaining two-dimensional information (e.g., bounding boxes and other features), the system 100 can use existing 2D models to process objects in 3D.

The overall system of the present disclosure may operate using various components as illustrated below. The various components may be located on same or different physical devices. Communication between various components may occur directly or across a network(s) 199.

As shown in FIG. 2, an audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa." While not illustrated in FIG. 2, in some examples the device 110 may detect wake gestures (e.g., hand motion, wave, etc.) using image data without departing from the disclosure.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120. In some embodiments, the device 110 may begin transmitting audio data 211 to system(s) 120 (or otherwise performing further processing on audio data) in response to an event occurring or an event being detected by the device 110.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 may perform speech processing to generate speech processing output data, which may be referred to as lexical data. In some examples, the lexical data may correspond to text data that includes text representing speech contained in the input audio data 211. However, the disclosure is not limited thereto and the lexical data may also correspond to token data that includes tokens that represent sounds, words, phrases, and/or the like corresponding to the speech. Thus, the lexical data may correspond to text data, token data, and/or other data known to one of skill in the art without departing from the disclosure. For ease of illustration, the disclosure may refer to the lexical data (e.g., speech processing output data) as text data, although the disclosure is not limited thereto.

To illustrate an example, the ASR component 250 may transcribe the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (e.g., lexical data, text data, etc.) and attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Mozart music," the NLU component 260 may determine an intent that the system(s) 120 output music and may identify "Mozart" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

The functionality described herein as a skill or skill component may be referred to using many different terms, such as an action, bot, app, application, speechlet or the like. A skill 290 may include hardware, software, firmware, or the like that may be dedicated to the particular skill 290 or shared among different skills 290. A skill 290 may be part of the system(s) 120 (as illustrated in FIG. 2) or may be located at whole (or in part) with one or more separate systems. Unless expressly stated otherwise, reference to a skill, skill device, or skill component may include a skill component operating within the system(s) 120 (for example as skill 290) and/or skill component operating within a system separate from the system(s) 120.

A skill 290 may be configured to perform one or more actions. A skill 290 may be enabled to execute specific functionality in order to provide data or produce some other output requested by a user. A particular skill component may be configured to execute more than one skill. For example, a weather skill may involve a weather skill component providing weather information to the system(s) 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, gaming skills, as well as custom skills that are not associated with any pre-configured type of skill.

In addition or alternatively to being implemented by the system(s) 120, a skill 290 may be implemented by a skill system(s) 225. Such may enable a skill system(s) 225 to execute specific functionality in order to provide data or perform some other action requested by a user.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110, the system(s) 120, and/or the skill system 225 may include profile storage 270 without departing from the disclosure. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may also include a sentiment detection component 275 that may be configured to detect a sentiment of a user from audio data representing speech/utterances from the user, image data representing an image of the user, and/or the like. The sentiment detection component 275 may be a separate component, as illustrated in FIG. 2, although the disclosure is not limited thereto and the sentiment detection component 275 may be included in other components without departing from the disclosure. The sentiment detection component 275 and other components are generally described as being operated by the device 110, as illustrated in FIG. 2. However, the system(s) 120 may also operate one or more of the components, including the sentiment detection component 275, without departing from the disclosure.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 6:
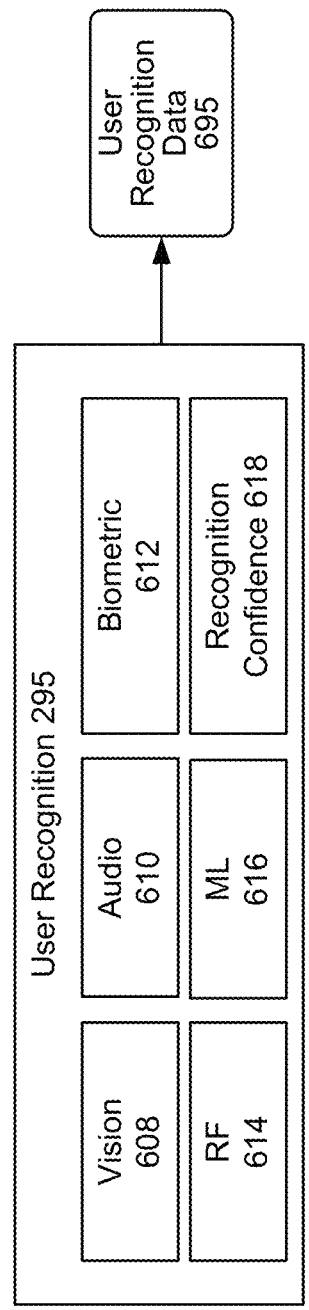
FIG. 6 is a schematic diagram of an illustrative architecture in which sensor data is combined to recognize one or more users according to embodiments of the present disclosure.

The device 110 may include a user recognition component 295 that recognizes one or more users using a variety of data, as described in greater detail below with regard to FIGS. 6-7. However, the disclosure is not limited thereto, and the system(s) 120 may include a user recognition component 295 instead of and/or in addition to the device 110 without departing from the disclosure.

While FIG. 2 illustrates the system(s) 120 including a speech processing component 240, the disclosure is not limited thereto and in some examples the device 110 may include a speech processing component 240 without departing from the disclosure. For example, the device 110 may perform basic speech processing locally, while the system(s) 120 may perform full speech processing remotely. However, the disclosure is not limited thereto and the device 110 may perform full speech processing locally without departing from the disclosure. As described above, the system(s) 120 may be located at a first location associated with the device 110 and/or a second location that is not associated with the device 110 without departing from the disclosure. For example, the system(s) 120 may be a home server or other device connected to the device 110 via a local area network (LAN) without departing from the disclosure. Thus, performing speech processing remotely refers to any speech processing that is not performed by the device 110, even if the speech processing is performed by a device/server in close proximity to the device 110.

Additionally or alternatively, one of skill in the art would understand that the speech processing component 240 may include a spoken language understanding (SLU) component, in addition to and/or instead of the ASR component 250 and/or the NLU component 260, without departing from the disclosure.

FIG. 3A illustrates a front view of the autonomously motile device 110 according to various embodiments of the present disclosure. The device 110 includes wheels 302 that are disposed on left and right sides of the device 110. The wheels 302 may be canted inwards toward an upper structure of the device 110. In other embodiments, however, the wheels 302 may be mounted vertically (e.g., not canted). A caster 304 (e.g., a smaller wheel) may disposed along a midline of the device 110. The front section of the device 110 may include a variety of external sensors. A first set of optical sensors 306, for example, may be disposed along the lower portion of the front of the device 110, and a second set of optical sensors 308 may be disposed along an upper portion of the front of the device 110. A microphone array 310 may be disposed on a top surface of the device 110; the microphone array 310 may, however, be disposed on any surface of the device 110.

One or more cameras 312 may be mounted to the front of the device 110; two cameras 312a/312b, for example, may be used to provide for stereo vision. The distance between the two cameras 312 may be, for example, 5-15 centimeters; in some embodiments, the distance is 10 centimeters. In some embodiments, the cameras 312 may exhibit a relatively wide horizontal field-of-view. For example, the horizontal field-of-view may be between 90° and 110°. A relatively wide field-of-view may provide for easier detection of moving objects, such as users or pets, which may be in the path of the device 110. Also, the relatively wide field-of-view may provide for the device 110 to more easily detect objects when rotating or turning.

The cameras 312, which may be used for navigation, may be of different resolution from, or sensitive to different wavelengths than, other cameras used for other purposes, such as video communication. For example, the navigation cameras 312 may be sensitive to infrared light allowing the device 110 to operate in darkness or semi-darkness, while a camera 316 mounted above a display 314 may be sensitive to visible light and may be used to generate images suitable for viewing by a person. A navigation camera 312 may have a resolution of at least 300 kilopixels each, while the camera 316 mounted above the display 314 may have a resolution of at least 10 megapixels. In other implementations, navigation may utilize a single camera.

The cameras 312 may operate to provide stereo images of the environment, the user, or other objects. For example, an image from the camera 316 disposed above the display 314 may be accessed and used to generate stereo-image data corresponding to a face of a user. This stereo-image data may then be used for facial recognition, posture recognition, user identification, gesture recognition, gaze tracking, and other uses. In some implementations, a single camera 316 may be disposed above the display 314.

The display 314 may be mounted on a movable mount. The movable mount may allow the display to move along one or more degrees of freedom. For example, the display 314 may tilt, pan, change elevation, and/or rotate. In some embodiments, the display 314 may be approximately 20 centimeters as measured diagonally from one corner to another. An ultrasonic sensor 318 may be mounted on the front of the device 110 and may be used to provide sensor data that is indicative of objects in front of the device 110.

One or more loudspeakers 320 may be mounted on the device 110, and the loudspeakers 320 may have different audio properties. For example, low-range, mid-range, and/or high-range loudspeakers 320 may be mounted on the front of the device 110. The loudspeakers 320 may be used to provide audible output such as alerts, music, human speech such as during a communication session with another user, and so forth.

Other output devices 322, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 324, 326 may be disposed on the underside of the device 110. The floor optical-motion sensors 324, 326 may provide indication indicative of motion of the device 110 relative to the floor or other surface underneath the device 110. In some embodiments, the floor optical-motion sensors 324, 326 comprise a light source, such as light-emitting diode (LED) and/or an array of photodiodes. In some implementations, the floor optical-motion sensors 324, 326 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 324, 326 may provide other information, such as data indicative of a pattern present on the floor, composition of the floor, color of the floor, and so forth. For example, the floor optical-motion sensors 324, 326 may utilize an optoelectronic sensor that may detect different colors or shades of gray, and this data may be used to generate floor characterization data.

FIG. 3B illustrates a side view of the device 110 according to various embodiments of the present disclosure. In this side view, the left side of the device 110 is illustrated. An ultrasonic sensor 328 and an optical sensor 330 may be disposed on either side of the device 110.

The disposition of components of the device 110 may be arranged such that a center of gravity 332 is located between a wheel axle 334 of the front wheels 302 and the caster 304. Such placement of the center of gravity 332 may result in improved stability of the device 110 and may also facilitate lifting by a carrying handle.

In this illustration, the caster 304 is shown in a trailing configuration, in which the caster 304 is located behind or aft of the wheel axle 334 and the center of gravity 332. In another implementation (not shown) the caster 304 may be in front of the axle of the wheels 302. For example, the caster 304 may be a leading caster 304 positioned forward of the center of gravity 332.

The device 110 may encounter a variety of different floor surfaces and transitions between different floor surfaces during the course of its operation. A contoured underbody 336 may transition from a first height 338 at the front of the device 110 to a second height 340 that is proximate to the caster 304. This curvature may provide a ramp effect such that, if the device 110 encounters an obstacle that is below the first height 338, the contoured underbody 336 helps direct the device 110 over the obstacle without lifting the driving wheels 302 from the floor.

Figure 3C:
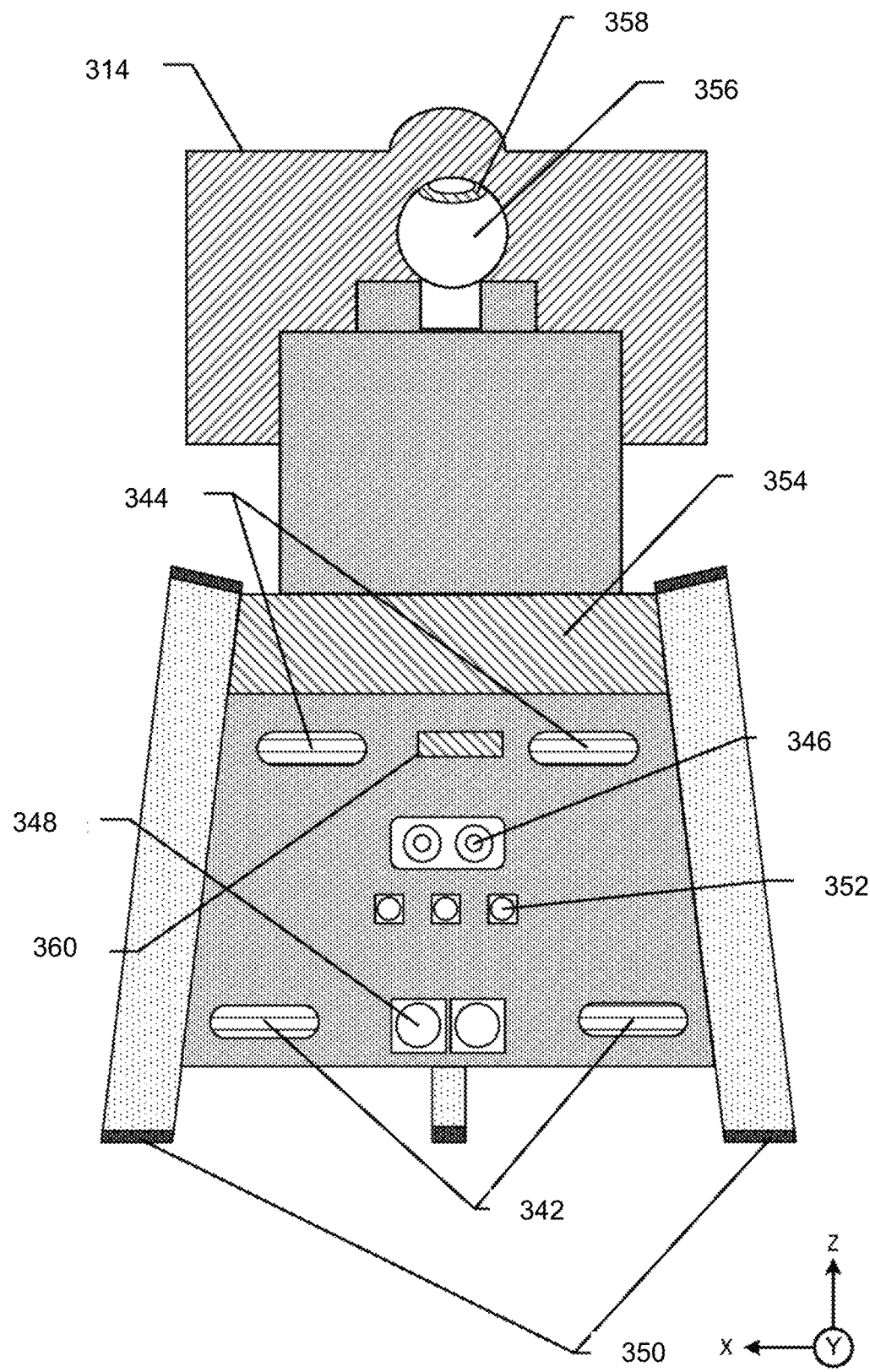

FIG. 3C illustrates a rear view of the device 110 according to various embodiments of the present disclosure. In this view, as with the front view, a first pair of optical sensors 342 may be located along the lower edge of the rear of the device 110, while a second pair of optical sensors 344 are located along an upper portion of the rear of the device 110. An ultrasonic sensor 346 may provide proximity detection for objects that are behind the device 110.

Charging contacts 348 may be provided on the rear of the device 110. The charging contacts 348 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 302 may include an electrically conductive portion 350 and provide an electrical conductive pathway between the device 110 and a charging source disposed on the floor. One or more data contacts 352 may be arranged along the back of the device 110. The data contacts 352 may be configured to establish contact with corresponding base data contacts within the docking station. The data contacts 352 may provide optical, electrical, or other connections suitable for the transfer of data.

Other output devices 360, such as one or more lights, may be disposed on an exterior of the back of the device 110. For example, a brake light may be arranged on the back surface of the device 110 to provide users an indication that the device 110 is slowing or stopping.

The device 110 may include a modular payload bay 354. In some embodiments, the modular payload bay 354 is located within the lower structure. The modular payload bay 354 may provide mechanical and/or electrical connectivity with the device 110. For example, the modular payload bay 354 may include one or more engagement features such as slots, cams, ridges, magnets, bolts, and so forth that are used to mechanically secure an accessory within the modular payload bay 354. In some embodiments, the modular payload bay 354 includes walls within which the accessory may sit. In other embodiments, the modular payload bay 354 may include other mechanical engagement features such as slots into which the accessory may be slid and engage. The device 110 may further include a mast 356, which may include a light 358.

Figure 3D:
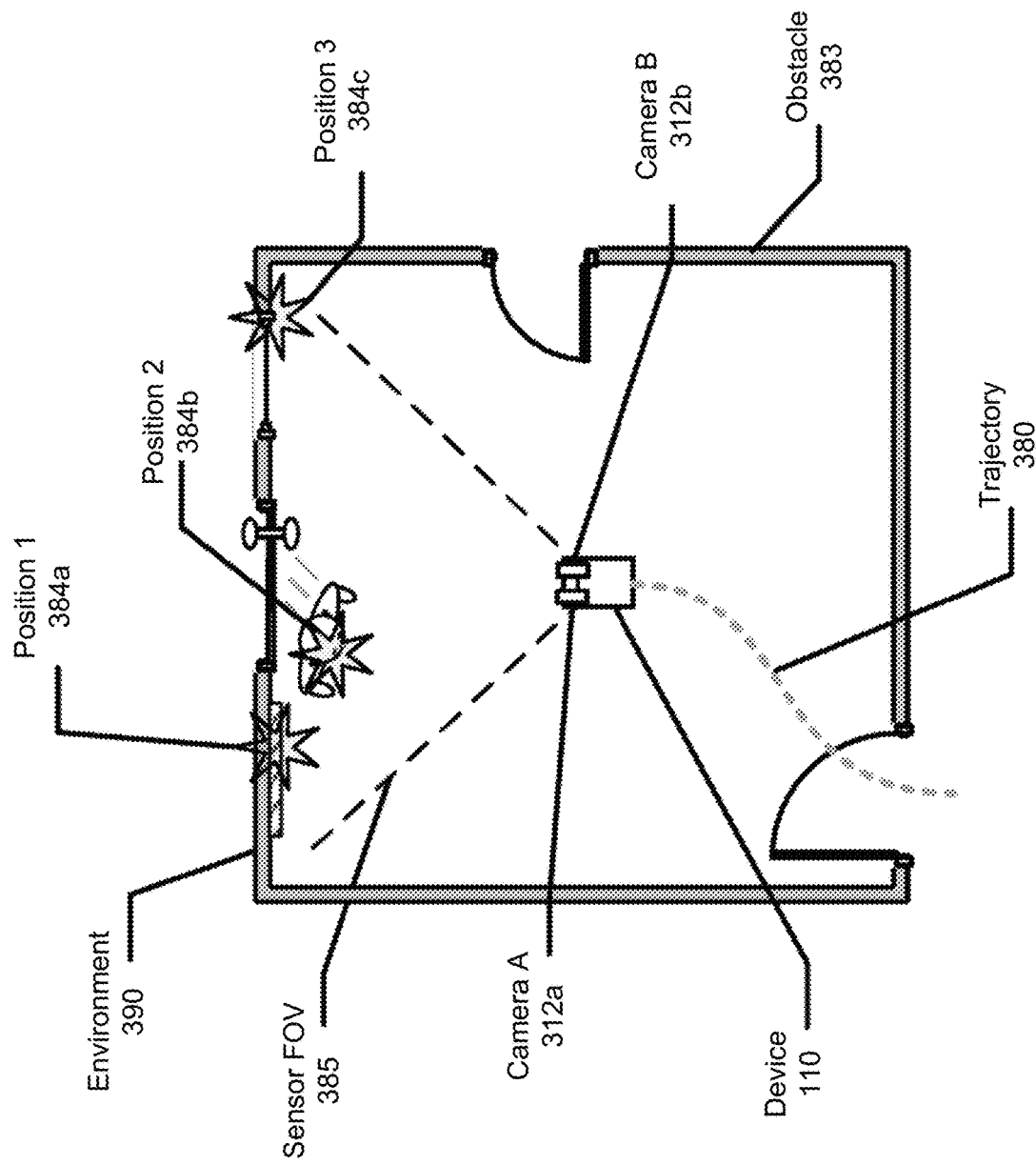
FIG. 3D illustrates a view of an autonomously motile device in an environment according to embodiments of the present disclosure.

FIG. 3D illustrates a view of a motile device in an environment according to embodiments of the present disclosure. As shown in FIG. 3D, the motile device 110 may move in the environment 390. The motion of the motile device 110 may be described as a trajectory 380, as shown in FIG. 3D. In some implementations, the trajectory 380 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

As described above, one or more motors or other actuators enable the motile device 110 to move from one location in the environment 390 to another. For example, a motor may be used to drive a wheel attached to a chassis of the motile device 110, which causes the motile device 110 to move. The motile device 110 may turn, move forward, move backward, and so forth. In another example, actuators may move legs allowing the motile device 110 to walk.

The motile device 110 may include one or more sensors. For example, the sensors may include a first camera 312a, a second camera 312b, an inertial measurement unit (IMU), microphones, time-of-flight (TOF) sensors, and so forth. The first camera 312a and the second camera 312b may be mounted to a common rigid structure that maintains a relative distance between the cameras 312a, 312b. An IMU may be attached to this common rigid structure, or one of the cameras affixed thereto. The first camera 312a and the second camera 312b may be arranged such that a sensor field-of-view 385 of the first camera 312a overlaps at least in part a sensor field-of-view of the second camera 312b.

Figure 3E:
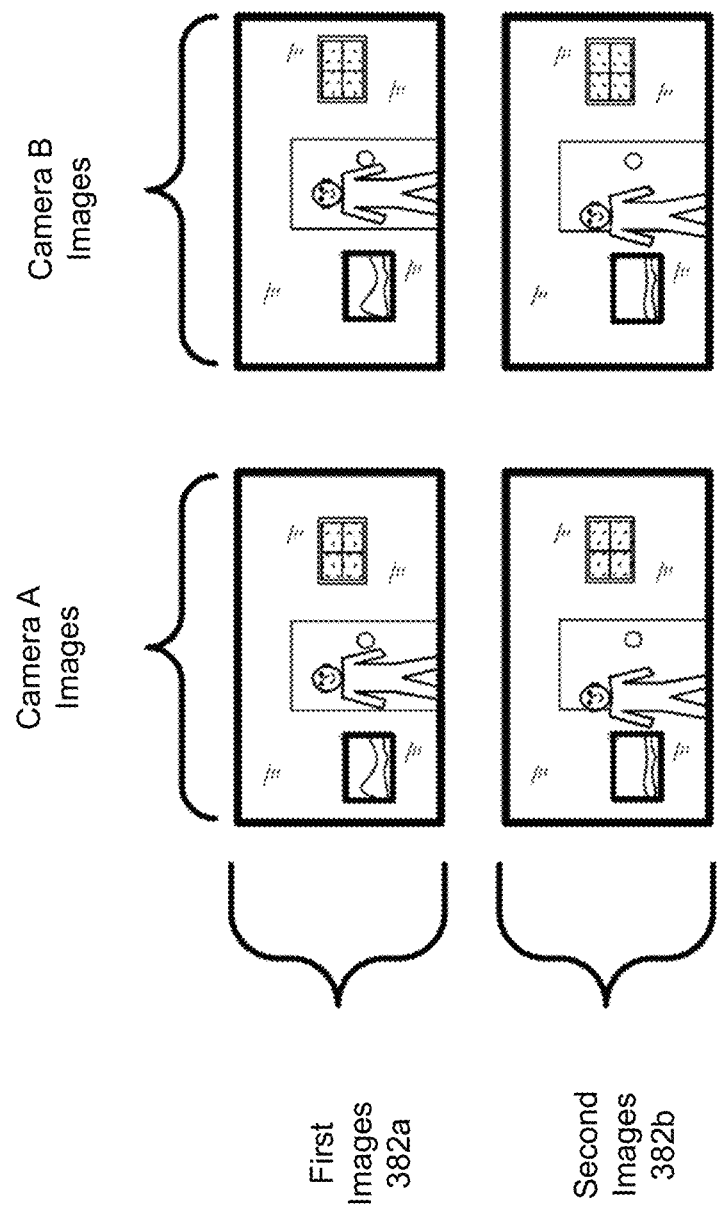
FIGS. 3E and 3F illustrate images captured by an autonomously motile device in an environment according to embodiments of the present disclosure.

The sensors may generate sensor data (which may be stored in storage). The sensor data may include audio data acquired by one or more microphones and/or image data acquired by the first camera 312a and/or the second camera 312b. As illustrated in FIG. 3E, a pair of images 382 may comprise image data from the first camera 312a and the second camera 312b that are acquired at the same time. For example, a first pair of images 382a may be acquired at time t_1 and a second pair of images 382b may be acquired at time t_2. Some or all of the image data and/or audio data may be sent to the user device 110 for output thereon, although the disclosure is not limited thereto.

During operation the motile device 110 may determine input data. The input data may include or be based at least in part on sensor data from the sensors onboard the motile device 110. In one implementation, a speech processing component (which may include speech-processing component(s) illustrated in FIG. 2) may process raw audio data obtained by a microphone on the motile device 110 and produce input data. For example, the user may say "Echo, come here" which may produce input data "come here". In another implementation, the input data may comprise information such as a command provided by another computing device, such as a smartphone or tablet computer.

A mapping component may determine a representation of the environment 390 that includes the obstacles 383 and their location in the environment 390. During operation the mapping component uses the sensor data from various sensors to determine information such as where the motile device 110 is, how far the motile device 110 has moved, the presence of obstacles 383, where those obstacles 383 are, where a user is located (in conjunction with user recognition component 295), and so forth.

Figure 3F:
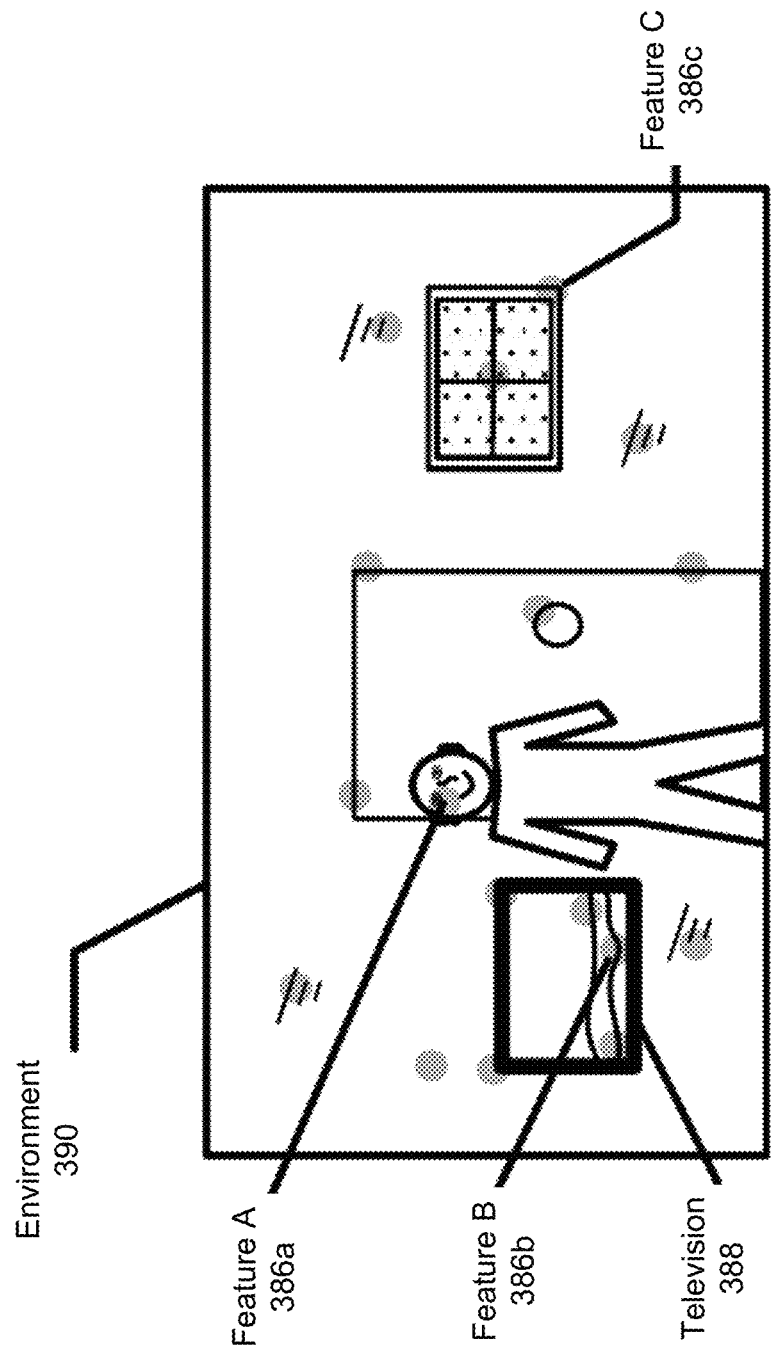

A feature module processes at least a portion of the image data to determine first feature data. The first feature data is indicative of one or more features 386 that are depicted in the image data. For example, as shown in FIG. 3F, the features 386 may be edges of doors, shadows on the wall, texture on the walls, portions of artwork in the environment 390, and so forth. The environment 390 may include display devices that are capable of changing the images they portray. For example, a television 388 may be presented in the environment 390. The picture presented by the television 388 may also have features 386.

Various techniques may be used to determine the presence of features 386 in image data. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 386 in the image data. A feature 386 that has been detected may have an associated descriptor that characterizes that feature 386. The descriptor may comprise a vector value in some implementations. For example, the descriptor may comprise data indicative of the feature with respect to 256 different dimensions.

The first feature data may comprise information such the descriptor for the feature 386, the images that the feature 386was detected in, location in the image data of the feature 386, and so forth. For example, the first feature data may indicate that in a first image the feature 386 is centered at row 994, column 312 in the first image. These data and operations, along with those discussed below, may be used by the motile device 110, and/or other devices, to perform the operations described herein.

As humans express themselves using nonverbal communication (e.g., body language), it may be beneficial for the device 110 to analyze features associated with the user and potentially interpret a posture (e.g., pose) of the user. To illustrate an example, the device 110 may distinguish between a relaxed posture (e.g., user is standing in place, sitting on a couch, etc.) and an animated posture (e.g., user is gesticulating or making other movements) and interpret input commands based on the current posture. For example, if the device 110 detects the animated posture, the device 110 may respond more quickly, switch from a first action to a second action (e.g., determine that the first action did not correspond to the desired command), and/or the like, although the disclosure is not limited thereto.

FIG. 4 illustrates examples of the autonomous motile device determining posture data according to embodiments of the present disclosure. In some examples, the device 110 may analyze a current posture of the user to generate posture data indicating the current posture and may use this posture data as part of performing sentiment detection. As illustrated in FIG. 4, a first posture example 410 illustrates an example of the user in a first posture or pose (e.g., standing upright), a second posture example 420 illustrates an example of the user in a second posture (e.g., playing a board game at a table), and a third posture example 430 illustrates an example of the user in a third posture (e.g., seated on a couch while operating a device).

The device 110 may capture image data representing the user and may process the image data to generate the posture data. For example, the device 110 may process the first posture example 410 to generate first posture data indicating that the user is standing upright, may process the second posture example 420 to generate second posture data indicating that the user is gazing at an object (e.g., a game board) on a table, and may process the third posture example 430 to generate third posture data indicating that the user is seated and operating a hand-held device.

One of skill in the art may recognize that the posture of the user may be related to a "pose" of the user, such that generating the posture data may correspond to performing pose recognition to distinguish between different poses of the user and/or the like. However, to avoid confusion, as used herein the disclosure uses the term "posture" to refer to a pose and/or posture associated with the user and uses the term "pose" to refer to a position of one or more sensors of the device 110. For example, the device 110 may generate posture data to indicate a posture of the user as represented in the image data, while determining pose data to indicate a current position of one or more sensors (e.g., camera(s)) relative to the device 110 and/or the user. Thus, the posture data indicates information about the user, whereas the pose data indicates information about the one or more sensors of the device 110 (e.g., height of a sensor, length of extension associated with a sensor, perspective of the user, distance to the user, etc.).

In some examples, the posture data may include a simple descriptor associated with the current posture, such as "standing," "animated," "sitting," etc. However, the disclosure is not limited thereto, and the device 110 may generate posture data including additional descriptors that provide additional details without departing from the disclosure. For example, the third posture data may indicate that the user is holding a smartphone, whereas the second posture data may indicate that the user is looking directly at the device 110, although the disclosure is not limited thereto. Thus, in addition to indicating the current posture (e.g., pose) of the user (e.g., physical orientation of the user's body), the posture data may also indicate whether the user is looking and/or interacting with something else (e.g., another user, the smartphone, etc.) or whether the user is interacting with the device 110.

Figure 5:
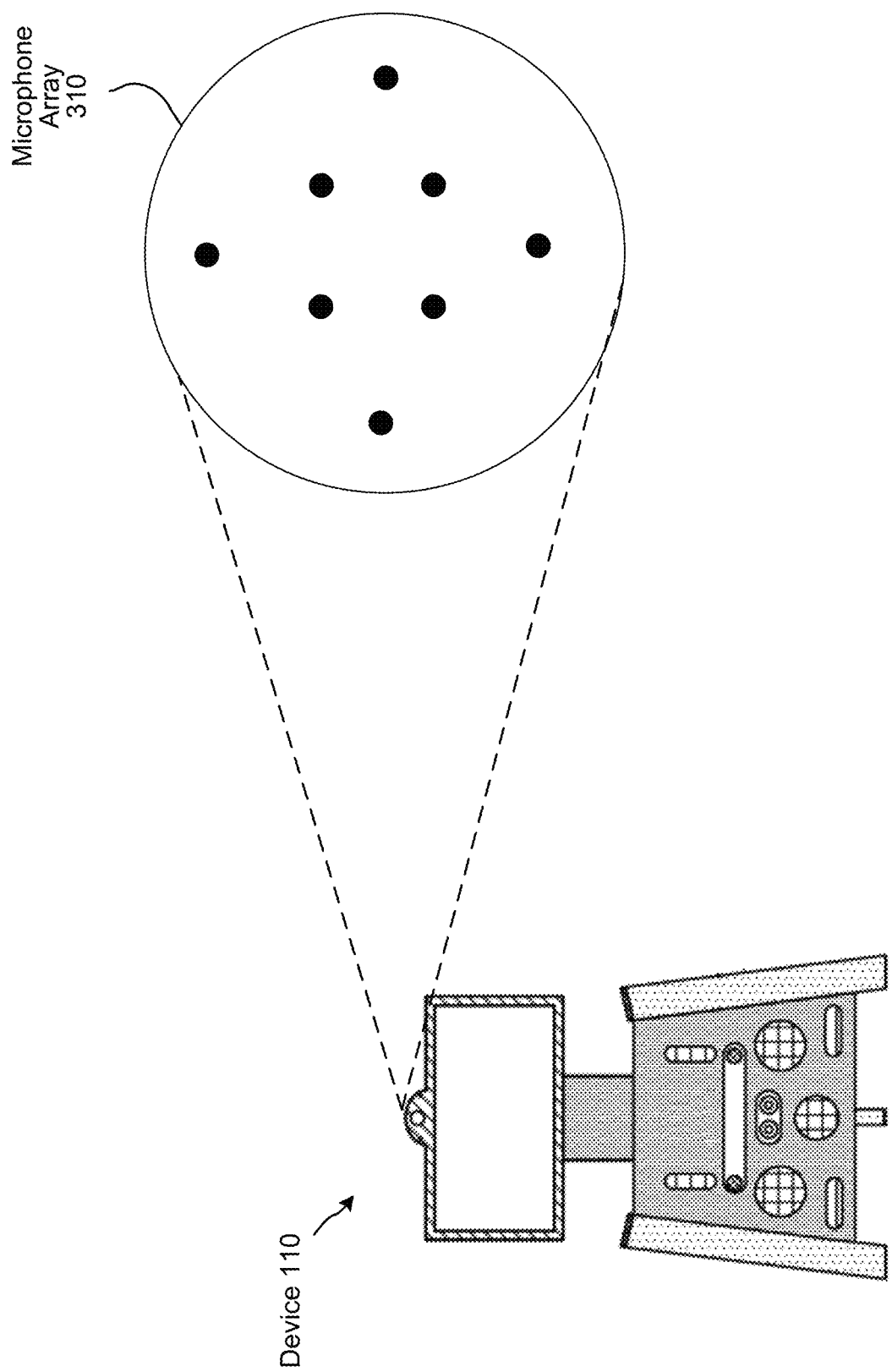
FIG. 5 illustrates a microphone array according to embodiments of the present disclosure.

FIG. 5 illustrates further details of the microphone array 310. In some embodiments, the microphone array 310 includes eight microphones (illustrated as small dots) arranged in two concentric circles; the four microphones of one circle may be rotated 45 degrees with respect to the four microphones of the other circle. The present disclosure is not, however, limited to any particular number or arrangement of microphones.

The microphone array 310 may include various numbers of individual microphones. The individual microphones may capture sound and pass the resulting audio signals created by the sound to downstream components, such as a directional power magnitude component, as discussed below. Each individual piece of audio data captured by a microphone may be represented as a time-domain audio signal; these signals may be converted to the frequency domain using an analysis filterbank, which may perform a Fourier transform.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The device 110 and/or the system(s) 120 may include a user recognition component 295 that recognizes one or more users using a variety of data. As illustrated in FIG. 6, the user recognition component 295 may include one or more subcomponents including a vision component 608, an audio component 610, a biometric component 612, a radio frequency (RF) component 614, a machine learning (ML) component 616, and a recognition confidence component 618. In some instances, the user recognition component 295 may monitor data and determinations from one or more subcomponents to determine an identity of one or more users associated with data input to the device 110 and/or the system(s) 120. The user recognition component 295 may output user recognition data 695, which may include a user identifier associated with a user the user recognition component 295 believes originated data input to the device 110 and/or the system(s) 120. The user recognition data 695 may be used to inform processes performed by various components of the device 110 and/or the system(s) 120.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 295 may utilize determinations from additional components to determine an identity of a user. The vision component 608 can be used in conjunction with other components to determine an identity of a user. For example, the user recognition component 295 may use data from the vision component 608 with data from the audio component 610 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The RF component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a personal device (such as a phone) may include some RF or other detection processing capabilities so that a user who speaks an input may scan, tap, or otherwise acknowledge his/her personal device to the device 110. In this manner, the user may "register" with the system 100 for purposes of the system 100 determining who spoke a particular input. Such a registration may occur prior to, during, or after speaking of an input.

The ML component 616 may track the behavior of various users as a factor in determining a confidence level of the identity of the user. By way of example, a user may adhere to a regular schedule such that the user is at a first location during the day (e.g., at work or at school). In this example, the ML component 616 would factor in past behavior and/or trends in determining the identity of the user that provided input to the device 110 and/or the system(s) 120. Thus, the ML component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 695.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of device 110 and/or the system(s) 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 211 input into the device 110 and/or the system(s) 120for speech processing. The audio component 610 may determine scores indicating whether speech in the audio data 211 originated from particular users. For example, a first score may indicate a likelihood that speech in the audio data 211 originated from a first user associated with a first user identifier, a second score may indicate a likelihood that speech in the audio data 211 originated from a second user associated with a second user identifier, etc. The audio component 610 may perform user recognition by comparing speech characteristics represented in the audio data 211 to stored speech characteristics of users (e.g., stored voice profiles associated with the device 110 that captured the spoken user input).

Figure 7:
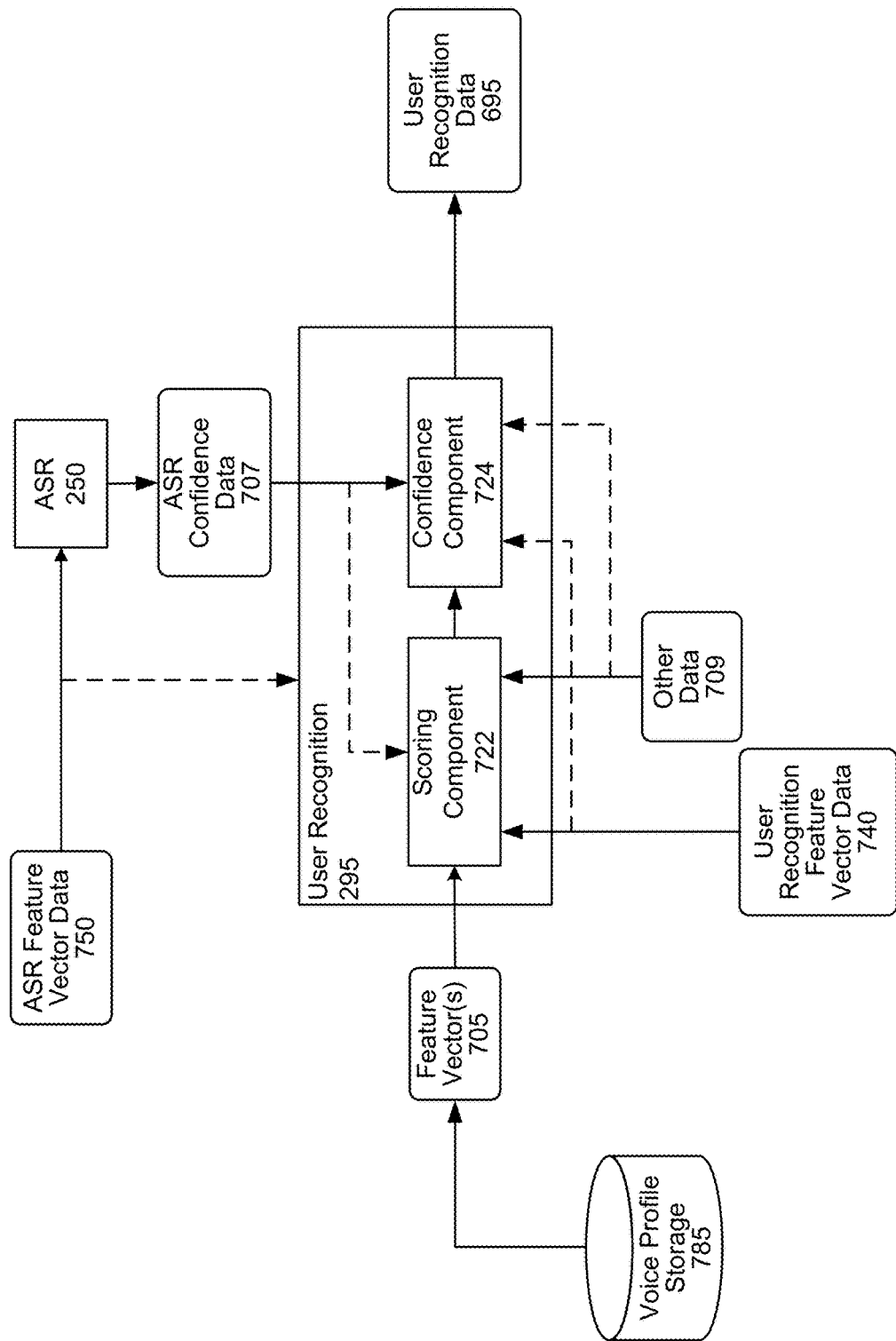
FIG. 7 is a system flow diagram illustrating user recognition according to embodiments of the present disclosure.

FIG. 7 illustrates user recognition processing as may be performed by the user recognition component 295. The ASR component 250 performs ASR processing on ASR feature vector data 750. ASR confidence data 707 may be passed to the user recognition component 295.

The user recognition component 295 performs user recognition using various data including the user recognition feature vector data 740, feature vectors 705 representing voice profiles of users of the system 100, the ASR confidence data 707, and other data 709. The user recognition component 295 may output the user recognition data 695, which reflects a certain confidence that the user input was spoken by one or more particular users. The user recognition data 695 may include one or more user identifiers (e.g., corresponding to one or more voice profiles). Each user identifier in the user recognition data 695 may be associated with a respective confidence value, representing a likelihood that the user input corresponds to the user identifier. A confidence value may be a numeric or binned value.

The feature vector(s) 705 input to the user recognition component 295 may correspond to one or more voice profiles. The user recognition component 295 may use the feature vector(s) 705 to compare against the user recognition feature vector 740, representing the present user input, to determine whether the user recognition feature vector 740 corresponds to one or more of the feature vectors 705 of the voice profiles. Each feature vector 705 may be the same size as the user recognition feature vector 740.

To perform user recognition, the user recognition component 295 may determine the device 110 from which the audio data 211 originated. For example, the audio data 211 may be associated with metadata including a device identifier representing the device 110. Either the device 110 or the system(s) 120 may generate the metadata. The system 100 may determine a group profile identifier associated with the device identifier, may determine user identifiers associated with the group profile identifier, and may include the group profile identifier and/or the user identifiers in the metadata. The system 100 may associate the metadata with the user recognition feature vector 740 produced from the audio data 211. The user recognition component 295 may send a signal to voice profile storage 785, with the signal requesting only audio data and/or feature vectors 705 (depending on whether audio data and/or corresponding feature vectors are stored) associated with the device identifier, the group profile identifier, and/or the user identifiers represented in the metadata. This limits the universe of possible feature vectors 705 the user recognition component 295 considers at runtime and thus decreases the amount of time to perform user recognition processing by decreasing the amount of feature vectors 705 needed to be processed. Alternatively, the user recognition component 295 may access all (or some other subset of) the audio data and/or feature vectors 705 available to the user recognition component 295. However, accessing all audio data and/or feature vectors 705 will likely increase the amount of time needed to perform user recognition processing based on the magnitude of audio data and/or feature vectors 705 to be processed.

If the user recognition component 295 receives audio data from the voice profile storage 785, the user recognition component 295 may generate one or more feature vectors 705 corresponding to the received audio data.

The user recognition component 295 may attempt to identify the user that spoke the speech represented in the audio data 211 by comparing the user recognition feature vector 740 to the feature vector(s) 705. The user recognition component 295 may include a scoring component 722 that determines respective scores indicating whether the user input (represented by the user recognition feature vector 740) was spoken by one or more particular users (represented by the feature vector(s) 705). The user recognition component 295 may also include a confidence component 724 that determines an overall accuracy of user recognition processing (such as those of the scoring component 722) and/or an individual confidence value with respect to each user potentially identified by the scoring component 722. The output from the scoring component 722 may include a different confidence value for each received feature vector 705. For example, the output may include a first confidence value for a first feature vector 705a (representing a first voice profile), a second confidence value for a second feature vector 705b (representing a second voice profile), etc. Although illustrated as two separate components, the scoring component 722 and the confidence component 724 may be combined into a single component or may be separated into more than two components.

The scoring component 722 and the confidence component 724 may implement one or more trained machine learning models (such as neural networks, classifiers, etc.) as known in the art. For example, the scoring component 722 may use probabilistic linear discriminant analysis (PLDA) techniques. PLDA scoring determines how likely it is that the user recognition feature vector 740 corresponds to a particular feature vector 705. The PLDA scoring may generate a confidence value for each feature vector 705 considered and may output a list of confidence values associated with respective user identifiers. The scoring component 722 may also use other techniques, such as GMMs, generative Bayesian models, or the like, to determine confidence values.

The confidence component 724 may input various data including information about the ASR confidence 707, speech length (e.g., number of frames or other measured length of the user input), audio condition/quality data (such as signal-to-interference data or other metric data), fingerprint data, image data, or other factors to consider how confident the user recognition component 295 is with regard to the confidence values linking users to the user input. The confidence component 724 may also consider the confidence values and associated identifiers output by the scoring component 722. For example, the confidence component 724 may determine that a lower ASR confidence 707, or poor audio quality, or other factors, may result in a lower confidence of the user recognition component 295. Whereas a higher ASR confidence 707, or better audio quality, or other factors, may result in a higher confidence of the user recognition component 295. Precise determination of the confidence may depend on configuration and training of the confidence component 724 and the model(s) implemented thereby. The confidence component 724 may operate using a number of different machine learning models/techniques such as GMM, neural networks, etc. For example, the confidence component 724 may be a classifier configured to map a score output by the scoring component 722 to a confidence value.

The user recognition component 295 may output user recognition data 695 specific to a one or more user identifiers. For example, the user recognition component 295 may output user recognition data 695 with respect to each received feature vector 705. The user recognition data 695 may include numeric confidence values (e.g., 0.0-1.0, 0-1000, or whatever scale the system is configured to operate). Thus, the user recognition data 695 may output an n-best list of potential users with numeric confidence values (e.g., user identifier 123—0.2, user identifier 234—0.8). Alternatively or in addition, the user recognition data 695 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 295 may output an n-best list of user identifiers with binned confidence values (e.g., user identifier 123— low, user identifier 234—high). Combined binned and numeric confidence value outputs are also possible. Rather than a list of identifiers and their respective confidence values, the user recognition data 695 may only include information related to the top scoring identifier as determined by the user recognition component 295. The user recognition component 295 may also output an overall confidence value that the individual confidence values are correct, where the overall confidence value indicates how confident the user recognition component 295 is in the output results. The confidence component 724 may determine the overall confidence value.

The confidence component 724 may determine differences between individual confidence values when determining the user recognition data 695. For example, if a difference between a first confidence value and a second confidence value is large, and the first confidence value is above a threshold confidence value, then the user recognition component 295 is able to recognize a first user (associated with the feature vector 705 associated with the first confidence value) as the user that spoke the user input with a higher confidence than if the difference between the confidence values were smaller.

The user recognition component 295 may perform thresholding to avoid incorrect user recognition data 695 being output. For example, the user recognition component 295 may compare a confidence value output by the confidence component 724 to a threshold confidence value. If the confidence value does not satisfy (e.g., does not meet or exceed) the threshold confidence value, the user recognition component 295 may not output user recognition data 695, or may only include in that data 695 an indicator that a user that spoke the user input could not be recognized. Further, the user recognition component 295 may not output user recognition data 695 until enough user recognition feature vector data 740 is accumulated and processed to verify a user above a threshold confidence value. Thus, the user recognition component 295 may wait until a sufficient threshold quantity of audio data of the user input has been processed before outputting user recognition data 695. The quantity of received audio data may also be considered by the confidence component 724.

The user recognition component 295 may be defaulted to output binned (e.g., low, medium, high) user recognition confidence values. However, such may be problematic in certain situations. For example, if the user recognition component 295 computes a single binned confidence value for multiple feature vectors 705, the system may not be able to determine which particular user originated the user input. In this situation, the user recognition component 295 may override its default setting and output numeric confidence values. This enables the system to determine a user, associated with the highest numeric confidence value, originated the user input.

The user recognition component 295 may use other data 709 to inform user recognition processing. A trained model(s) or other component of the user recognition component 295 may be trained to take other data 709 as an input feature when performing user recognition processing. Other data 709 may include a variety of data types depending on system configuration and may be made available from other sensors, devices, or storage. The other data 709 may include a time of day at which the audio data 211 was generated by the device 110 or received from the device 110, a day of a week in which the audio data audio data 211 was generated by the device 110 or received from the device 110, etc.

The other data 709 may include image data or video data. For example, facial recognition may be performed on image data or video data received from the device 110 from which the audio data 211 was received (or another device). Facial recognition may be performed by the user recognition component 295. The output of facial recognition processing may be used by the user recognition component 295. That is, facial recognition output data may be used in conjunction with the comparison of the user recognition feature vector 740 and one or more feature vectors 705 to perform more accurate user recognition processing. Additionally or alternatively, posture recognition can be performed by the user recognition component 295 and/or the output of posture recognition processing may be used by the user recognition component 295 without departing from the disclosure.

The other data 709 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 709 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 211 was received is a smart watch or vehicle belonging to a user A, the fact that the device 110 belongs to user A may increase a user recognition confidence value associated with user A and/or decrease a user recognition confidence value associated with user B.

The other data 709 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 211. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 709 may include data representing activity of a particular user that may be useful in performing user recognition processing. For example, a user may have recently entered a code to disable a home security alarm. A device 110, represented in a group profile associated with the home, may have generated the audio data 211. The other data 709 may reflect signals from the home security alarm about the disabling user, time of disabling, etc. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 709 and considered by the user recognition component 295.

Depending on system configuration, the other data 709 may be configured to be included in the user recognition feature vector data 740 so that all the data relating to the user input to be processed by the scoring component 722 may be included in a single feature vector. Alternatively, the other data 709 may be reflected in one or more different data structures to be processed by the scoring component 722.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests.

Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 8:
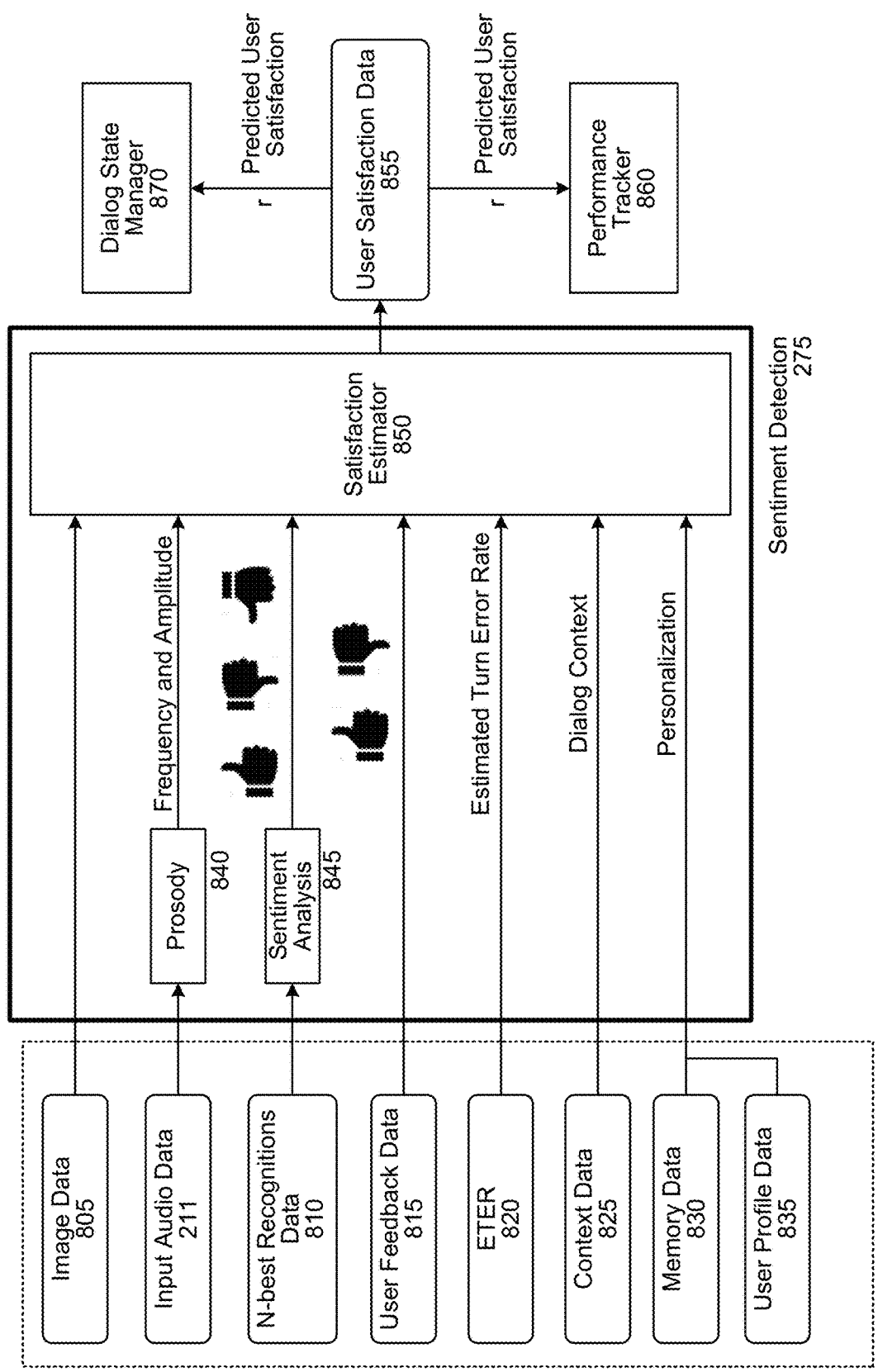
FIG. 8 illustrates examples of inputs to and outputs from a user satisfaction estimator according to embodiments of the present disclosure.

FIG. 8 illustrates examples of inputs to and outputs from a user satisfaction estimator according to embodiments of the present disclosure. As illustrated in FIG. 8, the sentiment detection component 275 may include a satisfaction estimator 850 configured to generate user satisfaction data 855. For example, the satisfaction estimator 850 may use a plurality of inputs to estimate a user satisfaction value, although the disclosure is not limited thereto.

In some examples, the satisfaction estimator 850 is configured to determine an emotive context of the user (e.g., user satisfaction), which may be represented as a scalar value between 1 and 5 that indicates whether the user is satisfied (e.g., "5") or unsatisfied (e.g., "1") at a particular point in time. However, the disclosure is not limited thereto and the user satisfaction data 855 may vary without departing from the disclosure. For example, the user satisfaction data 855 may indicate a scalar value within a different range of values (e.g., between "1" and "10," although the disclosure is not limited thereto) or may not correspond to a scalar value without departing from the disclosure. Additionally or alternatively, the user satisfaction data 855 may indicate a sentiment category corresponding to the user without departing from the disclosure.

In some examples, the device 110 may generate the user satisfaction data 855 to determine a predicted user satisfaction associated with an action performed by the device 110. For example, each time the device 110 performs an action responsive to an utterance of the user, the device 110 may generate the user satisfaction data 855 to estimate the predicted user satisfaction immediately after the action is performed. Thus, the device 110 may track the predicted user satisfaction values and improve performance of the device 110. In addition, the device 110 may use the user satisfaction data 855 as an input to the sentiment detection model and may perform multimodal sentiment detection to determine sentiment data based in part on the user satisfaction data 855.

In other examples, however, the satisfaction estimator 850 may be included as part of the sentiment detection model without departing from the disclosure. For example, the sentiment detection model may process at least some of the plurality of inputs illustrated in FIG. 8 to generate user satisfaction data 855 that corresponds to the sentiment data described above. Thus, the user satisfaction estimator 850 may be a separate component from the sentiment detection model, in which case the user satisfaction data 855 is another input for the sentiment detection model, or the user satisfaction estimator 850 may be a simple illustration of a sentiment detection model, in which case the user satisfaction data 855 corresponds to the sentiment data itself. If the user satisfaction estimator 850 is included as part of the sentiment detection model, the sentiment detection model may perform multimodal sentiment detection using at least some of the plurality of inputs illustrated in FIG. 8 as well as additional inputs described in greater detail below.

As illustrated in FIG. 8, the satisfaction estimator 850 may receive a plurality of inputs, which may correspond to dialog state data received from a dialog state manager 870, although the disclosure is not limited thereto. For example, the plurality of inputs may include image data 805, input audio data 211, speech processing output data 810 (e.g., lexical data output by the ASR component 250, NLU data output by the NLU component 260, and/or the like), user feedback data 815, estimated turn error rate (ETER) 820, context data 825, memory data 830, and/or user profile data 835, although the disclosure is not limited thereto.

As described above, the speech processing output data 810 may include lexical data output by the ASR component 250, NLU data output by the NLU component 260, and/or the like. For example, the speech processing output data 810 may correspond to textual data representing the speech, N-best recognitions data, and/or the like without departing from the disclosure.

The context data may include information providing context for the device 110 and/or a user profile associated with the device 110. For example, the context data 825 may indicate a dialog context associated with a current utterance, a usage history of the device 110, a usage history of multiple devices associated with the user profile, mapping data corresponding to the environment around the device 110, and/or other data without departing from the disclosure.

To determine whether the user is pleased or displeased, the satisfaction estimator 850 may analyze multiple inputs for evidence of the user's emotional state. For example, the satisfaction estimator 850 may analyze the input audio data 211 to detect variations in the user's speech, such as a change in tone (e.g., the user angrily shouting), speech speed or speech frequency. Similarly, the satisfaction estimator 850 may analyze (e.g., perform content analysis) the output of the speech processing component 240 (e.g., text corresponding to the user's speech) to determine whether the user's speech is positive, negative or neutral.

In some examples, the device 110 may include a camera configured to capture image data 805 and the satisfaction estimator 850 may analyze the image data 805 using facial recognition or the like to identify facial expressions and determine if the facial expressions are positive, negative, or neutral, although the disclosure is not limited thereto. For example, the satisfaction estimator 850 may receive the image data 805 and may perform computer vision processing to determine information about a user satisfaction based on facial expressions or the like. In some examples, the satisfaction estimator 850 may identify common facial expressions and associate the facial expressions with a user satisfaction value, such as a smile corresponding to a high user satisfaction value and a frown corresponding to a low user satisfaction value. Additionally or alternatively, the satisfaction estimator 850 may analyze the image data 805 using posture recognition or the like to identify posture data indicating a current posture of the user and determine if the posture data is positive, negative, or neutral, although the disclosure is not limited thereto. However, the disclosure is not limited thereto and the satisfaction estimator 850 may perform any computer vision processing known to one of skill in the art without departing from the disclosure.

The sentiment detection component 275 may include three components that include machine learning models; a prosody component 840, a sentiment analysis component 845, and a satisfaction estimator 850. As illustrated in FIG. 8, the audio (e.g., input audio data 211) and the text (e.g., speech processing output data 810) are processed separately by the first two machine learning models (e.g., the prosody component 840 and the sentiment analysis component 845, respectively) and outputs are fed into the third machine learning model (e.g., the satisfaction estimator 850), along with the remaining inputs. While FIG. 8 illustrates the sentiment detection component 275 including all three machine learning models, the disclosure is not limited thereto and the sentiment detection component 275 may include only a single machine learning model without departing from the disclosure. For example, the sentiment detection component 275 may map the dialog state to the user satisfaction value without intermediate prediction.

As discussed above, the prosody component 840 may analyze the input audio data 211 to determine the frequency and the amplitude of the user's speech, which may indicate whether the user is satisfied or unsatisfied. As used herein, audio property data may represent at least one of the frequency or the amplitude of the user's speech and the audio property data may be associated with the input audio data 211.

The user feedback data 815 may correspond to explicit user feedback indicating whether the user is satisfied or unsatisfied, such as a verbal indication of positive or negative feedback. In some examples, the system(s) 120 may estimate if the ASR and/or NLU made a mistake, which is indicated by an estimated turn error rate (ETER) 820.

The prosody component 840 may be configured to identify changes in tone (e.g., happy, sad, etc.) and determine whether the changes in tone correspond to a user satisfaction. For example, the prosody component 840 may detect fluctuations in speech indicating that the user is annoyed or frustrated, which corresponds to a decreased user satisfaction.

Additionally or alternatively, the sentiment analysis component 845 may be configured to analyze the speech processing output data 810 and identify a sentiment (e.g., positive, neutral, negative) associated with the utterance. For example, if the user cancels an action or inputs the same command repeatedly, the sentiment analysis component 845 may determine that the user is unsatisfied and that the system(s) 120 are not performing the desired action. Similarly, if the utterance corresponds to a negative comment (e.g., "This machine is so dumb!"), the sentiment analysis component 845 may interpret the utterance as an indication that the user satisfaction is low.

The memory data 830 indicates stored preferences or annotations associated with the user, the device 110 and/or the system 100. For example, the user may indicate "Alexa, remember that I hate mushrooms," "Alexa, my passcode is 12345," "Alexa, I will not go to this restaurant anymore," or the like, and the system 100 may store this information to improve future processing. In some examples the memory data 830 may correspond to the personal graph data associated with a user profile for the user, although the disclosure is not limited thereto. As illustrated in FIG. 8, the memory data 830 may include user profile data 835 that is associated with the user profile.

In some examples, the satisfaction estimator 850 may generate user satisfaction data 855, which includes the user satisfaction value (e.g., value between 1 and 5) indicating a current estimate of the user satisfaction (e.g., predicted user satisfaction r). The user satisfaction data 855 may be sent to the dialog state manager 870 to update the dialog state data. Additionally or alternatively, the user satisfaction data 855 may be sent to a performance tracker 860 that may track the user satisfaction values over a period of time. The performance tracker 860 may enable the system 100 to track the user's conversational experience and to estimate the user satisfaction given a current dialog state.

The sentiment detection component 275 (e.g., the prosody component 840, the sentiment analysis component 845, and/or the satisfaction estimator 850) and/or other components in the system 100 may implement one or more machine learning models. A ground truth may be established for purposes of training the one or more machine learning models. In machine learning, the term "ground truth" refers to the accuracy of a training set's classification for supervised learning techniques.

Various machine learning techniques may be used to train and operate the satisfaction estimator 850. Such techniques may include backpropagation, statistical learning, supervised learning, semi-supervised learning, stochastic learning, or other known techniques. Such techniques may more specifically include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category. The user response to content output by the system may be used to further train the machine learning model(s).

Figure 9:
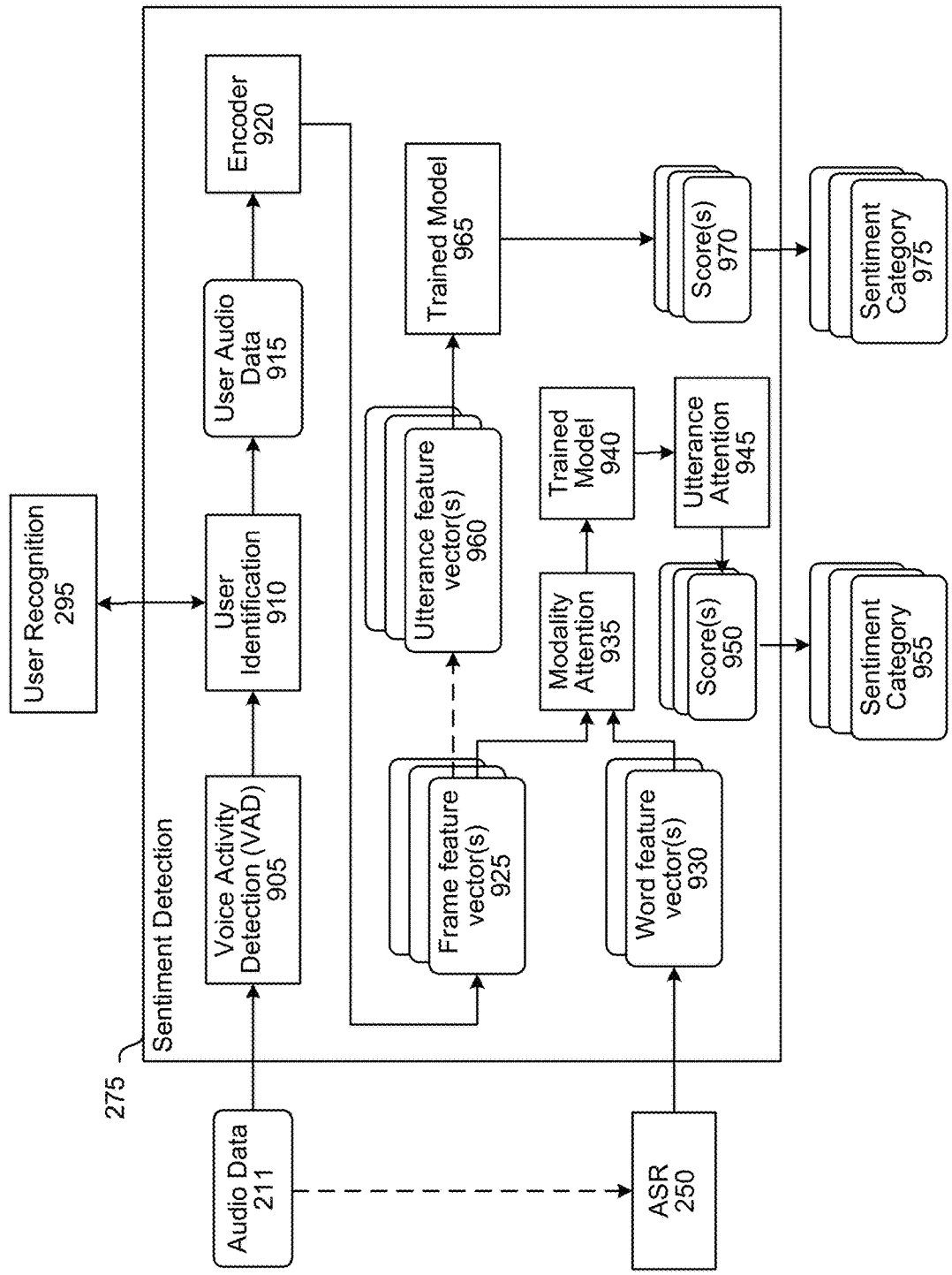
FIG. 9 is a conceptual diagram illustrating a sentiment detection component according to embodiments of the present disclosure.

FIG. 9 is a conceptual diagram illustrating sentiment detection component 275 according to embodiments of the present disclosure. The sentiment detection component 275 may include a voice activity detection (VAD) component 905, a user identification component 910, an encoder component 920, a modality attention layer 935, a trained model component 940, an utterance attention layer 945, and a trained model component 965. The audio data 211 captured by a device 110 may be inputted into the VAD component 905. While FIG. 9 illustrates the sentiment detection component 275 receiving the audio data 211, the disclosure is not limited thereto and in some examples the sentiment detection component 275 may receive image data without departing from the disclosure. Thus, the sentiment detection component 275 may perform sentiment detection using the image data, as described in greater detail above with regard to FIG. 8 and below with regard to FIGS. 16-17.

The VAD component 905 may determine if the audio data 211 includes speech spoken by a human or voice activity by a human, and may determine a portion of the audio data 211 that includes speech or voice activity. The VAD component 905 may send the portion of the audio data 211 including speech or voice activity to the user identification component 910. The VAD component 905 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 905 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 910 may communicate with the user recognition component 295 to determine user audio data 915 that corresponds to a particular user profile. The user recognition component 295 may recognize one or more users as described in connection with FIGS. 6 and 7. The user audio data 915 may be a portion of the audio data 211 that includes speech or one or more utterances from a particular user associated with the user profile. In other words, audio data representing a particular user's speech may be isolated and stored as the user audio data 915 for further analysis. In an example embodiment, the user may be associated with or using the device 110, and may have provided permission to the system 100 to record and analyze his or her voice/conversations to determine a sentiment category corresponding to the conversation.

The user audio data 915 may be input into the encoder component 920 to determine frame feature vector(s) 925. The encoder component 920 may be a bidirectional LSTM. The frame feature vector(s) 925 may represent audio frame level features extracted from the user audio data 915. One frame feature vector 925 may represent audio frame level features for an audio frame of 20 ms of the user audio data 915. The frame feature vector(s) 925 may be derived by spectral analysis of the user audio data 915. The sentiment detection component 275 may determine the portions of user audio data 915 that correspond to individual words and may extract acoustic features from the respective portions of audio using the encoder component 920.

In some embodiments, the frame feature vector(s) 925 may be used to determine utterance feature vector(s) 960 representing utterance-level features of one or more utterances represented in the user audio data 915. The utterance feature vector(s) 960 may be determined by performing statistics calculations, delta calculation and other processing on the frame feature vector(s) 915 for the audio frames corresponding to an utterance of interest. As such, the utterance feature vector(s) 960 may be a feature matrix whose dimensions are based on the number of audio frames corresponding to the utterance of interest and the dimension of the corresponding frame feature vector 915. The utterance feature vector(s) 960 may be a high-level function or other mathematical functions representing the utterance-level features.

The ASR component 250, as described above, may generate an ASR output including text data representative of one or more utterances represented in the audio data 211. In some examples, the system sends audio data 211 to the ASR component 250 for processing. In other examples, the system sends user audio data 915 to the ASR component 250 for processing. The ASR output may be represented as word feature vector(s) 930, where each word feature vector 930 may correspond to a word in the text data determined by the ASR component 250 and may represent lexical information of the utterance. The word feature vector 930 may be a word embedding.

In an example embodiment, the sentiment detection component 275 determines that the user audio data 915 includes an entire utterance. That is, the sentiment detection component 275 may determine that a beginpoint of the user audio data 915 corresponds to a beginpoint of an utterance, and an endpoint of the user audio data 915 corresponds to an endpoint of the utterance. In this case, the frame feature vector(s) 925 and the word feature vector(s) 930 may represent all the words in one utterance.

The sentiment detection component 275 may align a frame feature vector 925 with a corresponding word feature vector 930 such that the pair represents acoustic information and lexical information, respectively, for an individual word in the utterance represented in user audio data 915. The frame feature vectors 925 and the word feature vectors 930 may be processed by the trained model 940 simultaneously.

The trained model 940 may process the frame feature vector(s) 925 and corresponding word feature vector(s) 930 using a machine learning model. In some embodiments, the sentiment detection component 275 includes a modality attention component 935 configured to determine how much acoustic information versus how much lexical information from the respective feature vectors 925/930 should be used by the trained model 940. In some cases the acoustic information corresponding to certain words may indicate a certain sentiment based on how the words were spoken by the user. In other cases the lexical information corresponding to certain words may indicate a certain sentiment based on the meaning or semantic of the word. For example, words "hey you" spoken with a certain level of anger, as indicated by the corresponding acoustic information, may indicate a sentiment category of anger, while the same words "hey you" spoken with no level of anger or excitement, as indicated by the corresponding acoustic information, may indicate a sentiment category of neutral. As a lexical example, the words "I am angry" may indicate a sentiment category of anger based on the corresponding lexical information. The modality attention component 935 may assign a weight or percentage to the data represented by the acoustic feature vectors and the data represented by the lexical feature vectors to indicate the importance of each to the trained model 940.

The trained model 940 may be a neural network, for example a bi-directional LSTM. The output of the trained model 940 may be fed into an utterance attention component 945. The utterance attention component 945 may employ a neural network, for example a recurrent neural network, although the disclosure is not limited thereto. The utterance attention component 945 may be configured to emphasize relevant portions of an input utterance. The utterance attention component 945 may be configured to take in output data from the trained model 940 and produce an output for every time step (e.g., a 10 ms audio frame). The utterance attention component 945 may be configured to aggregate information from different time intervals/audio frames of the input audio data to determine how certain parts of the utterance affects determining of the sentiment. For example, an acoustic representation of a first word in the utterance may indicate a high arousal implying anger, in which case the utterance attention component 945 is configured to realize that the first word corresponds to an anger sentiment and that that should affect the processing of the other words in the utterance to ultimately determine a sentiment category corresponding to the utterance.

The utterance attention component 945 may output score(s) 950 indicating a sentiment category 955 for the user audio data 915. The sentiment detection component 275 may predict from multiple sentiment categories, including but not limited to, happiness, sadness, anger and neutral. In an example embodiment, the sentiment category 955 may be determined after score(s) 950 have been determined for a particular period of time of input audio data. In an example embodiment, the sentiment categories may be broad such as positive, neutral, and negative or may be more precise such as angry, happy, distressed, surprised, disgust, or the like.

In some embodiments, the sentiment detection component 275 is configured to determine a sentiment category 975 at an utterance-level. The sentiment detection component 275 may use contextual information from the entire utterance to determine an overall sentiment of the speaker when speaking the utterance. The sentiment detection component 275 may also use information conveyed by individual words in the utterance to determine the sentiment of the speaker when speaking the utterance. For example, particular words may represent a particular sentiment or emotion because of its meaning (lexical information), while some words may represent a particular sentiment or emotion because of the way it is spoken by the user (acoustic information). In other embodiments, the sentiment detection component 275 may be configured to determine a sentiment category on a word level (that is for each word within an utterance).

As illustrated in FIG. 9, the trained model component 965 may process the utterance feature vector(s) 960 using a fully-connected neural network trained using techniques known to one of skill in the art. The trained model component 965 may output score(s) 970 indicating a sentiment category 975 for the user audio data 915.

The sentiment detection component 275 may predict one of three sentiment categories 955/975. In some examples, the sentiment categories 955/975 may be positive, neutral, and negative. However, the disclosure is not limited thereto, and in other examples the sentiment categories 955/975 may be angry, neutral (e.g., neutral/sad), and happy without departing from the disclosure. Additionally or alternatively, the sentiment detection component 275 may predict any number of sentiment categories 955/975 without departing from the disclosure. For example, the sentiment detection component 275 may predict one of four sentiment categories 955/975, such as angry, sad, neutral, and happy, although the disclosure is not limited thereto.

The machine learning model for the trained model component 940/965 may take many forms, including a neural network. The trained model component 940/965 may employ a convolutional neural network and/or may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 10:
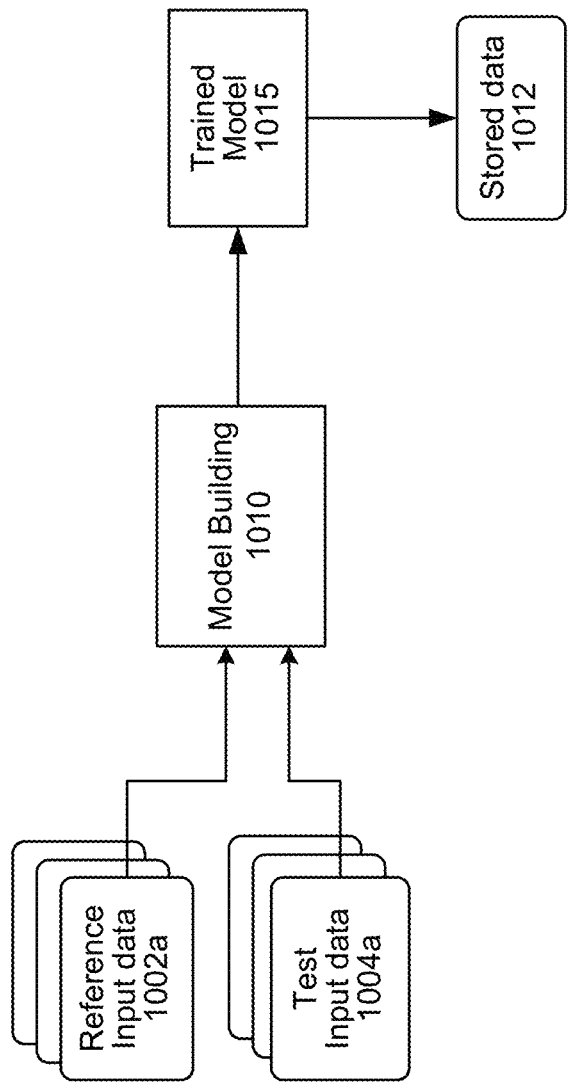
FIG. 10 is a conceptual diagram of building the trained model using training data according to embodiments of the present disclosure.

FIG. 10 conceptually illustrates components for training a machine learning (ML) model for sentiment detection using a baseline. The sentiment detection component 275 may include a model building component 1010. The model building component 1010 may be a separate component included in the system 100.

The model building component 1010 may train one or more machine learning models to determine a sentiment corresponding to a user input based on the user's neutral emotional state represented by a baseline/reference input data. The model building component 1010 may train the one or more machine learning models during offline (e.g., not in direct response to a user query) operations. The model building component 1010 may train the one or more machine learning models using a training dataset.

The training dataset may include a pair of input data, one representing a neutral emotional state of a speaker and the other representing a non-neutral emotional state of the speaker. For example, the reference input data 1002a may represent a first speaker's neutral emotional state, and the test input data 1004a may represent the first speaker's non-neutral (e.g., angry) emotional state. The reference input data 1002b may represent a second speaker's neutral emotional state and the test input data 1004b may represent the second speaker's non-neutral (e.g., happy) emotional state. The pair of input data 1002 and 1004 may make up the training dataset used by the model building component 1010 to train a ML model to detect sentiment using a baseline. The test input data 1004 may be annotated or labeled with the sentiment category corresponding by the test input data.

In some examples, the input data 1002/1004 may correspond to audio data, image data, and/or text data, although the disclosure is not limited thereto. For example, the training dataset may include any combination of audio data, image data, and/or text data to assist the model building component 1010 in training the ML model to perform sentiment detection.

As part of the training process, the model building component 1010 may determine weights and parameters associated with various layers of the trained model 1015. The weights and parameters corresponding to the final state of the trained model 1015 may be stored as stored data 1012.

FIG. 11 is a system flow diagram illustrating offline environment processing to generate an environment map and three-dimensional entities according to embodiments of the present disclosure. As illustrated in FIG. 11, the system 100 may perform offline environment processing 1100 to generate an environment map 1160 and/or to determine 3D entities/embeddings 1170. Such offline processing may occur when the system/device 110 is not directly interacting with a user/processing a user command. As described above, the environment map 1160 may represent the environment around the device 110, while the 3D entities/embeddings 1170 may represent objects included within the environment.

In some examples, the environment map 1160 may correspond to a map of the environment, although the disclosure is not limited thereto. For example, the environment map 1160 may correspond to a floor map (e.g., floorplan) or other map representing the environment around the device 110. The map may represent a two-dimensional aspect of the environment and/or may incorporate three-dimensionality as well (for example indicating that a certain X-Y bounding box may represent a floor at one point (e.g., zero) on a Z axis but may represent another surface such as a tabletop at a different point (e.g., several feet above the floor) on the Z axis. If the device 110 is stationary, the environment map 1160 may correspond to a single room in which the device 110 is located. However, the disclosure is not limited thereto, and the environment map may include multiple rooms or information about the entire building in which the device 110 is located without departing from the disclosure. In addition, if the device 110 is mobile and/or motile (e.g., capable of autonomous motion), the environment map 1160 may include multiple rooms, buildings, and/or locations without departing from the disclosure.

Additionally or alternatively, the environment map 1160 may include keypoints or particular locations within the environment that may be beneficial for the device 110 to perform localization and/or navigation. For example, in some examples the device 110 may tour the environment and capture the environment using one or more sensors (e.g., camera, depth sensor, and/or the like), enabling the system 100 to extract keypoints from the environment. These keypoints correspond to landmarks or fixed locations within the environment, such as a doorway, a stationary object (e.g., refrigerator, table, mirror, etc.), portion of a stationary object (e.g., corner of the table, corner of the mirror, etc.), an individual room (e.g., kitchen, living room, etc.), and/or the like. The keypoints may include both navigational landmarks (e.g., easily identifiable object or location that the device 110 may use to perform localization and/or navigation) and/or contextual landmarks (e.g., labels assigned to individual areas or rooms within the environment, enabling the device 110 to respond to a voice command with precision) without departing from the disclosure. Using the keypoints extracted from the environment, the system 100 can build to scale a 3D model of the environment. For example, the environment map 1160 may include depth information and/or distances between the keypoints, indicating relative distances and enabling the device 110 to perform localization and/or navigation within the environment.

The 3D entities/embeddings 1170 correspond to objects/entities with which the system 100 may populate the environment map 1160. For example, the system 100 may perform object detection using image data captured by the device 110 to identify discrete objects and associate the objects with a static location within the environment. In some examples, the system 100 may perform object detection to generate two-dimensional (2D) bounding boxes associated with individual objects and then may perform clustering to cluster the 2D bounding boxes into 3D objects. The system 100 associates a 3D object with a particular location (e.g., 3D coordinates [x, y, z], although the disclosure is not limited thereto) along with the 2D bounding boxes and other features associated with the object. Thus, the 3D entities/embeddings 1170 include a plurality of objects and corresponding locations in 3D, along with a list of 2D bounding boxes and/or 2D features for each of these locations.

As the 3D entities/embeddings 1170 include 3D information for a particular object, such as 3D coordinates indicating a location associated with the object, the system 100 may populate the environment map 1160 with the 3D object and determine relative distances between 3D object(s), keypoint(s), the device 110, and/or the like. In addition, as the 3D entities/embeddings 1170 maintain the 2D bounding boxes and other features associated with the object, the system 100 may process the 2D bounding boxes and other features using 2D model(s) without departing from the disclosure. For example, the system 100 may include a 2D model that is trained using 2D images and text, such as a multimodal model that understands text and 2D image contents. As each 3D object is associated with the 2D bounding boxes and other 2D features, the system 100 can use the 2D model to perform processing in 3D without departing from the disclosure.

Using the environment map 1160 and the 3D entities/embeddings 1170, the system 100 may model the environment of the user and multiple objects located within the environment. For example, the system 100 may generate an augmented floor map that represents the environment and the objects, enabling the system 100 to perform dynamic entity resolution based on objects in proximity to the device 110. The entity data 1170 may also include time information indicating when an object was detected at a certain location in the environment, thus allowing the system to track object movement in the environment over time. This may enable the system to create different "snapshots" of the environment over time using, for example, the environment map 1160 and entity data 1170. The system may also, if configured and permitted to do so, store information regarding which user(s) (for example identified using user recognition component 295) interacted with an object at a particular time. In this manner the system may be configured to note when a particular user moved a particular object so the system can respond to a particular user query regarding the object's movement.

Referring back to FIG. 11, offline environment processing 1100 illustrates an example of the system 100 performing offline processing 1110. For example, the system 100 may process historical data 1120 that includes image data captured by the device 110. As used herein, image data may include an individual image and/or a series of images, which may be part of a video, although the disclosure is not limited thereto. In some examples, the historical data 1120 may include tour data (e.g., home tour data), which the device 110 may capture as part of an explicit enrollment or initialization period. For example, if the device 110 is motile, the device 110 may conduct a tour to explore the environment in order to generate tour data that may be useful in building the environment map 1160. However, the disclosure is not limited thereto, and additionally or alternatively the historical data 1120 may include image data captured by the device 110 as part of an implicit scanning period. For example, the device 110 may scan the environment to capture images representing objects located within the environment.

As illustrated in FIG. 11, the system 100 may perform localization and mapping 1130 using the historical data 1120 (e.g., video) (e.g., step "1"). For example, the system 100 may process a portion of the historical data 1120 (e.g., short time window within the video) to perform localization and determine where the device 110 is relative to the environment. In some examples, the system 100 may localize the camera capturing the video, such as by retrieving 3D coordinates (e.g., [x, y, z]) associated with the camera as well as pose data indicating an orientation of the camera (e.g., where the camera is looking relative to the device). Using the 3D coordinates and the pose data, the system 100 may estimate a field of view (FOV) of the camera and/or additional information to enable the system 100 to generate the environment map 1160.

Based on the localization, the system 100 may perform mapping to map the environment and determine keypoints associated with the environment. As illustrated in FIG. 11, the system 100 may generate the environment map 1160 representing the map and/or keypoints (e.g., step "2"). This environment map 1160 may be used by the system 100 (e.g., system(s) 120 and/or the device 110) during runtime processing, as described in greater detail below with regard to FIG. 13. In addition, the system 100 may output the localization data to a 3D object detection component 1150 (e.g., step "3") without departing from the disclosure.

As illustrated in FIG. 11, the system 100 may also perform class-agnostic object detection 1140 using the historical data 1120 (e.g., video) (e.g., step "4"). For example, the system 100 may perform the class-agnostic object detection 1120 to detect 2D objects represented in the historical data 1120 and determine bounding boxes and/or embeddings associated with the 2D objects. The system may output the bounding boxes and embeddings to the 3D object detection component 1150 (e.g., step "5") for additional processing. Although not shown separately, components 1140 and/or 1150 may also perform object recognition, e.g., matching the image data of the object representation to a catalog identifying particular entities and thus match a detected object with specific data corresponding to that object. Such object specific data may be cataloged separately and/or in conjunction with data 1170 discussed herein.

The 3D object detection component 1150 may receive the localization data along with the bounding boxes and/or embeddings and may perform 3D object detection to generate 3D entities and embeddings. For example, the 3D object detection component 1150 may perform clustering to cluster the 2D bounding boxes and convert the 2D object to a 3D object associated with a 3D location within the environment. The 3D object detection component 1150 may generate 3D entities/embeddings 1170 representing the 3D entities and/or embeddings (e.g., step "6"), which may be used by the system 100 during runtime processing.

As discussed herein, as the device traverses the environment 390 it may update the object data/3D entities/embeddings 1170 to incorporate new information of an object as the object moves in the environment. FIGS. 12A-12B illustrate a system updating object information as the object moves about an environment according to embodiments of the present disclosure. For example, FIG. 12A illustrates an environment 390 at Time A into Time B 1202. At Time A, device 110 is located at position 1 1212, which is located in a room labeled "kitchen." Pursuant to data determined, for example, using processes discussed above in reference to FIG. 11, the device 110 has position data (which may be based on environment map data 1160) that indicates the device's position in the kitchen (e.g., position 1 1212) at Time B.

As illustrated in FIG. 12A, as Time A progresses to Time B, the device 110 moves from position 1 1212 (in the kitchen) to position 2 1214 (in the living room). In doing so the device 110 may capture image data corresponding to a variety of images captured by one or more image sensors of device 110. Each image may correspond to a particular position (e.g., location and/or pose) of the device 110 corresponding to the position of the device at the time the image was taken. Such position data may be based at least in part on the environment map data (which may assist the device in determining its location with the environment) as well as sensor data of the device (which may assist the device in determining its pose). Position data may also be based on data from other devices/sensors such as image data from other cameras which can be used to locate the device 110 within the environment, motion sensors in the environment, sound detection devices in the environment, etc. Although three such image capture locations are illustrated, the number of such images may vary.

In the example of FIG. 12A, the cameras of device 110 may be pointed toward the dining room such that in each of the images the device 110 captures a different view of the dining room as viewable through the image sensor(s) of device 110. The system may perform object recognition on the images to detect and recognize different object(s) shown in those images. Based on the object detection/recognition operations the system may determine that the object is a toolbox 1216. Further, based on the position of the device 110 at the time the image(s) were taken the system may determine that the toolbox 1216 is at position 3 1218, which may correspond to a corner of a table within the dining room. The device 110 may then update object data 1170 to indicate at the toolbox 1216 was at position 3 1218 at Time B (or between the times of Time A and Time B as appropriate).

A later time is illustrated in FIG. 12B, which shows the environment as Time C progresses to Time D 1204. During that time period device 110 may be located at position 2 1214. At Time C, at least one camera of device 110 may be pointed toward the dining room. At Time C a user 5 may pick up the toolbox 1216 from its location at position 3 1218 and move it, walking (from Time C to Time D) from the dining room into the office, where the user 5 places the toolbox 1216 at position 4 1220 at Time D. The device 110 may capture image data showing the user moving the toolbox as illustrated. Using user recognition component 295, the device 110 may identify the user 5 who moved the toolbox and may associated an identifier of the user with the object data corresponding to the position of the toolbox 1216 at Time C. Thus the device 110 may store data associating the toolbox 1216, user 5, position 3 1218 and Time C. Such data may, for example, be stored as part of object data 1170.

Once the toolbox 1216 is placed at position 4 1220 at Time D the device 110 may, using image data and object positioning operations such as those described here, determine the object toolbox 1216 has been moved to position 4 1220 (which is represented by appropriate position data). The device 110 may then store data associating the toolbox 1216, user 5, position 4 1220 and Time D. In this manner the system may update object information to keep a current catalog of object locations within an environment.

Figure 13:
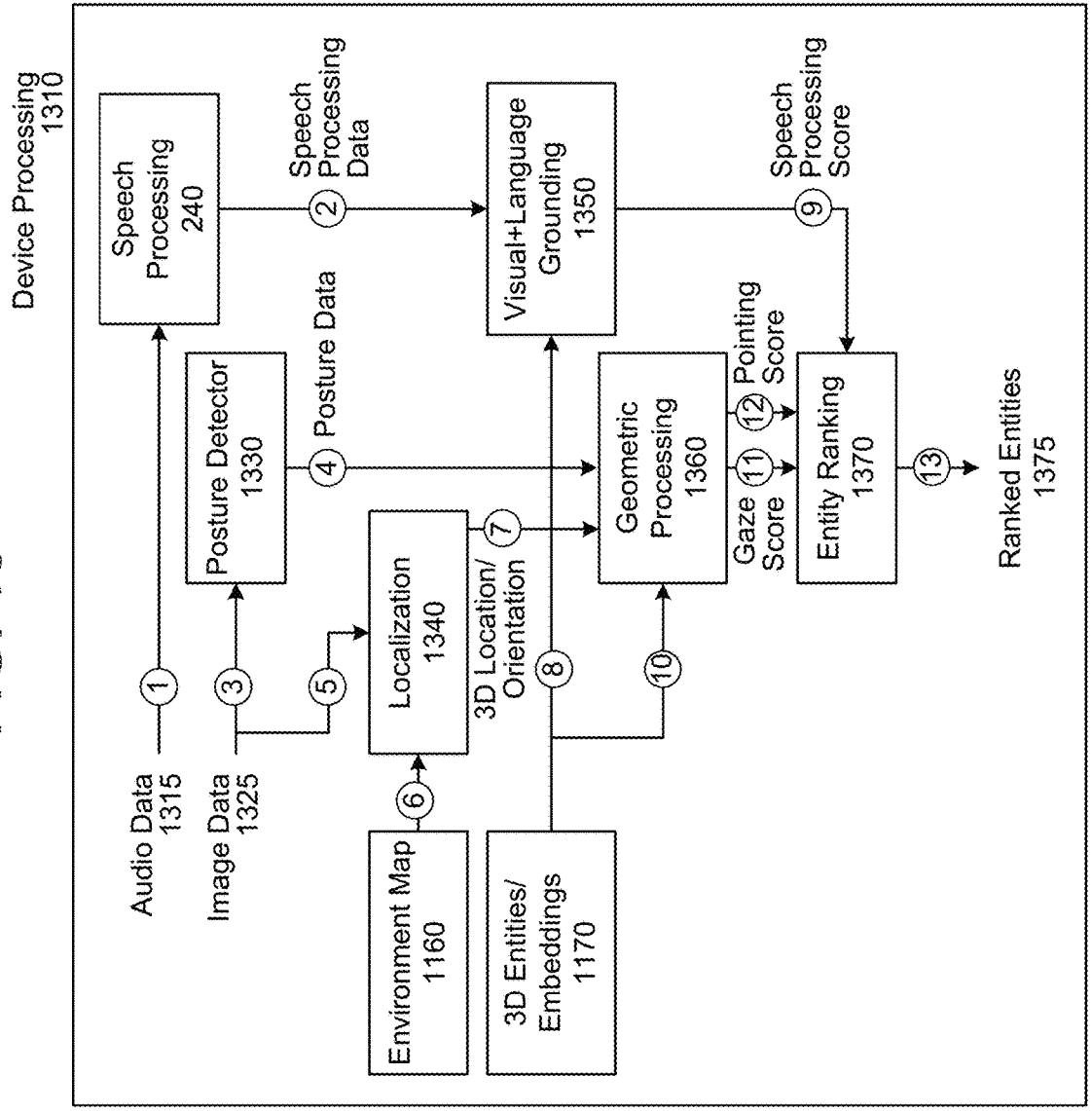
FIG. 13 is a system flow diagram illustrating dynamic entity resolution using an environment map and three-dimensional (3D) entities according to embodiments of the present disclosure.

FIG. 13 is a system flow diagram illustrating dynamic entity resolution using an environment map and three-dimensional (3D) entities according to embodiments of the present disclosure. As illustrated in FIG. 13, the device 110 may utilize the environment map 1160 and/or the 3D entities/embeddings 1170 described above to perform speech processing and generate ranked entities 1375. Thus, the environment map 1160 and the 3D entities/embeddings 1170 enable the system 100 to perform dynamic entity resolution to improve an accuracy of the speech processing and improve a user experience.

Referring back to FIG. 13, runtime environment processing 1300 illustrates an example of the device 110 performing device processing 1310 using the environment map 1160 and/or the 3D entities/embeddings 1170. For example, the device 110 may generate audio data 1315 representing a voice command (e.g., utterance) and image data 1325 corresponding to the voice command and may process the audio data 1315 and the image data 1325 to determine the voice command.

As illustrated in FIG. 13, the device 110 may begin device processing 1310 by generating or receiving the audio data 1315 representing the voice command and inputting the audio data 1315 to a speech processing component 240240 (e.g., step "1"). For example, the device 110 may generate the audio data 1315 using one or more microphones and the speech processing component 240 may perform automatic speech recognition (ASR) processing, speech-to-text processing, and/or the like to generate speech processing results data that represents the content corresponding to the voice command. After determining the speech processing results data that corresponds to the voice command, the speech processing component 240 may output the speech processing results data to a visual and grounding component 1350 (e.g., step "2"). 240The speech processing 240results data may include ASR results data (e.g., text data), natural language understanding (NLU) data, and/or the like.

The device 110 may generate or receive the image data 1325 corresponding to the audio data 1315 and may input the image data 1325 to a posture detector component 1330 (e.g., step "3"). In some examples, the device 110 may generate the image data 1325 using one or more cameras 116, although the disclosure is not limited thereto. The posture detector component 1330 may process the image data 1325 to determine posture data associated with the user. For example, the posture detector component 1330 may determine that at least a portion of the user is represented in the image data 1325 and may generate and send posture data (e.g., step "4") indicating the posture of the user and how that may be used by the system. For example the postured data may include gaze data, and/or pointing data associated with the user. The posture detector component 1330 may also determine other information related to the user's posture which may be useful in determine which entity the user may be referring to.

The gaze information may indicate a gaze direction (e.g., a direction in which a user's face is oriented), which represents the direction in which the user is looking, while the pointing information may indicate a pointing direction and/or other information associated with a gesture. For example, the posture detector component 1330 may locate anchor points associated with the user, such as facial anchor points (e.g., left eye, right eye, left ear, right ear, nose, etc.), body anchor points (e.g., left shoulder, right shoulder, left elbow, right elbow, etc.), and/or the like, and may use these anchor points to determine the gaze direction. Additionally or alternatively, the posture detector component 1330 may use these anchor points to determine the pointing information, which indicates a direction in which the user is pointing. Thus, the posture detector component 1330 may distinguish between where the user's face is directed and where the user is pointing without departing from the disclosure.

In some examples, the device 110 may optionally send the image data 1325 to a localization component 1340 (e.g., step "5"). To perform localization, the localization component 1340 may also receive the environment map 1160 described above (e.g., step "6"). Thus, the localization component 1340 may perform localization using the image data 1325 and the environment map 1160 to determine a three-dimensional (3D) location and/or orientation associated with the device 110. For example, the localization component 1340 may detect objects and/or distinguishable features represented in the image data 1325 and use these objects/features to determine the 3D location of the device 110 relative to the environment map 1160 and/or how the device 110 is oriented within the environment map 1160. However, the disclosure is not limited thereto and in some examples the localization component 1340 may receive additional information, such as sensor data, with which to perform localization. The localization component 1340 may generate location data indicating the 3D location and/or orientation of the device 110 and may send the location data to a geometric processing component 1360 (e.g., step "7").

As described above, the speech processing component 240 may output the speech processing results data to the visual and language grounding component 1350 in step "2". In addition, the visual and grounding component 1350 may receive 3D entities/embeddings 1170 described above with regard to FIG. 11. For example, the 3D entities/embeddings 1170 may indicate 3D objects within the environment, which the visual and language grounding component 1350 may use to generate a speech processing results score. The visual and language grounding component 1350 may output the speech processing results score to an entity ranking component 1370 (e.g., step "9"). The entity ranking component 1370 may be included as part of, or may be in communication with, ranker 2390 discussed below.

Prior to the entity ranking component 1370, the device processing 1310 may include the geometric processing component 1360 configured to perform geometric processing. As described above with regard to steps 3-4, the geometric processing component 1360 may receive the posture data indicating gaze information and/or pointing information from the posture detector component 1330. In addition, the geometric processing component 1360 may receive the location data indicating the 3D location and/or orientation of the device 110 from the localization component 1340 in step 8. Finally, the geometric processing component 1360 may receive the 3D entities/embeddings 1170 (e.g., step "10").

Using these inputs, the geometric processing component 1360 may perform geometric processing to generate a gaze score (e.g., step "11") and a pointing score (e.g., step "12") for a 3D object represented in the 3D entities/embeddings 1170. For example, the geometric processing component 1360 may use the location data to determine the 3D location of the device 110 along with the orientation of the device 110 within the environment map 1160. Based on this location and orientation, the geometric processing component 1360 may determine whether the gaze information and/or the pointing information correspond to an individual object represented in the 3D entities/embeddings 1170. For example, the geometric processing component 1360 may determine a first gaze score for a first 3D object by extrapolating the gaze direction included in the gaze information from an origin corresponding to the 3D location of the device 110. In some examples, the gaze score may represent a likelihood (e.g., confidence score) that the user is looking at the first object based on the gaze information, although the disclosure is not limited thereto. Similarly, the pointing score may represent a likelihood (e.g., confidence score) that the user is pointing at the first object based on the pointing information.

Based on the gaze score and the pointing score received from the geometric processing component 1360, along with the speech processing results score received from the visual and language grounding component 1350, the entity ranking component 1370 may generate a ranked list of entities (e.g., ranked entities 1375). Thus, the entity ranking 1370 may use the combination of the three scores (e.g., gaze score, pointing score, and speech processing results score) to perform dynamic entity resolution, although the disclosure is not limited thereto and the entity ranking 1370 may only use some of the scores without departing from the disclosure. The entity ranker 1370 may also consider time data (not illustrated) to consider which time-related entities to rank. For example, if a user is interacting with a device showing a video and asks "go to the part where the flour is mixed with the milk" the system may use time data associated with images of a video to determine which frame to start a video on (e.g., a frame associated with mixing flour and milk).

To illustrate an example, a first object may have a high gaze score, indicating that the first object is associated with the gaze information (e.g., the user appears to be looking in a first direction of the first object). Meanwhile, a second object may have a high pointing score, indicating that the second object is associated with the pointing information (e.g., the user appears to be pointing in a second direction of the second object). Finally, a third object may have a high speech processing results score, indicating that the third object is associated with the speech processing results representing the voice command. If the first object has both a high gaze score and a high speech processing results score, the entity ranking component 1370 may rank the first object highly within the ranked entities 1375.

Figure 14:
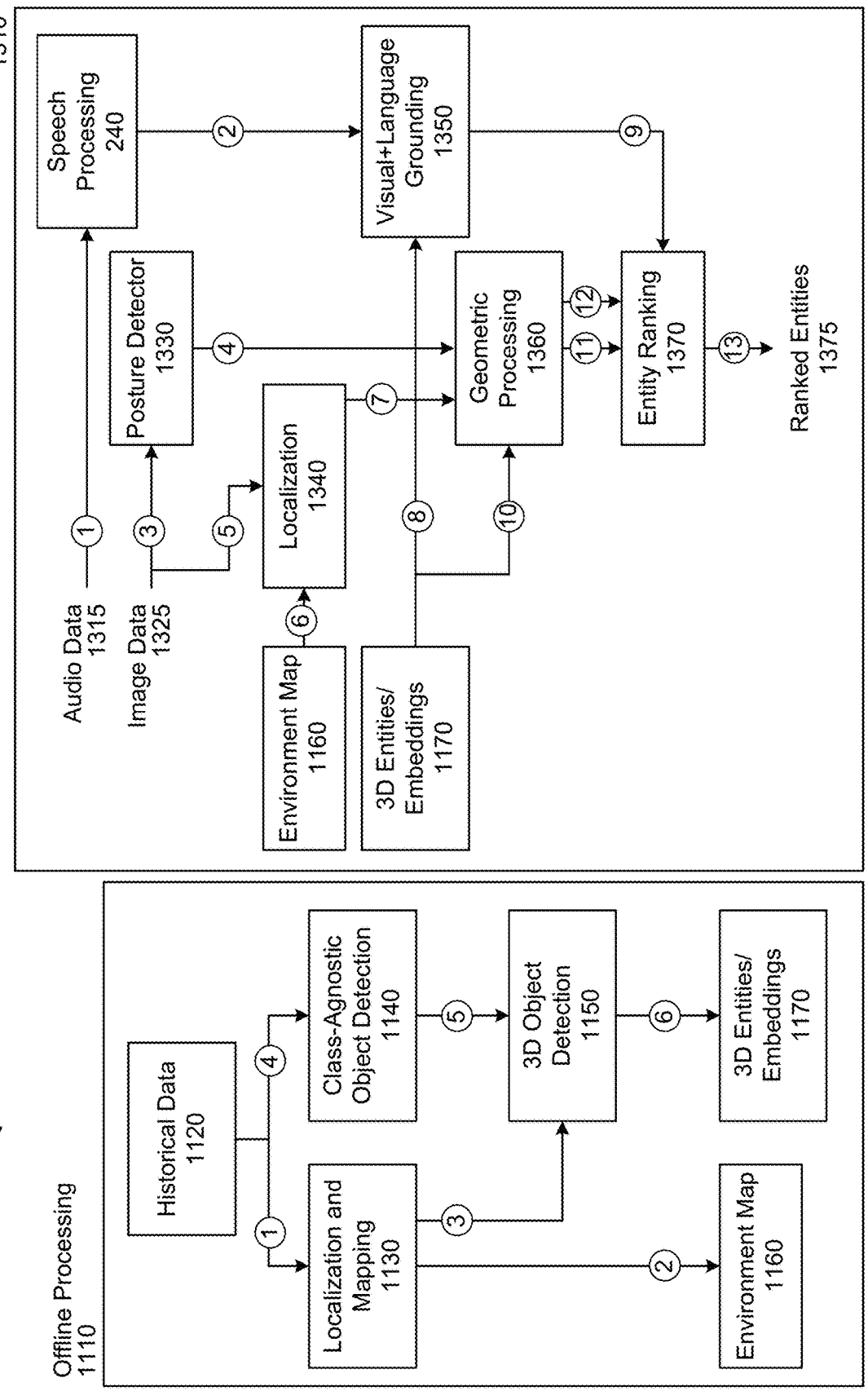
FIG. 14 is a system flow diagram illustrating dynamic entity resolution processing according to embodiments of the present disclosure.

FIG. 14 is a system flow diagram illustrating dynamic entity resolution processing according to embodiments of the present disclosure. As illustrated in FIG. 14, situation aware query response processing 1400 may include both the offline processing 1110 described above with regard to FIG. 11 and device processing 1310 described above with regard to FIG. 13. As the components illustrated in FIG. 14 are described in greater detail above with regard to FIGS. 11-13, a corresponding description is omitted.

In some examples, the offline processing 1110 may be performed by the system(s) 120 or other component remote from the device 110 (e.g., associated with a different location than the device 110), while the device processing 1310 may be performed by the device 110 itself. However, the disclosure is not limited thereto, and in other examples the offline processing 1110 may be performed by a home server or other component that is separate from the device 110 but associated with the same location as the device 110 without departing from the disclosure. Additionally or alternatively, the device 110 may perform both the offline processing 1110 and the device processing 1310 without departing from the disclosure.

Figure 15:
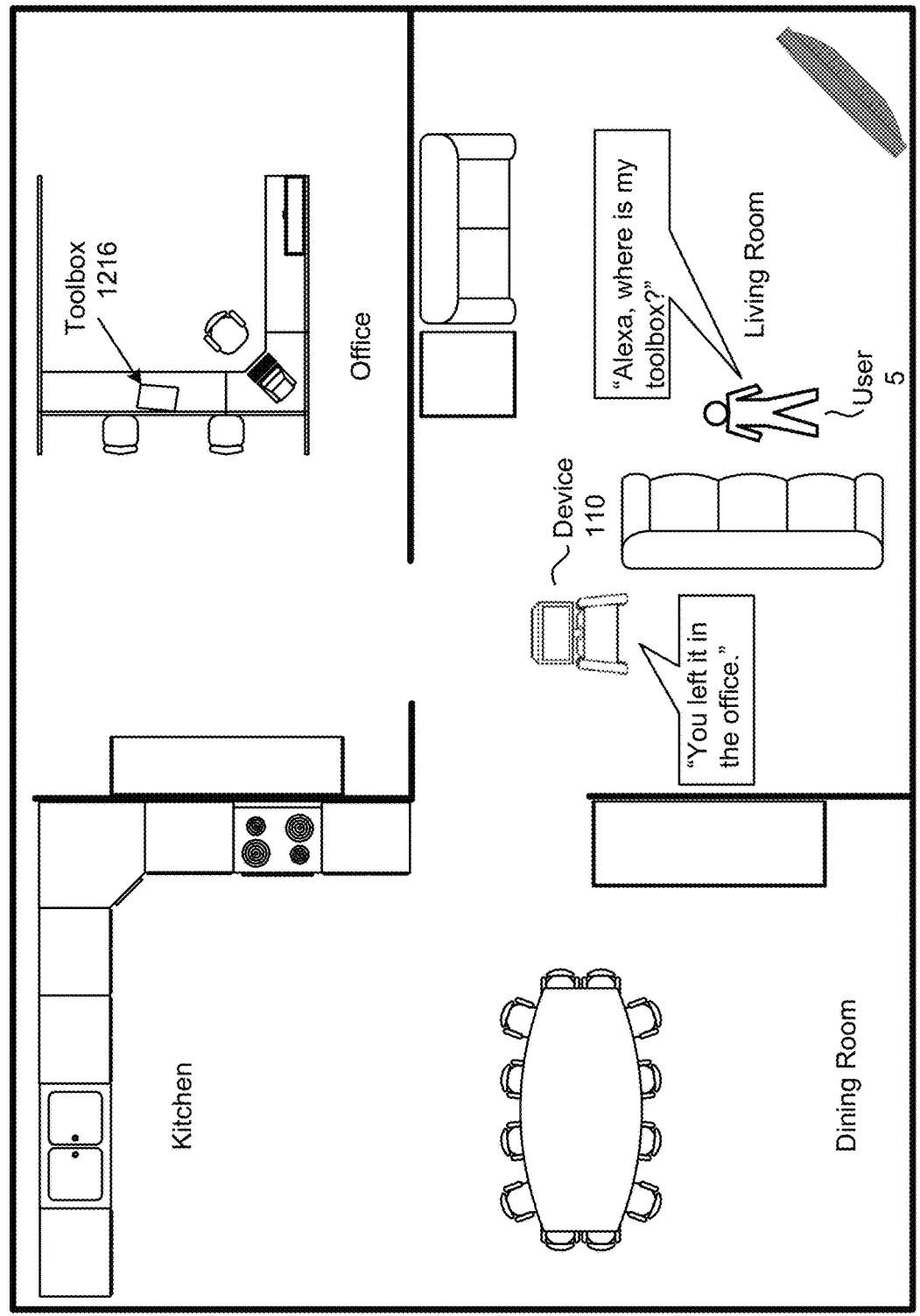
FIG. 15 illustrates a system configured to perform dynamic entity resolution processing according to embodiments of the present disclosure.

The device 110/system 120 may use the architecture/operations/data illustrated in FIGS. 11, 13, and 14 to perform various operations, such as responding to user queries. Returning to the example of FIGS. 12A-12B, at some later Time E 1502, as illustrated in FIG. 15, the user 5 may speak a query to device 110, such as "Alexa, where is my toolbox?" The device 110 may perform speech processing to determine that the user is asking about a location of the particular object toolbox 1216. (For example using entity ranking operations discussed herein.) The system may use an identifier of object 1216 to lookup object data 1170 corresponding to the toolbox 1216. The device 110 may then receive the stored data that associates the toolbox 1216, user 5, position 4 1220 and Time D. The device 110 may even retrieve the stored data that associates the toolbox 1216, user 5, position 3 1218 and Time C for comparison. The device 110 may then create output data indicating that the user 5 moved the toolbox 1216 from position 3 1218 to position 4 1220 and may perform speech synthesis/TTS processing to create output data indicating the new position of the toolbox 1216 as well as the involvement of user 5 in moving it there, for example "you left it in the office."

Figure 16:
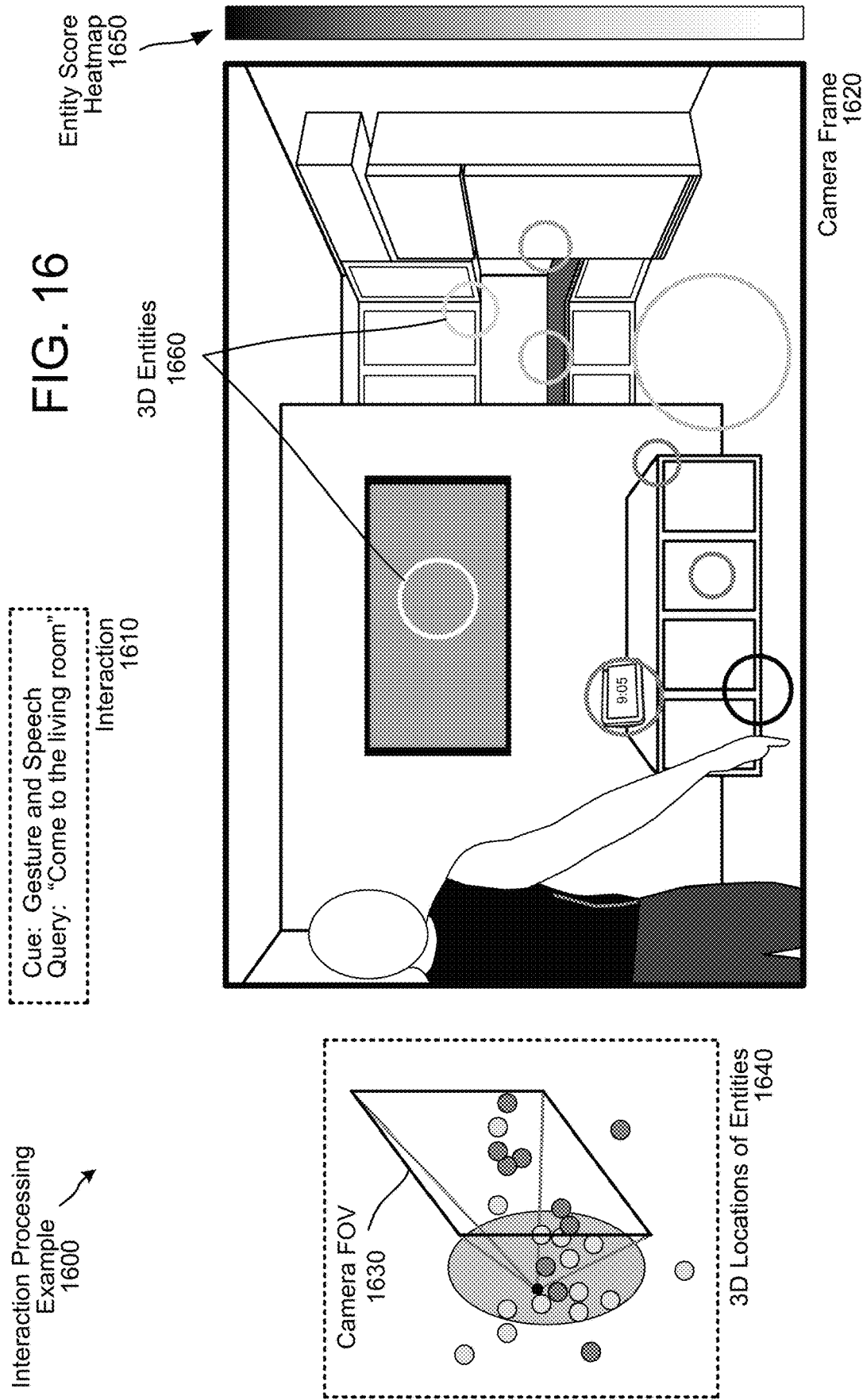
FIG. 16 illustrates an interaction processing example involving input speech and gestures according to embodiments of the present disclosure.

As noted above, the system may also use user posture information to determine what object a user refers to for purpose of later actions. For example, FIG. 16 illustrates an interaction processing example involving input speech and gestures according to embodiments of the present disclosure. As described above, the device 110 may use the environment map 1160 and the 3D entities/embeddings 1170 to perform dynamic entity resolution and interpret voice commands and/or gestures from the user. FIG. 16 includes a first interaction processing example 1600 that illustrates a first conceptual example of how the device 110 may process the input data (e.g., audio data and image data) to respond to a voice command.

As illustrated in FIG. 16, the user may begin an interaction 1610 using a combination of gestures and speech. For example, the user may say "Come to the living room" and point to a spot on the floor of the living room. To interpret this interaction 1610, the device 110 may perform the device processing 1310 described above to correctly identify where the user would like the device 110 to be. For example, the device 110 may generate audio data representing the voice command and may process the audio data to generate text of the voice command (e.g., "Come to the living room"). In addition, the device 110 may generate image data, which is illustrated in FIG. 16 as camera frame 1620.

Using the environment map 1160, the device 110 may determine a location and orientation of the device 110 relative to the environment. As the environment map 1160 is populated with the 3D entities/embeddings 1170, the device 110 may determine a position of each of the 3D entities/embeddings 1170 relative to the device 110. For example, the device 110 may determine pose data indicating a position/orientation of the camera relative to the device 110, which may be used to determine a direction of the camera and therefore which portion of the environment map 1160 is represented in the image data. This is illustrated in FIG. 16 as the camera field of view (FOV) 1630, which represents the projected image captured by the camera.

The device 110 may interpret the camera FOV 1630 within the environment map 1160 to determine which of the 3D entities/embeddings 1170 are represented in the image data. As illustrated in FIG. 16, 3D locations of entities 1640 illustrates an example in which the device 110 represented as a black dot in the middle, the camera FOV 1630 extends from the device 110 in the direction in which the camera is pointed, and the 3D entities/embeddings 1170 are represented at appropriate positions relative to the device 110.

Using the device processing 1310 described above, the device 110 may interpret the input data to determine the ranked entities 1375 corresponding to the voice command. In some examples, the ranked entities 1375 may include an entity score (e.g., confidence score or other variable) for each of the entities included in the 3D entities/embeddings 1170. For example, the device 110 may determine a first entity score indicating a likelihood that a first entity corresponds to the voice command.

FIG. 16 illustrates an example of 3D entities 1660 represented in the camera frame 1620, with an individual entity score for each of the 3D entities 1660 indicated by an entity score heatmap 1650. For example, the entity score heatmap 1650 represents entity score values as a color ranging from white (e.g., low entity score, corresponding to a low likelihood that the entity corresponds to the voice command) to black (e.g., high entity score, corresponding to a high likelihood that the entity corresponds to the voice command). As illustrated in FIG. 16, most of the 3D entities 1660 have a relatively low entity score, while the 3D entity associated with the user's gesture has a relatively high entity score (e.g., represented in the camera frame 1620 as a black circle). Thus, the device 110 may process the input data and determine that the voice command corresponds to a request for the device 110 to travel to the location indicated by the gesture.

FIG. 17 illustrates an interaction processing example involving input speech and posture information according to embodiments of the present disclosure. FIG. 17 includes a second interaction processing example 1700 that illustrates a conceptual example of how the device 110 may process the input data (e.g., audio data and image data) to respond to a second voice command.

As illustrated in FIG. 17, the user may begin an interaction 1710 using a combination of gestures and speech. For example, the user may say "Come to the table here" and point to a table in front of the user. To interpret this interaction 1710, the device 110 may perform the device processing 1310 described above to correctly identify where the user would like the device 110 to be. For example, the device 110 may generate audio data representing the voice command and may process the audio data to generate text of the voice command (e.g., "Come to the table here"). In addition, the device 110 may generate image data, which is illustrated in FIG. 17 as camera frame 1720.

Using the environment map 1160, the device 110 may determine a location and orientation of the device 110 relative to the environment and the 3D entities/embeddings 1170, as described above with regard to FIG. 16. This is illustrated in FIG. 17 as the camera field of view (FOV) 1730 and the 3D locations of entities 1740. Using the device processing 1310 described above, the device 110 may interpret the input data to determine the ranked entities 1375 corresponding to the voice command. As described above with regard to FIG. 16, this is illustrated in FIG. 17 using an entity score heatmap 1750 and 3D entities 1760 represented in the camera frame 1720.

In addition to the processing described above, the device 110 may also perform object detection to detect objects represented in the camera frame 1720. For example, FIG. 17 illustrates an example of a bounding box 1770 corresponding to the user. When the device 110 determines that a human is represented in the image data, the device 110 may perform posture detection to determine posture information 1780. The posture information 1780 may indicate anchor points associated with the user, such as facial anchor points (e.g., left eye, right eye, left ear, right ear, nose, etc.), body anchor points (e.g., left shoulder, right shoulder, left elbow, right elbow, etc.), and/or the like. As described above, the device 110 may use these anchor points to determine the gaze direction and/or pointing information.

In the second interaction processing example 1700, the device 110 may not detect a gesture associated with the voice command, but may determine a gaze direction and use the gaze direction to increase the entity score associated with an entity (e.g., table) that is located behind the camera. Thus, the environment map 1160 and the 3D entities/embeddings 1170 enable the device 110 to know a position of entities relative to the device 110 even when the entities are not represented in the image data. In response to the voice command, the device 110 may move to the table associated with the gaze direction of the user.

Figure 18:
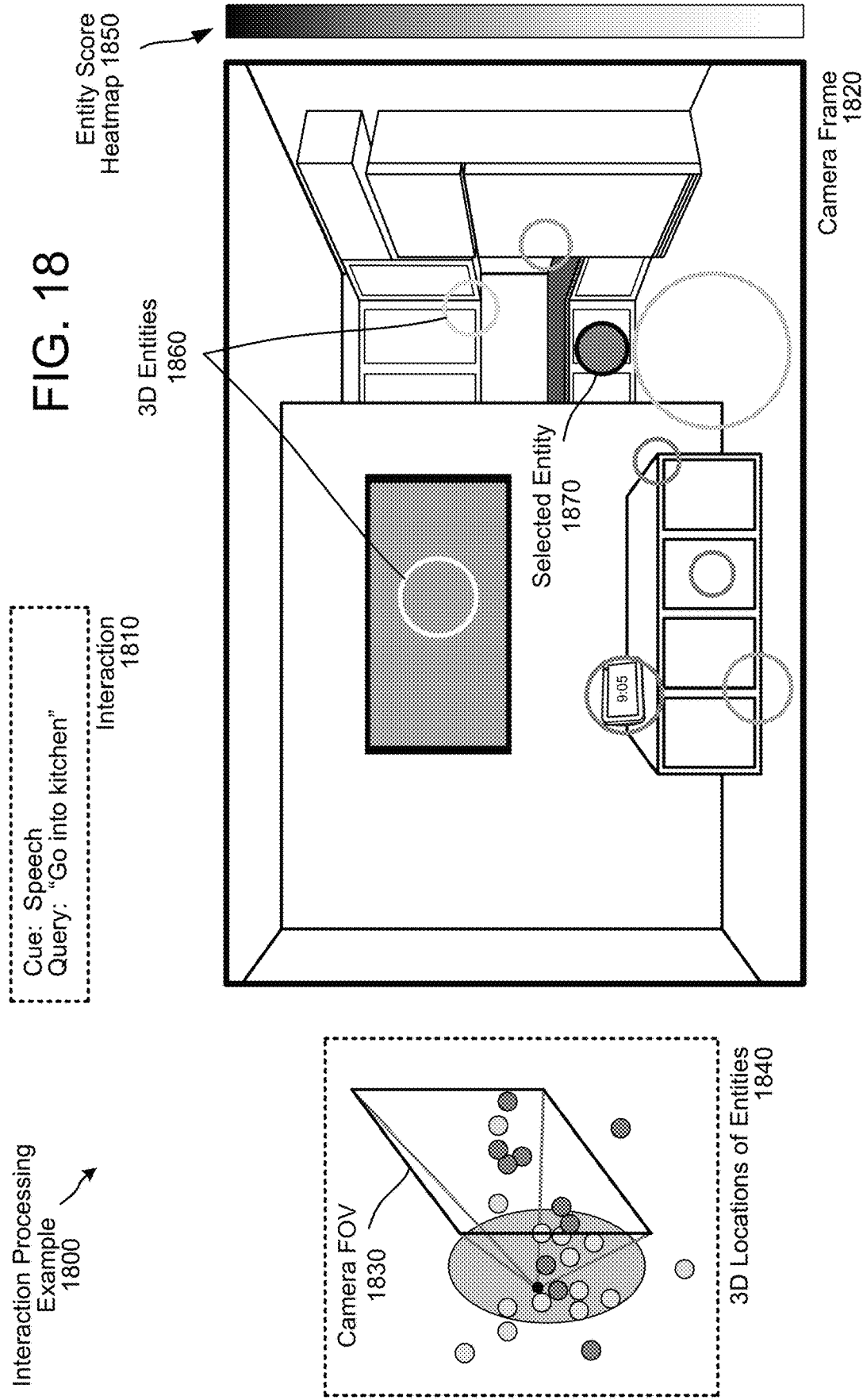
FIG. 18 illustrates an interaction processing example involving input speech representing a location command according to embodiments of the present disclosure.

FIG. 18 illustrates an interaction processing example involving input speech representing a location command according to embodiments of the present disclosure. FIG. 18 includes a third interaction processing example 1800 that illustrates a conceptual example of how the device 110 may process the input data (e.g., audio data and image data) to respond to a third voice command.

As illustrated in FIG. 18, in some examples the user may begin an interaction 1810 using only speech. For example, while the user is not represented in the image data, the user may say "Go into the kitchen." To interpret this interaction 1810, the device 110 may perform the device processing 1310 described above to correctly identify where the user would like the device 110 to be. For example, the device 110 may generate audio data representing the voice command and may process the audio data to generate text of the voice command (e.g., "Go into the kitchen"). In addition, the device 110 may generate image data, which is illustrated in FIG. 18 as camera frame 1820.

Using the environment map 1160, the device 110 may determine a location and orientation of the device 110 relative to the environment and the 3D entities/embeddings 1170, as described above with regard to FIG. 16. This is illustrated in FIG. 18 as the camera field of view (FOV) 1830 and the 3D locations of entities 1840. Using the device processing 1310 described above, the device 110 may interpret the input data to determine the ranked entities 1375 corresponding to the voice command. As described above with regard to FIG. 16, this is illustrated in FIG. 18 using an entity score heatmap 1850 and 3D entities 1860 represented in the camera frame 1820.

In the third interaction processing example 1800, the device 110 may not detect a gesture associated with the voice command, or even detect the user, but may determine a selected entity 1870 corresponding to the voice command. Thus, the environment map 1160 and the 3D entities/embeddings 1170 enable the device 110 to determine an entity score for entities in proximity to the device 110 to improve dynamic entity resolution. In response to the voice command, the device 110 may move to the kitchen associated with the selected entity 1870.

Figure 19:
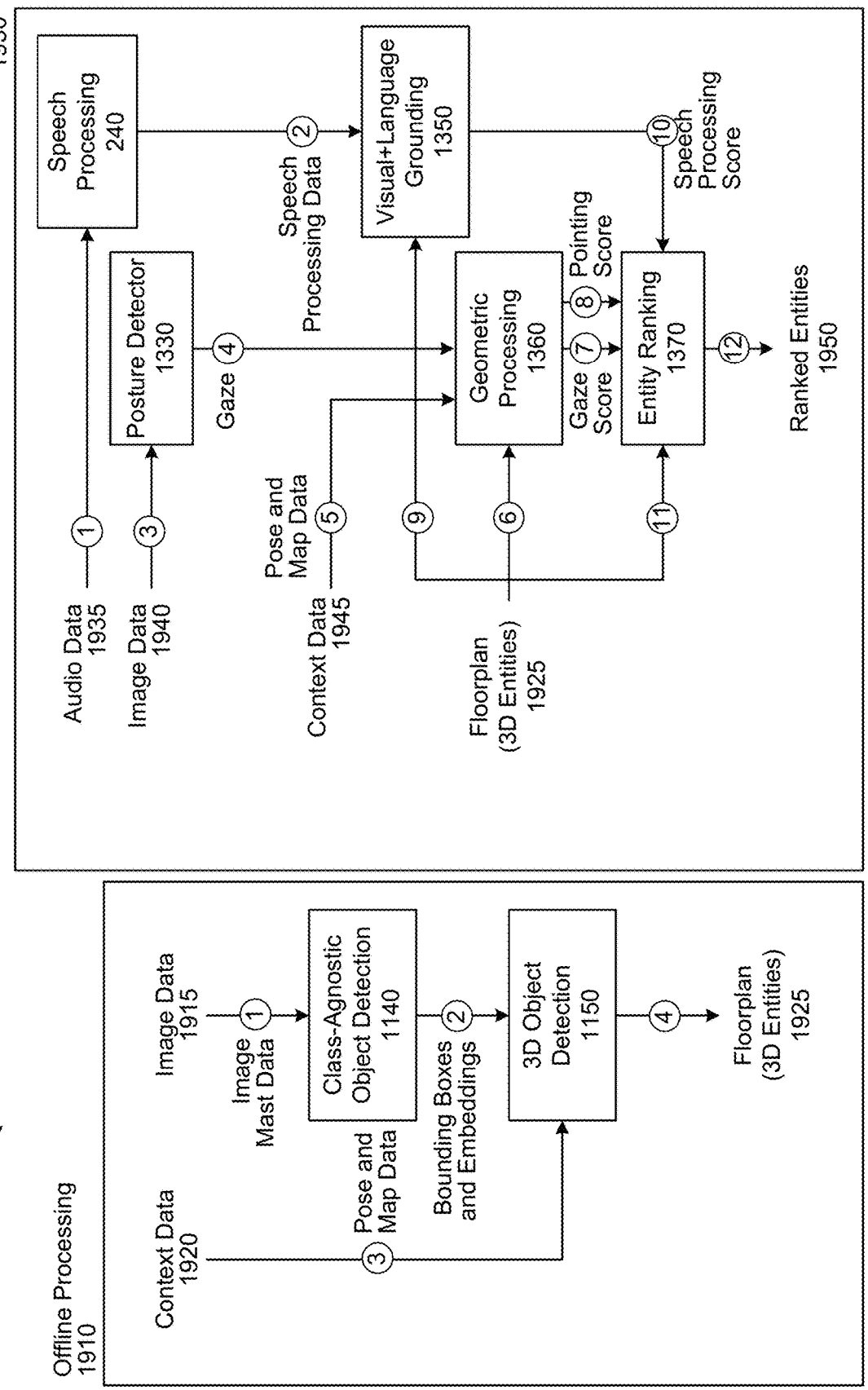
FIG. 19 is a system flow diagram illustrating dynamic entity resolution processing using on-device localization according to embodiments of the present disclosure.

FIG. 19 is a system flow diagram illustrating dynamic entity resolution processing using on-device localization according to embodiments of the present disclosure. As illustrated in FIG. 19, in some examples the system 100 may perform situation aware query response processing 1900 while performing on-device localization processing using existing components. Thus, the system flow diagram illustrated in FIG. 19 is similar to the system flow diagram illustrated in FIG. 14, except the localization processing is already being performed by other components of the device 110 and is not illustrated as part of FIG. 19. For example, offline processing 1910 still performs class-agnostic object detection 1140 and 3D object detection 1150, but instead of illustrating a localization and mapping component 1130 performing localization, the localization is performed by a separate component (not illustrated) and the 3D object detection component 1150 receives context data 1920 (e.g., pose and map data). Similarly, device processing 1930 omits the localization component 1340, as a separate component (not illustrated) performs localization to generate context data 1945 (e.g., pose and map data). Thus, the geometric processing component 1360 receives the context data 1945 generated by a separate localization component.

As shown by the situation aware query response processing 1900 illustrated in FIG. 19, offline processing 1910 may be performed using image data 1915 and context data 1920. The image data 1915 may be similar to the historical data 1120 described above, and may include image data captured by the device 110 as part of previous interactions, a home tour, and/or the like. In some examples, the image data 1915 may include information about the camera while the image data was captured by the device 110, such as information about the location of the camera relative to the device 110 and/or the like. The context data 1920 may include pose and map data. For example, the device 110 may perform localization and mapping using other components of the device 110 and may output this information to the 3D object detection component 1150 as context data 1920.

As illustrated in FIG. 19, the class-agnostic object detection component 1140 may receive the image data 1915 (e.g., step "1") and may perform object detection to generate bounding boxes and embeddings (e.g., step "2"), as described above with regard to FIG. 11. The class-agnostic object detection component 1140 may output the bounding boxes and embeddings to the 3D object detection component 1150, which may also receive the context data 1920 described above. Thus, the 3D object detection component 1150 may process the bounding boxes and embeddings along with the pose and map data to generate floorplan (3D entities) 1925. In some examples, the floorplan 1925 may combine the environment map 1160 and the 3D entities/embeddings 1170 described above, although the disclosure is not limited thereto.

As illustrated in FIG. 19, the device 110 may perform device processing 1930 by generating and/or receiving audio data 1935 and image data 1940. The device 110 may send the audio data 1935 to the speech processing component 240 (e.g., step "1") and the speech processing component 240 may perform speech processing to generate speech processing data representing the content of the voice command (e.g., step "2"). In addition, the device 110 may send the image data 1940 to the posture detector component 1330 (e.g., step "3") and the posture detector component 1330 may process the image data 1940 to generate posture data (e.g., step "4") which may, for example, include gaze data and pointing data, as described in greater detail above with regard to FIG. 13.

During device processing 1930, the device 110 may generate context data 1945 that may represent pose and map data and may send the context data 1945 to the geometric processing component 1360 (e.g., step "5"). For example, the device 110 may perform localization and mapping using existing components to generate the context data 1945. The geometric processing component 1360 may also receive the floorplan (3D entities) 1925 (e.g., step "6"). In some examples, the floorplan 1925 may be generated by the system 100 during offline processing 1910. However, the disclosure is not limited thereto, and the device 110 may generate and/or update the floorplan 1925 during device processing 1930 without departing from the disclosure.

The geometric processing component 1360 may process the gaze information, the pointing information, the context data 1945, and/or the floorplan 1925 and generate a gaze score (e.g., step "7") and a pointing score (e.g., step "8"), as described above with regard to FIG. 13. Similarly, the visual and grounding component 1350 may receive the floorplan 1925 (e.g., step "9") and the text data and may generate a text score (e.g., step "10"), as described above with regard to FIG. 13. Finally, the entity ranking component 1370 may receive the floorplan 1925 (e.g., step "11"), the gaze score, the pointing score, and/or the text score and may generate ranked entities 1950 (e.g., step "12").

Figure 20:
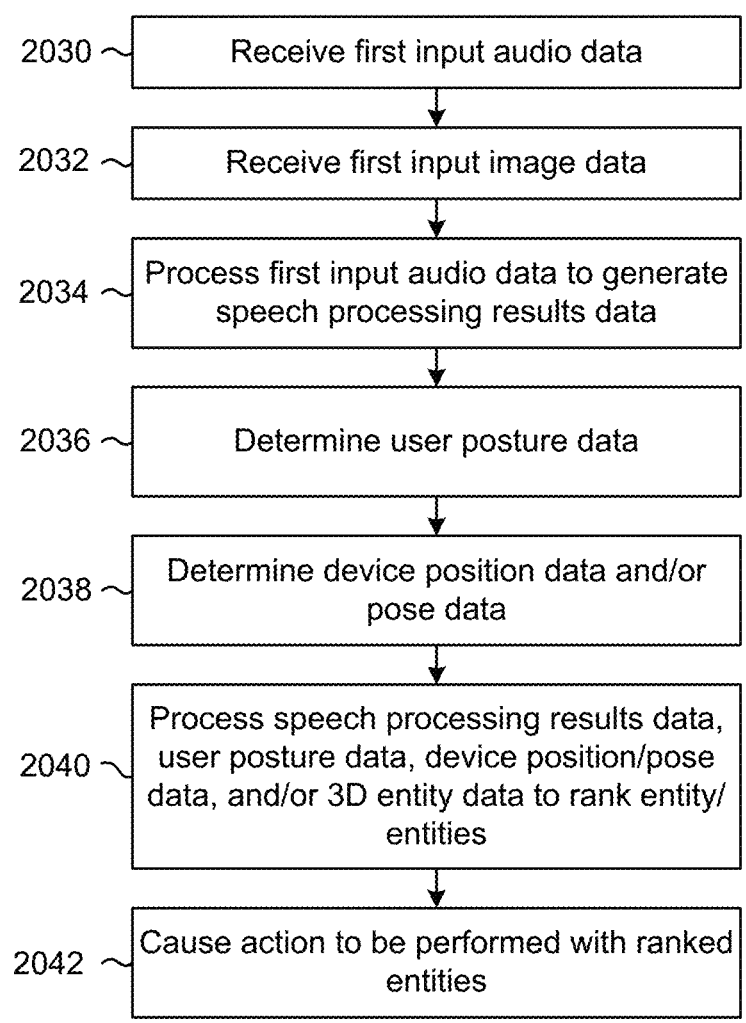
FIG. 20 illustrates a system configured to perform dynamic entity resolution processing according to embodiments of the present disclosure.

As shown in FIG. 20, the device 110 may receive (2030) first input audio data corresponding to a user. For example, the device 110 may capture the first input audio data using a microphone and the first input audio data may include speech or sounds from the user and/or speech and sounds from at least one other person. The device 110 may also receive (2032) first input image data representing a portion of the user and/or an environment of the device 110. For example, the device 110 may capture the first input image data using one or more cameras and the first input image data may include a representation of the user, although the disclosure is not limited thereto. For example, image data may be obtained from other image capture devices such as cameras, proximity sensors, Light Detection and Ranging (LIDAR) sensors, or the like. The location/pose data for the device may indicate the location and pose of the device relative to items represented in the image data so the system may determine the respective locations of represented items (e.g., the user, one or more objects, etc.) relative to each other, the environment (e.g., using the environment map data 1160), etc.

The device 110 may process (2034) the first input audio data to generate speech processing results data (e.g., text data), as described in greater detail with regard to FIG. 13. The speech processing results data may include ASR results data, NLU results data, or other speech processing results data. In addition, the device 110 may determine (2036) posture data corresponding to the user. To do so, the device 110 may process the first input image data to including gaze, pointing, and/or other information for the user, as described in greater detail with regard to FIG. 13. The gaze information may indicate a direction associated with the user's gaze, while the pointing information may indicate a direction associated with a gesture such as pointing. If the user is not represented in the image data, the device 110 may determine that there is no gaze information or pointing information without departing from the disclosure.

The device 110 may determine (2038) position data and/or pose data of the device 110, for example how the device is positioned in the environment and/or how its components are position relative to the environment and/or user. For example, the position data may indicate a current position of the device 110 relative to the user, whereas the pose data may indicate a current position of one or more sensors (e.g., the camera(s)), appendages, mechanical components, etc.) relative to the device 110 and/or the user.

The position data may indicate the current position of the device 110 using multiple techniques known to one of skill in the art. In some examples, the position data may indicate a relative position of the device 110 with respect to the user. For example, the position data may indicate a direction of the user relative to a fixed origin of the device 110 (e.g., front of the device 110) as well as a distance from the device 110 to the user. However, the disclosure is not limited thereto, and in other examples the position data may indicate a location of the device 110. For example, the position data may include coordinates of the device 110 within an environment (e.g., coordinates within an individual room, coordinates within a building, etc.), may include absolute coordinates (e.g., GPS coordinates, local coordinates, etc.), and/or the like. For example, as the device moves from one location to another, it may update its location information which may be used in the described processing. Thus, the device 110 may generate position data identifying the position of the device 110 relative to the user, a location of the device 110 in the environment, an exact location of the device 110, and/or the like without departing from the disclosure.

In some examples, the pose data may indicate the current position of a sensor relative to a fixed origin or point of reference on the device 110, such as the wheels, chassis, a point on top of the device 110, and/or the like. For example, the pose data may indicate coordinates of the sensor relative to a fixed position on the device 110 (e.g., center point between the two front wheels) using a three dimensional coordinate system. In other examples, the pose data may indicate the current position of the sensor relative to the device 110 using other techniques known to one of skill in the art, such as a height of the sensor, a length of extension associated with the sensor, and/or the like. For example, the camera may extend from a first position (e.g., retracted) to a second position (e.g., extended) and the pose data may indicate an amount of extension ranging from the first position to the second position. Similarly, the camera may rotate from a first position (e.g., first azimuth, such as 90 degrees to the left) to a second position (e.g., second azimuth, such as 90 degrees to the right). In some examples, the camera may rotate in 360 degrees, and the pose data may indicate a current azimuth associated with the camera without departing from the disclosure. The current azimuth may be determined relative to the fixed position on the device 110 (e.g., center point between the two front wheels), as described above, although the disclosure is not limited thereto. Additionally or alternatively, the pose data may indicate the current position of the sensor relative to the user. For example, the pose data may indicate a current perspective of the user, a distance to the user, and/or the like without departing from the disclosure.

As described in greater detail with regard to FIG. 13, the device 110 may improve dynamic entity resolution using the input image data. For example, the system 100 may build an environment map and populate the map with objects present in the environment. Based on the location of the objects relative to the device 110 and/or the user, the system 100 can interpret gestures and voice commands to infer which object is specified by the voice command. To build the environment map, the system 100 performs object detection to generate bounding boxes associated with an object, then clusters the bounding boxes into a three-dimensional object associated with 3D coordinates (e.g., 3D entity data). As the system 100 tracks the object using the 3D coordinates while maintaining two-dimensional information (e.g., bounding boxes and other features), the system 100 can use existing 2D models to process objects in 3D.

The device 110 may process (2040) the speech processing results data, user posture data, device position/pose data, and/or 3D entity data to rank entities and/or select an entity for further actions. For example, the device 110 may generate a text score, may perform geometric processing to generate a gaze score and a pointing score, and may process the text score, the gaze score, and/or the pointing score to generate ranked entities, as described in greater detail with regard to FIG. 13. For example, the device 110 may process these input score values to determine a likelihood that the voice command corresponds to an individual object or entity. After determining the ranked entities associated with the voice command, the device 110 may cause (2042) an action to be performed using the ranked entities, for example providing information about a selected entity/object, moving a location, executing some other command, etc.

Figure 21:
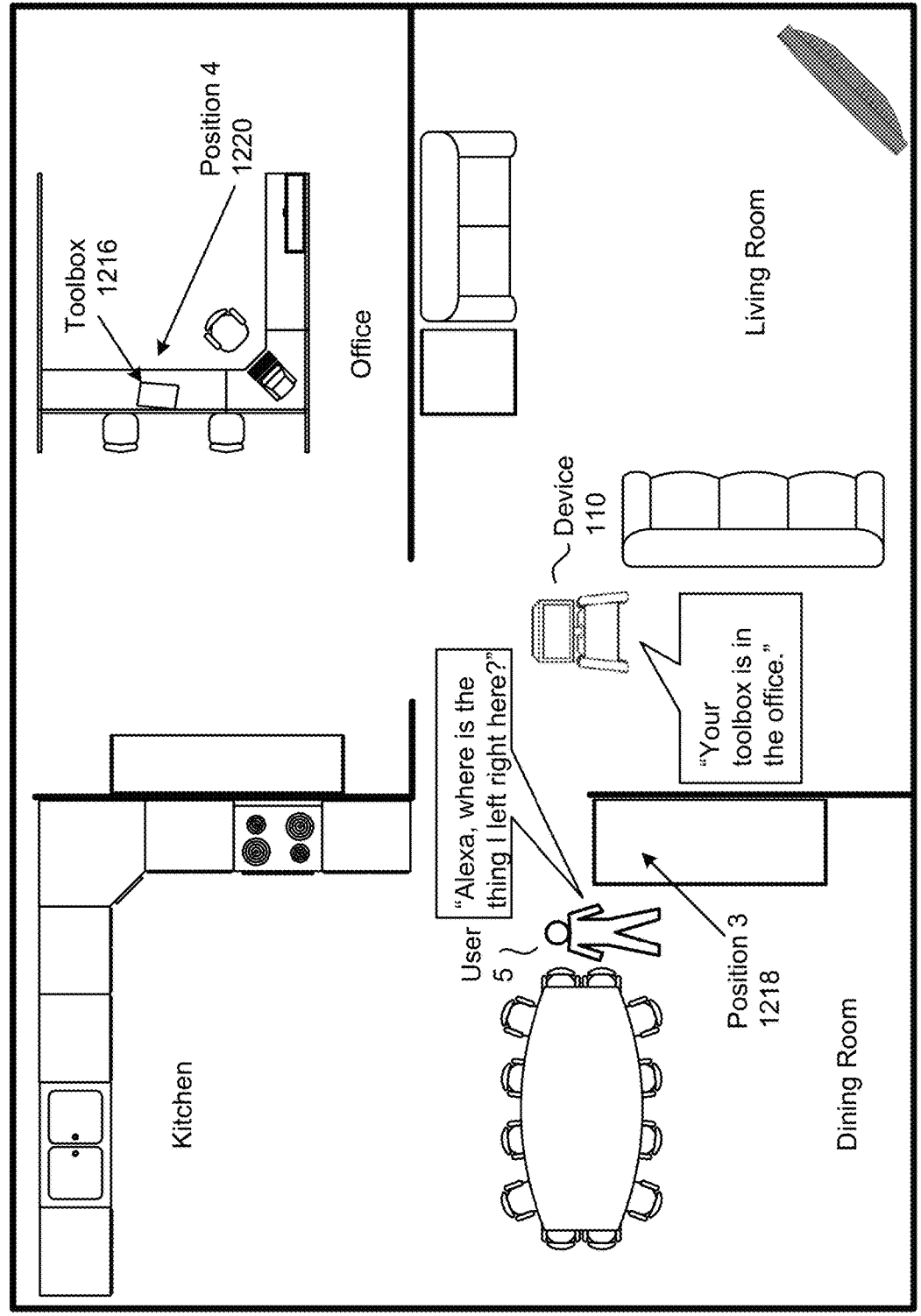
FIG. 21 illustrates a system configured to perform dynamic entity resolution processing according to embodiments of the present disclosure.

In certain above examples the system determines which object the user is referring to and answers the query accordingly using various available data. In another example, the device may be configured to answer a query about a particular position and answer accordingly. Returning to the example of FIGS. 12A-12B, at some later alternate Time E 2102, as illustrated in FIG. 21, the user 5 may speak a query to device 110, such as "Alexa, where is the thing I left right here?" The device 110 may, using techniques described herein, capture image data of the user and determine that the user's position (e.g., gaze, pointing, etc.) indicates position 3 1218. The device may do this based at least in part on a variety of factors such as the position data of the device (e.g., 3D location/orientation output by localization component 1340), the image data 1325, posture data (e.g., output by posture detector 1330), data determined by geometric processing component 1360), etc. The system may be configured to recognize various locations/positions themselves as entities and therefore may determine (e.g., using entity ranking 1370) that a slot of the user's query (as determined by speech processing component 240) may correspond to position 3 1218. The device 110 may then use object data 1170 (and/or other data) to determine that at a previous time (e.g., Time C) an object was associated with position 3 1218. For example, the device may determine the stored data associating the toolbox 1216, user 5, position 3 1218 and Time C. As the toolbox 1216 may be the object that was most recently associated with position 3 1218, the device may then determine the current position of toolbox 1216 and thus retrieve the data associating the toolbox 1216, user 5, position 4 1220 and Time D. The device 110 may then create output data identifying the desired object that was previously at position 3 1218 as well as its current location at position 4 1220 and may perform speech synthesis/TTS processing to create output data indicating the new position of the toolbox 1216 as well as the involvement of user 5 in moving it there, for example "your toolbox is in the office." Alternatively, the output data may indicate that the user 5 moved the toolbox 1216 from position 3 1218 to position 1220, for example "you left your toolbox in the office." The device may also return time information such as "you left your toolbox in the office at Time D."

Figure 22:
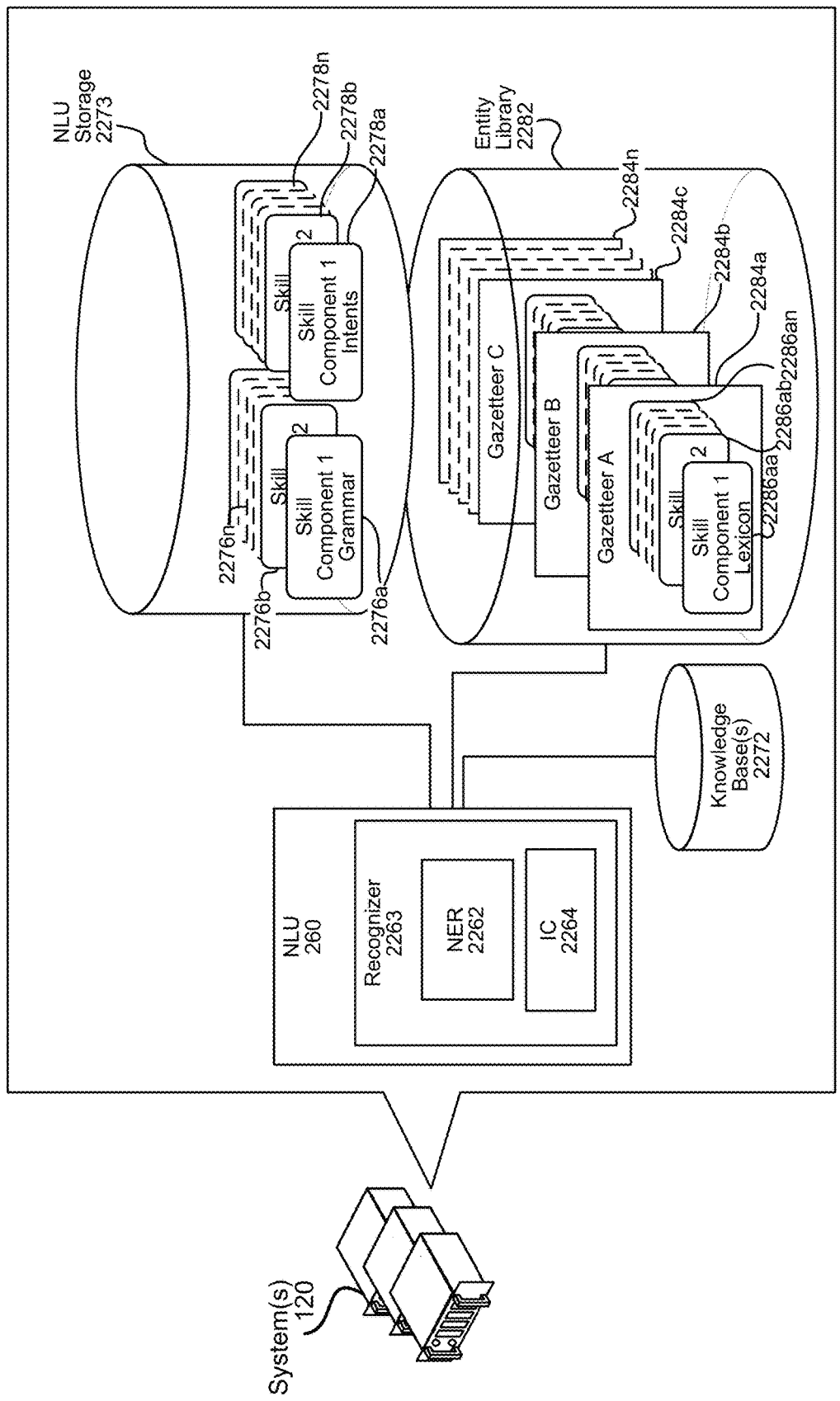
FIG. 22 is a conceptual diagram of how natural language processing may be, according to embodiments of the present disclosure.

FIG. 22 illustrates how the NLU component 260 may perform NLU processing. The NLU component 260 may include one or more recognizers 2263. In at least some embodiments, a recognizer 2263 may be associated with a skill 290 (e.g., the recognizer may be configured to interpret a natural language input to correspond to the skill 290). In at least some other examples, a recognizer 2263 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and/or a custom domain.

Recognizers 2263 may process in parallel, in series, partially in parallel, etc. For example, a recognizer corresponding to a first domain may process at least partially in parallel to a recognizer corresponding to a second domain. For further example, a recognizer corresponding to a first skill component may process at least partially in parallel to a recognizer corresponding to a second skill component.

The NLU component 260 may communicate with various storages. The NLU component 260 may communicate with an NLU storage 2273, which includes skill component grammars (2276a-2276n), representing how natural language inputs may be formulated to invoke skill(s) 290, and skill component intents (2278a-2278n) representing intents supported by respective skills 290.

Each recognizer 2263 may be associated with a particular grammar 2276, one or more particular intents 2278, and a particular personalized lexicon 2286 (stored in an entity library 2282). A gazetteer 2284 may include skill component-indexed lexical information associated with a particular user. For example, Gazetteer A (2284a) may include skill component-indexed lexical information 2286aa to 2286an. A user's music skill component lexical information might include album titles, artist names, and song names, for example, whereas a user's contact list skill component lexical information might include the names of contacts. Since every user's music collection and contact list is presumably different, this personalized information may improve entity resolution.

Each recognizer 2263 may include a NER component 2262 that attempts to identify grammars and lexical information that may be used to construe meaning with respect to text data input therein. A NER component 2262 identifies portions of text data that correspond to a named entity that may be recognizable by the system(s) 120. A NER component 2262 may also determine whether a word refers to an entity that is not explicitly mentioned in the text, for example "him," "her," "it" or other anaphora, exophora or the like.

A NER component 2262 applies grammar models 2276 and lexical information 2286 associated with one or more skills 290 to determine a mention of one or more entities in text data input therein. In this manner, a NER component 2262 identifies "slots" (i.e., particular words in text data) that may be needed for later processing. A NER component 2262 may also label each slot with a type (e.g., noun, place, city, artist name, song name, etc.).

Each grammar model 2276 may include the names of entities (i.e., nouns) commonly found in natural language about a particular skill 290 to which the grammar model 2276 relates, whereas lexical information 2286 may be personalized to the user identifier output by a user recognition component 295 for the natural language input. For example, a grammar model 2276 associated with a shopping skill component may include a database of words commonly used when people discuss shopping.

A downstream process called named entity resolution actually links a portion of text data (identified by a NER component 2262) to a specific entity known to the system(s) 120. To perform named entity resolution, the NLU component 260 may use gazetteer information (2284a-2284n) stored in the entity library storage 2282. The gazetteer information 2284 may be used to match text data (identified by a NER component 2262) with different entities, such as song titles, contact names, etc. Gazetteers may be linked to users (e.g., a particular gazetteer may be associated with a specific user's music collection), may be linked to certain skills 290 (e.g., a shopping skill component, a music skill component, a video skill component, a communications skill component, etc.), or may be organized in another manner.

Each recognizer 2263 may also include an IC component 2264 that processes text data input thereto to determine an intent(s) of a skill 290 that potentially corresponds to the natural language input represented in the text data. An intent corresponds to an action to be performed that is responsive to the natural language input represented by the text data. An IC component 2264 may communicate with a database 2278 of words linked to intents. For example, a music intent database may link words and phrases such as "quiet," "volume off," and "mute" to a <Mute> intent. An IC component 2264 identifies potential intents by comparing words and phrases in text data to the words and phrases in an intents database 2278 associated with the skill 290 that is associated with the recognizer 2263 implementing the IC component 2264.

The intents identifiable by a specific IC component 2264 may be linked to one or more skill component-specific grammar frameworks 2276 with "slots" to be filled. Each slot of a grammar framework 2276 corresponds to a portion of text data that a NER component 2262 believes corresponds to an entity. For example, a grammar framework 2276 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 2276 may not be structured as sentences, but rather based on associating slots with grammatical tags.

For example, a NER component 2262 may identify words in text data as subject, object, verb, preposition, etc. based on grammar rules and/or models prior to recognizing named entities in the text data. An IC component 2264 (implemented by the same recognizer 2263) may use the identified verb to identify an intent. The NER component 2262 may then determine a grammar model 2276 associated with the identified intent. For example, a grammar model 2276 for an intent corresponding to <PlayMusic> may specify a list of slots applicable to play the identified "object" and any object modifier (e.g., a prepositional phrase), such as {Artist Name}, {Album Name}, {Song name}, etc. The NER component 2262 may then search corresponding fields in a lexicon 2286, attempting to match words and phrases in the text data the NER component 2262 previously tagged as a grammatical object or object modifier with those identified in the lexicon 2286.

A NER component 2262 may perform semantic tagging, which is the labeling of a word or combination of words according to their type/semantic meaning. A NER component 2262 may parse text data using heuristic grammar rules, or a model may be constructed using techniques such as hidden Markov models, maximum entropy models, log linear models, conditional random fields (CRF), and the like. For example, a NER component 2262, implemented by a music skill component or music domain recognizer 2263, may parse and tag text data corresponding to "play mother's little helper by the rolling stones" as {Verb}: "Play," {Object}: "mother's little helper," {Object Preposition}: "by," and {Object Modifier}: "the rolling stones." The NER component 2262 may identify "Play" as a verb based on a word database associated with the music skill component or music domain, which an IC component 2264 may determine corresponds to a <PlayMusic> intent. At this stage, no determination has been made as to the meaning of "mother's little helper" and "the rolling stones," but based on grammar rules and models, the NER component 2262 has determined that the text of these phrases relates to the grammatical object (i.e., entity).

The frameworks linked to the intent are then used to determine what database fields should be searched to determine the meaning of these phrases, such as searching a user's gazetteer 2284 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 2284 does not resolve a slot/field using gazetteer information, the NER component 2262 may search a database of generic words (in the knowledge base 2272). For example, if the text data corresponds to "play songs by the rolling stones," after failing to determine an album name or song name called "songs" by "the rolling stones," the NER component 2262 may search a music skill component vocabulary for the word "songs." In the alternative, generic words may be checked before the gazetteer information, or both may be tried, potentially producing two different results.

A recognizer 2263 may tag text data to attribute meaning thereto. For example, a recognizer 2263 may tag "play mother's little helper by the rolling stones" as: {skill component} Music, {intent} Play Music, {artist name} rolling stones, {media type} SONG, and {song title}mother's little helper. For further example, a recognizer 2263 may tag "play songs by the rolling stones" as: {skill component} Music, {intent} Play Music, {artist name} rolling stones, and {media type} SONG.

As described above, more than one recognizer 2263 may process with respect to text data representing a single natural language input. In such instances, each recognizer 2263 may output at least one NLU hypothesis including an intent indicator (determined by an IC component 2264 of the recognizer 2263) and at least one tagged named entity (determined by a NER component 2262 of the recognizer 2263).

The NLU component 260 may include a shortlister component 2310. The shortlister component 2310 selects skill components that may execute in response to the natural language input. The shortlister component 2310 thus limits downstream, more resource intensive NLU processes to being performed with respect to skills 290 that are likely to execute in response to the natural language input.

Without a shortlister component 2310, the NLU component 260 may process a given ASR hypothesis (or text data, depending on the type of natural language input being processed) with respect to every skill 290 of (or in communication with) the system(s) 120, either in parallel, in series, or using some combination thereof. By implementing a shortlister component 2310, the NLU component 260 may process a given ASR hypothesis (or the text data) with respect to only the skills 290 that are likely to execute in response to the natural language input. This reduces total compute power and latency attributed to NLU processing.

The shortlister component 2310 may include one or more trained models. The model(s) may be trained to recognize various forms of natural language inputs that may be received by the system(s) 120. For example, during a training period a skill 290 may provide the system(s) 120 with training data representing sample natural language inputs that may be provided by a user to invoke the skill 290. For example, for a ride sharing skill component may provide the system(s) 120 with training data including text corresponding to "get me a cab to [location]," "get me a ride to [location]," "book me a cab to [location]," "book me a ride to [location]," etc. The one or more trained models, to be used by the shortlister component 2310, may be trained using the training data to determine other potentially related natural language input structures that a user may try to use to invoke the particular skill 290. During training, the system(s) 120 may query the skill 290 regarding whether the determined other natural language input structures are permissible, from the perspective of the skill 290, to be used to invoke the skill 290 at runtime. The alternate natural language input structures may be derived by one or more trained models during model training and/or may be based on natural language input structures provided by different skill components. The skill 290 may also provide the system(s) 120 with training data indicating grammar and annotations. The system(s) 120 may use the training data representing the sample natural language inputs, the determined related natural language input(s), the grammar, and the annotations to train a model that indicates when a runtime natural language inputs is likely to be directed to/handled by a skill component. Each trained model of the shortlister component 2310 may be trained with respect to a different skill 290. Alternatively, the shortlister component 2310 may use one trained model per skill 290 type, such as one trained model for weather skill components, one trained model for ride sharing skill components, etc.

The system(s) 120 may use the sample natural language inputs provided by a skill 290, and related sample natural language inputs determined during training, as binary examples to train a model associated with the skill 290. The model associated with the particular skill 290 may then be operated at runtime by the shortlister component 2310. For example, some sample natural language inputs may be positive examples (e.g., natural language inputs that may be used to invoke the skill 290). Other sample natural language inputs may be negative examples (e.g., natural language inputs that may not be used to invoke the skill 290).

As described above, the shortlister component 2310 may include a different trained model for each skill 290, a different trained model for each skill 290 category, or some other combination of trained model(s). For example, the shortlister component 2310 may alternatively include a single model. The single model may include a portion trained with respect to characteristics (e.g., semantic characteristics) shared by all skills 290. The single model may also include skill 290-specific portions, with each skill 290-specific portion being trained with respect to a different skill 290. Implementing a single model with skill 290-specific portions may result in less latency than implementing a different trained model for each skill 290 because the single model with skill 290-specific portions limits the number of characteristics processed on a per skill system level.

The portion of the model, trained with respect to characteristics shared by more than one skill 290, may be clustered based on skill 290 type. For example, a first portion, of the portion trained with respect to multiple skills 290, may be trained with respect to weather skills 290; a second portion, of the portion trained with respect to multiple skills 290, may be trained with respect to music skills 290; a third portion, of the portion trained with respect to multiple skills 290, may be trained with respect to travel skills 290; etc.

Clustering may not be beneficial in every instance because clustering may cause the shortlister component 2310 to output indications of only a portion of the skills 290 that the natural language input may relate to. For example, a natural language input may correspond to "tell me about Tom Collins." If the model is clustered based on skill 290 type, the shortlister component 2310 may determine the natural language input corresponds to a recipe skill 290 (e.g., a drink recipe) even though the natural language input may also correspond to an information skill 290 (e.g., storing or otherwise having access to information about a person named Tom Collins).

Training the shortlister component 2310 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The shortlister component 2310 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 2310 determines a natural language input is associated with multiple skills 290, only the recognizers 2263 associated with those skills 290 may process with respect to the natural language input. The selected recognizers 2263 may process in parallel, in series, partially in parallel, etc. For example, if the shortlister component 2310 determines a natural language input may relate to both a communications skill 290 and a music skill 290, a recognizer 2263 associated with the communications skill 290 may process in parallel, or partially in parallel, with a recognizer 2263 associated with the music skill 290 processing.

The shortlister component 2310 may make binary determinations (e.g., yes or no) regarding which skill 290 corresponds to a natural language input. The shortlister component 2310 may make such determinations using the one or more trained models described herein above. If the shortlister component 2310 implements a single trained model for each skill 290, the shortlister component 2310 may simply run the models that are associated with enabled skills 290 as indicated in a profile (e.g., stored in a profile storage 270 described in further detail below) associated with the user device 110 and/or user that originated the natural language input.

The shortlister component 2310 may generate shortlisted skill component data 2315 representing one or more skills 290 that may execute in response to the natural language input. The number of skills 290 represented in the shortlisted skill component data 2315 is configurable. In an example, the shortlisted skill component data 2315 may indicate every skill 290 of (or otherwise in communication with) the system(s) 120 as well as contain an indication, for each skill 290, representing whether the associated skill 290 is likely capable of processing in response to the natural language input. In another example, instead of indicating every skill 290, the shortlisted skill component data 2315 may only indicate the skills 290 that are likely capable of processing in response to the natural language input. In yet another example, the shortlister component 2310 may implement thresholding such that the shortlisted skill component data 2315 may indicate no more than a maximum number of skills 290 that may process in response to the natural language input.

In at least some embodiments, the shortlister component 2310 may generate a score representing how likely a skill 290 is likely to processing in response to a natural language input. In such embodiments, the shortlisted skill component data 2315 may only include identifiers of skills 290 associated with scores meeting or exceeding a threshold score.

In the situation where the ASR component 250 outputs ASR output data including more than one interpretation of a natural language input, the shortlister component 2310 may output different shortlisted skill component data 2315 for each interpretation. Alternatively, the shortlister component 2310 may output a single shortlisted skill component data 2315 representing the skills 290 corresponding to the different interpretations.

As indicated above, the shortlister component 2310 may implement thresholding such that the shortlisted skill component data 2315 may indicate no more than a threshold number of skills 290 (e.g., may include no more than a threshold number of skill 290 identifiers). If the ASR component 250 outputs ASR output data including more than one interpretation of a natural language input, the shortlisted skill component data 2315 may indicate no more than a threshold number of skills 290 irrespective of the number of interpretations output by the ASR component 250. Alternatively or in addition, the shortlisted skill component data 2315 may indicate no more than a threshold number of skills 290 for each interpretation (e.g., indicating no more than five skills 290 for a first interpretation, no more than five skills 290 for a second interpretation, etc.).

In addition to making a binary determination regarding whether a skill 290 may process in response to a natural language input, the shortlister component 2310 may generate scores representing likelihoods that skills 290 may process in response to the natural language inputs. If the shortlister component 2310 implements a different trained model for each skill 290, the shortlister component 2310 may generate a different confidence score for each skill 290-specific trained model that is run by the shortlister component 2310. For example, if the shortlister component 2310 runs the models of every skill 290 of (or otherwise in communication with) the system(s) 120, the shortlister component 2310 may generate a respective confidence score for each skill 290 of (or otherwise in communication with) the system(s) 120. For further example, if the shortlister component 2310 only runs models specific to skills 290 that are indicated as enabled in a profile associated with the user device 110 and/or user (as stored in the profile storage 270), the shortlister component 2310 may only generate a respective confidence score for each enabled skill 290. For further examine, if the shortlister component 2310 implements a single trained model with skill 290-specific portions, the shortlister component 2310 generate a respective confidence score for each skill 290 who's specifically trained portion is run. The shortlister component 2310 may perform matrix vector modification to obtain confidence scores for skills 290.

An example of shortlisted skill component data 2315 including confidence scores may be represented as:
Search skill component, 0.67
Recipe skill component, 0.62
Information skill component, 0.57

As indicated, the confidence scores output by the shortlister component 2310 may be numeric values. The confidence scores output by the shortlister component 2310 may alternatively be binned values (e.g., high, medium, low).

The shortlister component 2310 may consider other data 2320 when determining which skills 290 may process in response to a natural language input. The other data 2320 may be character embedded prior to being input to the shortlister component 2310. The other data 2320 may alternatively be embedded using other techniques.

The other data 2320 may include usage history data associated with the user device 110 and/or user. For example, a confidence score of a skill 290 may be increased if natural language inputs captured by the user device 110 and/or originating from the user routinely relate to the skill 290. Conversely, a confidence score of a skill 290 may be decreased if natural language inputs captured by the user device 110 and/or originated from the user rarely relate to the skill 290.

The other data 2320 may indicate the skills 290 that are enabled with respect to the user device 110 and/or user (e.g., as represented in the profile storage 270). The shortlister component 2310 may use such data to determine which skill 290-specific trained models to run. That is, the shortlister component 2310 may determine to only run the trained models associated with enabled skills 290. The shortlister component 2310 may alternatively use such data to alter skill component confidence scores represented in the shortlisted skill component data 2315.

As an example, considering two skills 290, one enabled and another unenabled, the shortlister component 2310 may run a first model (or model portion) specific to the unenabled skill component as well as a second model (or model portion) specific to the enabled skill component. The shortlister component 2310 may initially determine a confidence score of 0.60 for each of the unenabled skill component and the enabled skill component. The shortlister component 2310 may then alter those confidence scores based on which skill component is enabled. For example, the shortlister component 2310 may increase the confidence score associated with the enabled skill component and/or decrease the confidence score associated with the unenabled skill component.

A user may provide the system(s) 120 with indications of which skills 290 are enabled (e.g., authorized to execute using data associated with the user). Such indications may be stored in the profile storage 270. The shortlister component 2310 may determine whether profile data associated with the user and/or user device 110 that originated the natural language input includes indications of enabled skills 290.

The other data 2320 may indicate a type of the user device 110. The type of the user device 110 may indicate the input/output capabilities of the user device 110. For example, a user device 110 may include a display, may be headless (e.g., displayless), may be mobile or stationary, may include audio playback capabilities, may include a camera, etc. The shortlister component 2310 may use such other data 2320 to determine which skill 290-specific trained models (or portions of a model) to run. For example, if the user device 110 corresponds to a displayless type of user device, the shortlister component 2310 may determine not to run trained models (or portions of a model) specific to skills 290 that output video data. The shortlister component 2310 may alternatively use such other data 2320 to alter skill component confidence scores represented in the shortlisted skill component data 2315.

As an example, considering two skills 290, one that outputs audio data and another that outputs video data, the shortlister component 2310 may run a first model (or first portion of a model) specific to the skill 290 that generates audio data as well as a second model (or second portion of a model) specific to the skill 290 that generates video data. The shortlister component 2310 may initially determine a confidence score of 0.60 for each of the skills 290. The shortlister component 2310 may then alter the original confidence scores based on the type of the user device 110. For example, if the user device 110 is a displayless device, the shortlister component 2310 may increase the confidence score associated with the skill 290 that generates audio data and/or decrease the confidence score associated with the skill 290 that generates video data.

The type of user device information represented in the other data 2320 may represent output capabilities of the user device 110 to be used to output content to the user, which may not necessarily be the user device 110 that captured the natural language input. For example, a displayless user device 110 may receive a natural language input corresponding to "play Game of Thrones". The system(s) 120 may determine a smart TV, or other user device including or otherwise associated with a display, is to be used to output multimedia content (e.g., audio and video) corresponding to the title "Game of Thrones".

The other data 2320 may include data indicating the user device 110's speed, location, or other mobility information. For example, the user device 110 may correspond to a vehicle including a display. If the vehicle is moving, the shortlister component 2310 may decrease the confidence score associated with a skill 290 that generates video data as it may be undesirable to output video content to the user while in a moving vehicle. The vehicle may output data to the system(s) 120 indicating when the vehicle is in motion.

The other data 2320 may include data indicating a currently invoked skill 290 (e.g., a skill 290 that is being used to output content to the user when the user device 110 receives the natural language input). For example, the user may speak a first (e.g., a previous) input causing the system(s) 120 to invoke a music skill 290 to output music to the user. As the music is being output to the user, the system(s) 120 may receive a second (e.g., a current) natural language input. The shortlister component 2310 may use such other data 2320 to alter skill component confidence scores represented in the shortlisted skill component data 2315. For example, the shortlister component 2310 may run a first model (or a first portion of model) specific to a first skill 290 as well as a second model (or second portion of a model) specific to a second skill 290. The shortlister component 2310 may initially determine a confidence score of 0.60 for each of the skills 290. The shortlister component 2310 may then alter the original confidence scores based on the first skill 290 being invoked to output content while the current natural language input was received. Based on the first skill 290 being invoked, the shortlister component 2310 may increase the confidence score associated with the first skill 290 and/or decrease the confidence score associated with the second skill 290.

The thresholding implemented with respect to the shortlisted skill component data 2315 and the different types of other data 2320 considered by the shortlister component 2310 are configurable. For example, the shortlister component 2310 may update confidence scores as more other data 2320 is considered.

The shortlister component 2310 may cause the NLU component 260 to invoke only a subset of the recognizers 2263 associated with skills 290 represented in the shortlisted skill component 2315 as being likely to process in response to the natural language input. If the shortlister component 2310 generates the shortlisted skill component data 2315 to include confidence scores, the shortlister component 2310 may cause the NLU component 260 to invoke only recognizers 2263 associated with skills 290 associated with confidence scores satisfying (e.g., meeting or exceeding) a condition (e.g., a threshold confidence score).

Figure 23:
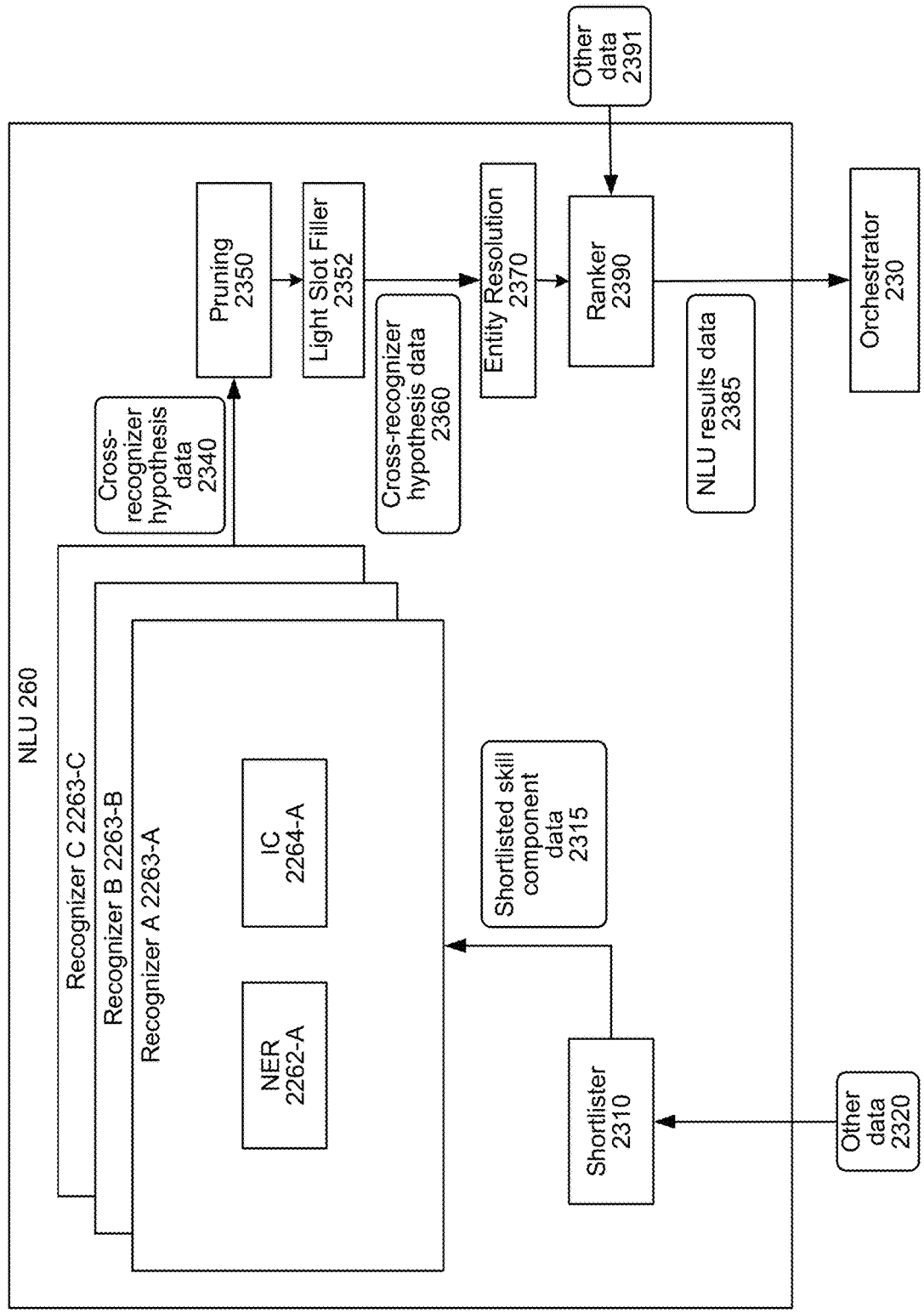
FIG. 23 is a conceptual diagram of how natural language processing may be performed, according to embodiments of the present disclosure.

The NLU component 260 may compile NLU hypotheses, output by multiple recognizers 2263, into cross-recognizer hypothesis data 2340 (illustrated in FIG. 23). Each NLU hypothesis may be associated with a respective score indicating a likelihood that the NLU hypothesis corresponds to the domain, one or more skills 290, etc. associated with the recognizer 2263 from which the NLU hypothesis was output. For example, the cross-recognizer hypothesis data 2340 may be represented as, with each line corresponding to a different NLU hypothesis:

[0.95] Intent: <PlayMusic> AlbumName: GameOfThrones

[0.70] Intent: <PlayVideo> VideoTitle: GameOfThrones.

While the foregoing illustrates cross-recognizer hypothesis data 2340 include two NLU hypotheses, it will be appreciated that the cross-recognizer hypothesis data 2340 may include differing numbers of NLU hypotheses with departing from the present disclosure.

The NLU component 260 may send the cross-recognizer hypothesis data 2340 to a pruning component 2350, which sorts the NLU hypotheses, represented in the cross-recognizer hypothesis data 2340, according to their respective scores. The pruning component 2350 may then perform score thresholding with respect to the cross-recognizer hypothesis data 2340. For example, the pruning component 2350 may select NLU hypotheses, represented in the cross-recognizer hypothesis data 2340, associated with scores satisfying (e.g., meeting and/or exceeding) a condition (e.g., a threshold score). The pruning component 2350 may additionally or alternatively perform number of NLU hypothesis thresholding. For example, the pruning component 2350 may select a threshold number of top-scoring NLU hypotheses represented in the cross-recognizer hypothesis data 2340.

The pruning component 2350 may generate cross-recognizer hypothesis data 2360 including the selected NLU hypotheses. The purpose of the pruning component 2350 is to create a reduced list of NLU hypotheses so that downstream, more resource intensive, processes may only operate on NLU hypotheses that most likely represent the natural language input.

The NLU component 260 may include a light slot filler component 2352 that takes text from slots, represented in the NLU hypotheses output by the pruning component 2350, and alters it to make the text more easily processed by downstream components. The light slot filler component 2352 may perform low latency operations that do not involve heavy operations such as reference to a knowledge base. The purpose of the light slot filler component 2352 is to replace words with other words or values that may be more easily understood by downstream components. For example, if a NLU hypothesis includes the word "tomorrow," the light slot filler component 2352 may replace the word "tomorrow" with an actual date for purposes of downstream processing. Similarly, the light slot filler component 2352 may replace the word "CD" with "album" or "compact disc." The replaced text is then included in the cross-recognizer hypothesis data 2360.

The cross-recognizer hypothesis data 2360 may be sent to an entity resolution component 2370. The entity resolution component 2370 can apply rules or other instructions to standardize labels or tokens in the NLU hypotheses represented in the cross-recognizer hypothesis data 2360. The precise transformation may depend on the skill 290, domain, etc. to which a NLU hypothesis relates. For example, for a travel skill 290-specific NLU hypothesis, the entity resolution component 2370 may transform text corresponding to "Boston airport" to the standard "BOS" three-letter code referring to the airport. The entity resolution component 2370 can refer to a knowledge base that is used to specifically identify the precise entity referred to in each slot of each NLU hypothesis represented in the cross-recognizer hypothesis data 2360.

Specific intent/slot combinations may also be tied to a particular source, which may then be used to resolve the text. Referring to the example natural language input "play songs by the stones," the entity resolution component 2370 may reference a personal music catalog, Amazon Music account, a user profile, or the like (for example stored in the profile storage 270). The entity resolution component 2370 may output NLU hypotheses, altered from the cross-recognizer hypothesis data 2360, that include more detailed information (e.g., entity identifiers) about the specific entities mentioned in the slots and/or more detailed slot data that can eventually be used by a skill 290 to perform an action responsive to the natural language input. The NLU component 260 may include multiple entity resolution components 2370 that are each specific to one or more different skills 290, domains, etc.

The NLU component 260 may include a ranker component 2390 that assigns a particular score to each NLU hypothesis output by the entity resolution component 2370. The ranker component 2390 may alter the score of a particular NLU hypothesis based on whether the NLU hypothesis has unfilled slots. For example, if a first NLU hypothesis includes slots that are all filled/resolved, the ranker component 2390 may assign the first NLU hypothesis a higher score than a second NLU hypothesis including at least one slot that is unfilled/unresolved by the entity resolution component 2370.

The ranker component 2390 may apply re-scoring, biasing, or other techniques. To do so, the ranker component 2390 may consider not only the data output by the entity resolution component 2370, but may also other data 2391. The other data 2391 may include a variety of information.

For example, the other data 2391 indicate skill 290 rating or popularity. For example, if a skill 290 has a high rating, the ranker component 2390 may increase the score of a NLU hypothesis associated with that skill 290, and vice versa.

The other data 2391 may indicate skills 290 that have been enabled by the user. For example, the ranker component 2390 may assign higher scores to NLU hypotheses associated with enabled skills 290 than NLU hypotheses associated with skills 290 that have not been enabled by the user.

The other data 2391 indicate system usage history (e.g., specific to the user), such as if the user regularly invokes a particular skill 290 or does so at particular times of day. The other data 2391 may indicate a present date, a present time, location of the user device 110, weather information, a type of the device 110, a user identifier of the user, context information, as well as other information. For example, the ranker component 2390 may consider when any particular skill 290 is currently active with respect to the present user and/or user device 110 (e.g., music being output by the skill 290 when the current natural language input is received).

The other data 2391 may also include gaze data, position data, etc. such as the types of data considered by ranker 1370 discussed above.

The ranker component 2390 may output NLU results data 2385 including one or more NLU hypotheses. The NLU component 260 may send the NLU results data 285 to the orchestrator component 230.

As described above, the system(s) 120 may perform speech processing using two different components (e.g., the ASR component 250 and the NLU component 260). One skilled in the art will appreciate that the system(s) 120, in at least some embodiments, may implement a SLU component configured to process audio data 211 to generate NLU results data 2385.

In some examples, the SLU component may be equivalent to a combination of the ASR component 250 and the NLU component 260. Yet, the SLU component may process audio data 211 and directly generate the NLU results data 2385, without an intermediate step of generating ASR output data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user in order to derive a desired action. The SLU component may output a most likely NLU hypothesis, or multiple NLU hypotheses associated with respective confidence scores or other scores (such as probability scores, etc.).

Figure 24A:
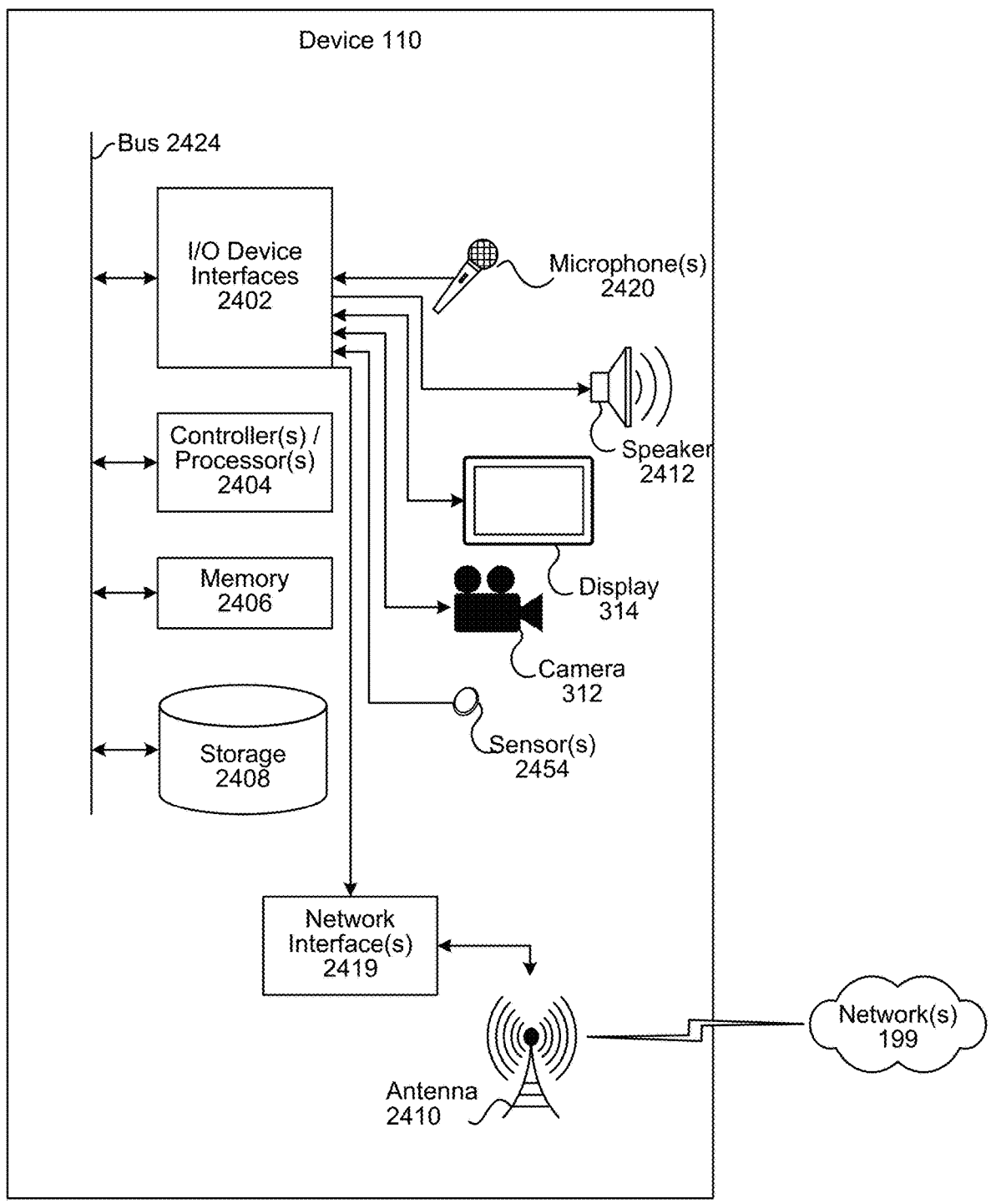
FIG. 24A is a block diagram conceptually illustrating example components of an autonomously motile device according to embodiments of the present disclosure.

FIG. 24A is a block diagram conceptually illustrating a device 110 that may be used with the system. FIG. 25 is a block diagram conceptually illustrating example components of a remote device, such as the system(s) 120, which may assist with creating a map of an environment 390, ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (2404/2504), which may each include a central processing unit (CPU) for processing data and computer-readable instructions, and a memory (2406/2506) for storing data and instructions of the respective device. The memories (2406/2506) may individually include volatile random access memory (RAM), non-volatile read only memory (ROM), non-volatile magnetoresistive memory (MRAM), and/or other types of memory. Each device (110/120/225) may also include a data storage component (2408/2508) for storing data and controller/processor-executable instructions. Each data storage component (2408/2508) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (2402/2502).

Computer instructions for operating each device (110/120/225) and its various components may be executed by the respective device's controller(s)/processor(s) (2404/2504), using the memory (2406/2506) as temporary "working" storage at runtime. A device's computer instructions may be stored in a non-transitory manner in non-volatile memory (2406/2506), storage (2408/2508), or an external device(s). Alternatively, some or all of the executable instructions may be embedded in hardware or firmware on the respective device in addition to or instead of software.

Each device (110/120/225) includes input/output device interfaces (2402/2502). A variety of components may be connected through the input/output device interfaces (2402/2502), as will be discussed further below. Additionally, each device (110/120/225) may include an address/data bus (2424/2524) for conveying data among components of the respective device. Each component within a device (110/120/225) may also be directly connected to other components in addition to (or instead of) being connected to other components across the bus (2424/2524).

FIG. 24A is a block diagram of some components of the autonomously motile device 110 such as network interfaces 2419, sensors 2454, and output devices, according to some implementations. The components illustrated here are provided by way of illustration and not necessarily as a limitation. For example, the autonomously motile device 110 may utilize a subset of the particular network interfaces 2419, output devices, or sensors 2454 depicted here, or may utilize components not pictured. One or more of the sensors 2454, output devices, or a combination thereof may be included on a moveable component that may be panned, tilted, rotated, or any combination thereof with respect to a chassis of the autonomously motile device 110.

The autonomously motile device 110 may include input/output device interfaces 2402 that connect to a variety of components such as an audio output component such as a speaker 2412, a wired headset or a wireless headset (not illustrated), or other component capable of outputting audio. The autonomously motile device 110 may also include an audio capture component. The audio capture component may be, for example, a microphone 2420 or array of microphones, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 314 for displaying content. The autonomously motile device 110 may further include a camera 312, light, button, actuator, and/or sensor 2454.

The network interfaces 2419 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 390 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (2402/2502) may also include and/or communicate with communication components (such as network interface(s) 2419) that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (2402/2502), processor(s) (2404/2504), memory (2406/2506), and/or storage (2408/2508) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 24B:
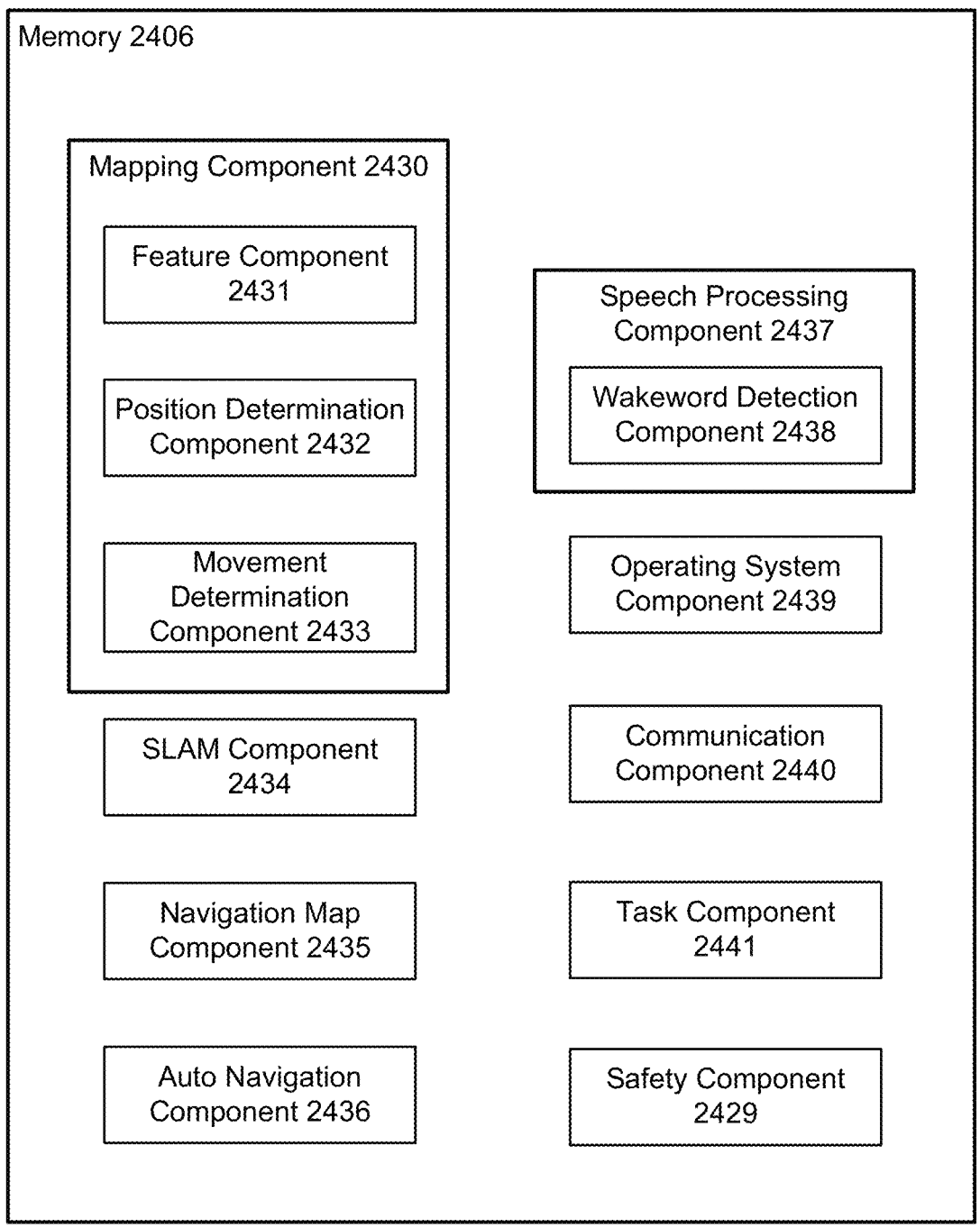
FIG. 24B illustrates components that may be stored in a memory of an autonomously motile device according to embodiments of the present disclosure.
Figure 24C:
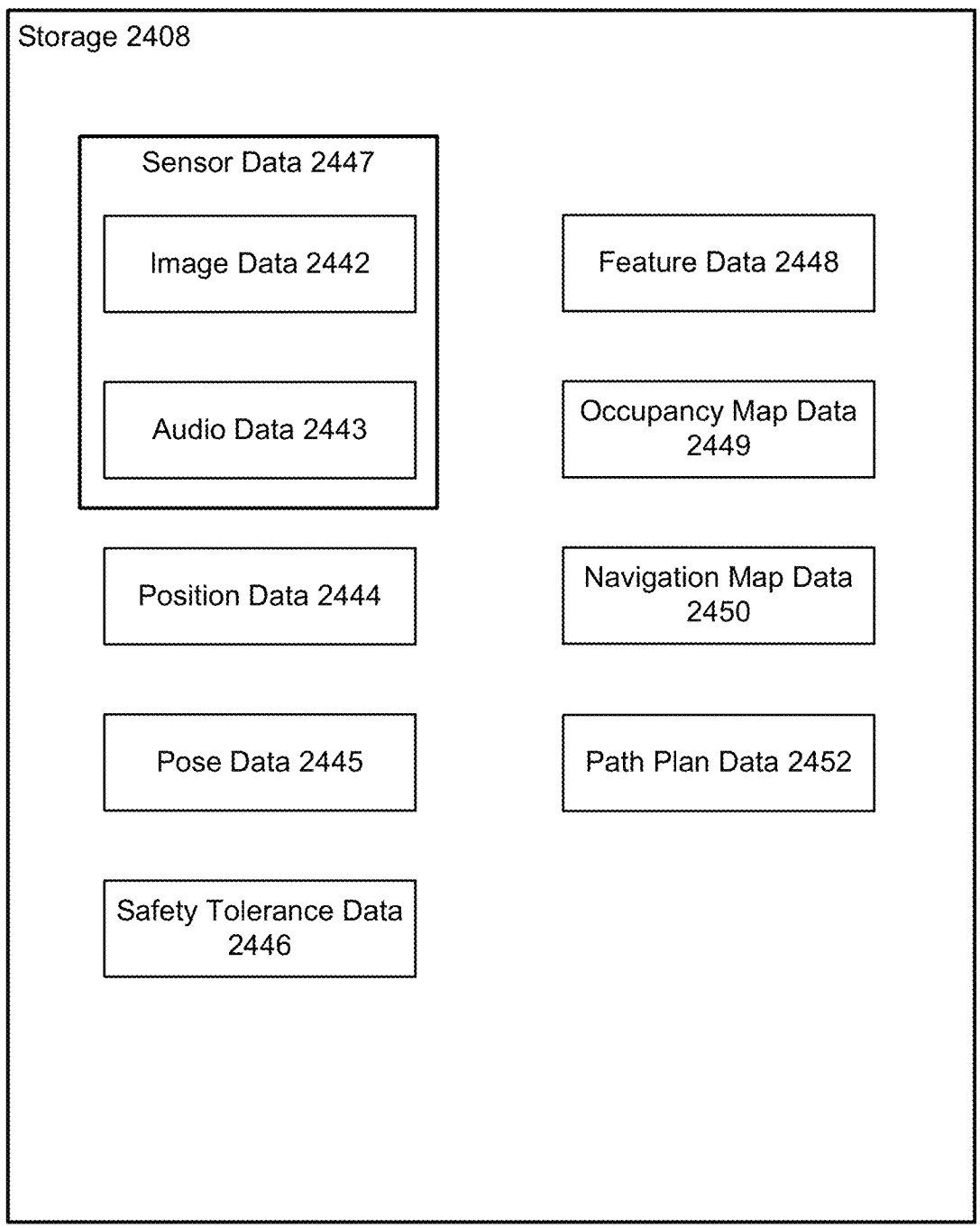
FIG. 24C illustrates data that may be stored in a storage of an autonomously motile device according to embodiments of the present disclosure.
Figure 24D:
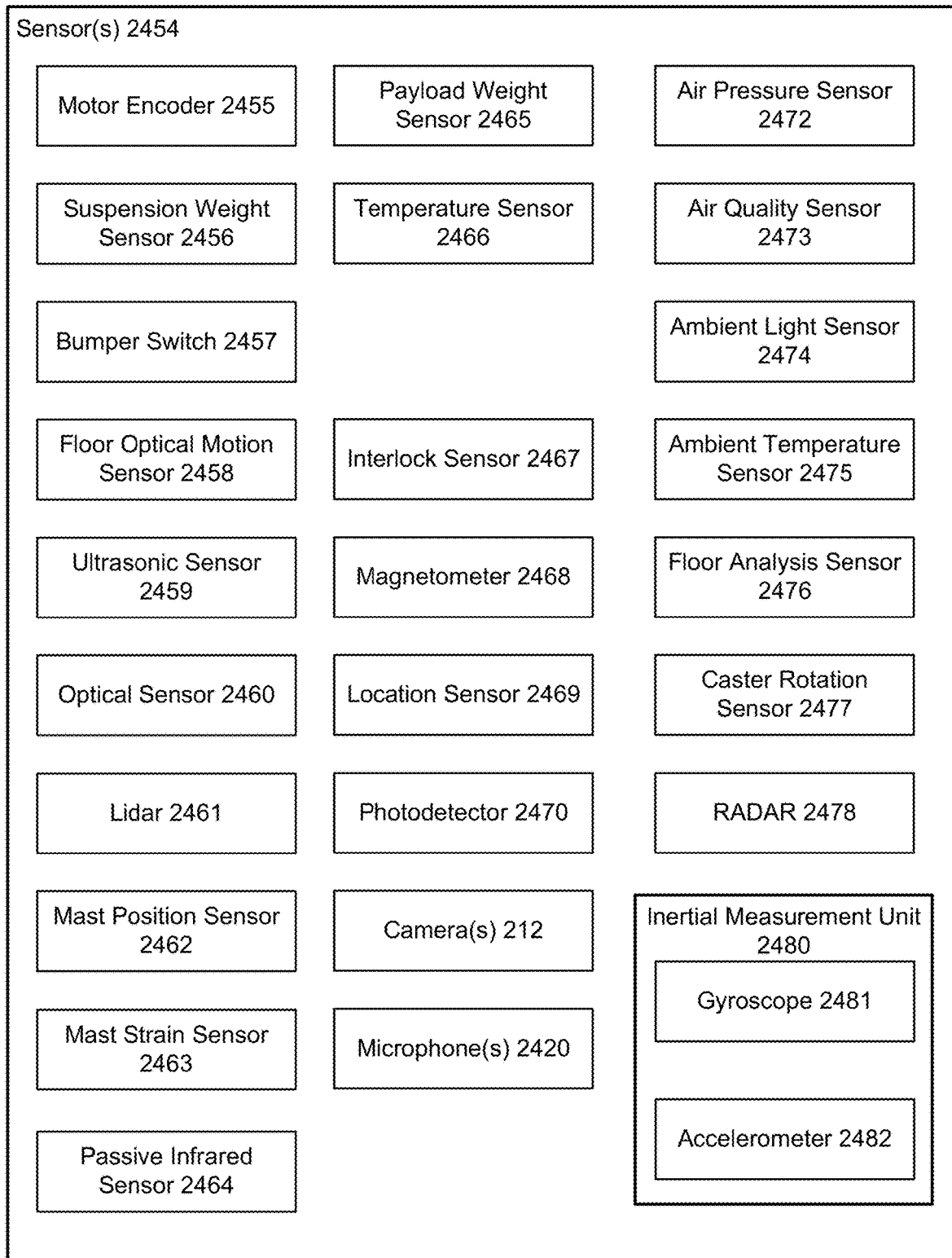
FIG. 24D illustrates sensors that may be included as part of an autonomously motile device according to embodiments of the present disclosure.

FIG. 24B illustrates components that may be stored in a memory of an autonomously motile device according to embodiments of the present disclosure. Although illustrated as included in memory 2406, the components (or portions thereof) may also be included in hardware and/or firmware. FIG. 24C illustrates data that may be stored in a storage of an autonomously motile device according to embodiments of the present disclosure. Although illustrated as stored in storage 2408, the data may be stored in memory 2406 or in another component. FIG. 24D illustrates sensors that may be included as part of an autonomously motile device according to embodiments of the present disclosure.

A position determination component 2432 determines position data 2444 indicative of a position 384 of the feature 386 in the environment 390. In one implementation the position 384 may be expressed as a set of coordinates with respect to the first camera 312a. The position determination component 2432 may use a direct linear transformation triangulation process to determine the position 384 of a feature 386 in the environment 390 based on the difference in apparent location of that feature 386 in two images acquired by two cameras 312 separated by a known distance.

A movement determination module 2433 determines if the feature 386 is stationary or non-stationary. First position data 2444a indicative of a first position 384a of a feature 386 depicted in the first pair of images 382a acquired at time t_1 is determined by the position determination component 2432. Second position data 2444b of the same feature 386 indicative of a second position 384b of the same feature 386 as depicted in the second pair of images 382b acquired at time t_2 is determined as well. Similar determinations made for data relative to first position 384a and second position 384b may also be made for third position 384c, and so forth.

The movement determination module 2433 may use inertial data from the IMU 2480 or other sensors that provides information about how the autonomously motile device 110 moved between time t_1 and time t_2. The inertial data and the first position data 2444a is used to provide a predicted position of the feature 386 at the second time. The predicted position is compared to the second position data 2444b to determine if the feature is stationary or non-stationary. If the predicted position is less than a threshold value from the second position 384b in the second position data 2444b, then the feature 386 is deemed to be stationary.

Features 386 that have been deemed to be stationary may be included in the second feature data. The second feature data may thus exclude non-stationary features 386 and comprise a subset of the first feature data 2448 which comprises stationary features 386.

The second feature data may be used by a simultaneous localization and mapping (SLAM) component 2434. The SLAM component 2434 may use second feature data to determine pose data 2445 that is indicative of a location of the autonomously motile device 110 at a given time based on the appearance of features 386 in pairs of images 382. The SLAM component 2434 may also provide trajectory data indicative of the trajectory 380 that is based on a time series of pose data 2445 from the SLAM component 2434.

Other information, such as depth data from a depth sensor, the position data 2444 associated with the features 386 in the second feature data, and so forth, may be used to determine the presence of obstacles 383 in the environment 390 as represented by an occupancy map as represented by occupancy map data 2449.

The occupancy map data 2449 may comprise data that indicates the location of one or more obstacles 383, such as a table, wall, stairwell, and so forth. In some implementations, the occupancy map data 2449 may comprise a plurality of cells with each cell of the plurality of cells representing a particular area in the environment 390. Data, such as occupancy values, may be stored that indicates whether an area of the environment 390 associated with the cell is unobserved, occupied by an obstacle 383, or is unoccupied. An obstacle 383 may comprise an object or feature that prevents or impairs traversal by the autonomously motile device 110. For example, an obstacle 383 may comprise a wall, stairwell, and so forth.

The occupancy map data 2449 may be manually or automatically determined. For example, during a learning phase the user may take the autonomously motile device 110 on a tour of the environment 390, allowing the mapping component 2430 of the autonomously motile device 110 to determine the occupancy map data 2449. The user may provide input data such as tags designating a particular obstacle type, such as "furniture" or "fragile". In another example, during subsequent operation, the autonomously motile device 110 may generate the occupancy map data 2449 that is indicative of locations and types of obstacles such as chairs, doors, stairwells, and so forth as it moves unattended through the environment 390.

Modules described herein, such as the mapping component 2430, may provide various processing functions such as de-noising, filtering, and so forth. Processing of sensor data 2447, such as image data from a camera 312, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 2447. In still another implementation, functions such as those in the Machine Vision Toolbox (MVTB) available using MAT- LAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 2447 or other data. For example, the ANN may be trained using a supervised learning algorithm such that object identifiers are associated with images of particular objects within training images provided to the ANN. Once trained, the ANN may be provided with the sensor data 2447 and produce output indicative of the object identifier.

A navigation map component 2435 uses the occupancy map data 2449 as input to generate a navigation map as represented by navigation map data 2450. For example, the navigation map component 2435 may produce the navigation map data 2450 by inflating or enlarging the apparent size of obstacles 383 as indicated by the occupancy map data 2449.

An autonomous navigation component 2436 provides the autonomously motile device 110 with the ability to navigate within the environment 390 without real-time human interaction. The autonomous navigation component 2436 may implement, or operate in conjunction with, the mapping component 2430 to determine one or more of the occupancy map data 2449, the navigation map data 2450, or other representations of the environment 390.

The autonomously motile device 110 autonomous navigation component 2436 may generate path plan data 2452 that is indicative of a path through the environment 390 from the current location to a destination location. The autonomously motile device 110 may then begin moving along the path.

While moving along the path, the autonomously motile device 110 may assess the environment 390 and update or change the path as appropriate. For example, if an obstacle 383 appears in the path, the mapping component 2430 may determine the presence of the obstacle 383 as represented in the occupancy map data 2449 and navigation map data 2450. The now updated navigation map data 2450 may then be used to plan an alternative path to the destination location.

The autonomously motile device 110 may utilize one or more task components 2441. The task component 2441 comprises instructions that, when executed, provide one or more functions. The task components 2441 may perform functions such as finding a user, following a user, present output on output devices of the autonomously motile device 110, perform sentry tasks by moving the autonomously motile device 110 through the environment 390 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 2419 to connect to network(s) 199. For example, the network(s) 199 may comprise a wireless local area network, that in turn is connected to a wide area network such as the Internet.

The autonomously motile device 110 may be configured to dock or connect to a docking station. The docking station may also be connected to the network(s) 199. For example, the docking station may be configured to connect to the network(s) 199 (e.g., wireless local area network) such that the docking station and the autonomously motile device 110 may communicate. The docking station may provide external power which the autonomously motile device 110 may use to charge a battery of the autonomously motile device 110.

The autonomously motile device 110 may access one or more servers of the system(s) 120 via the network(s) 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers for further processing. The servers may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomously motile devices 110 may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth.

One or more clocks may provide information indicative of date, time, ticks, and so forth. For example, the processor 2404 may use data from the clock to associate a particular time with an action, sensor data 2447, and so forth.

The autonomously motile device 110 may include one or more hardware processors 2404 (processors) configured to execute one or more stored instructions. The processors 2404 may comprise one or more cores. The processors 2404 may include microcontrollers, systems on a chip, field programmable gate arrays, digital signal processors, graphic processing units, general processing units, and so forth.

The autonomously motile device 110 may include one or more communication component 2440 such as input/output (I/O) interfaces 2402, network interfaces 2419, and so forth. The communication component 2440 enable the autonomously motile device 110, or components thereof, to communicate with other devices or components. The communication component 2440 may include one or more I/O interfaces 2402. The I/O interfaces 2402 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 2402 may couple to one or more I/O devices. The I/O devices may include input devices such as one or more of a sensor 2454, keyboard, mouse, scanner, and so forth. The I/O devices may also include output devices such as one or more of a motor, light, speaker 2412, display 314, projector, printer, and so forth. In some embodiments, the I/O devices may be physically incorporated with the autonomously motile device 110 or may be externally placed.

The I/O interface(s) 2402 may be configured to provide communications between the autonomously motile device 110 and other devices such as other devices 110, docking stations, routers, access points, and so forth, for example through antenna 2410 and/or other component. The I/O interface(s) 2402 may include devices configured to couple to personal area networks (PANs), local area networks (LANs), wireless local area networks (WLANS), wide area networks (WANs), and so forth. For example, the network interfaces 2419 may include devices compatible with Ethernet, Wi-Fi, Bluetooth, Bluetooth Low Energy, ZigBee, and so forth. The autonomously motile device 110 may also include one or more busses 2424 or other internal communications hardware or software that allow for the transfer of data between the various modules and components of the autonomously motile device 110.

As shown in FIG. 24A, the autonomously motile device 110 includes one or more memories 2406. The memory 2406 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 2406 provides storage of computer-readable instructions, data structures, program modules, and other data for the operation of the autonomously motile device 110. A few example functional modules are shown stored in the memory 2406, although the same functionality may alternatively be implemented in hardware, firmware, or as a system on a chip (SoC).

The memory 2406 may include at least one operating system (OS) component 2439. The OS component 2439 is configured to manage hardware resource devices such as the I/O interfaces 2402, the I/O devices, the communication component 2440, and provide various services to applications or modules executing on the processors 2404. The OS component 2439 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Washington.

Also stored in the memory 2406, or elsewhere may be a data store 2408 and one or more of the following modules. These modules may be executed as foreground applications, background tasks, daemons, and so forth. The data store 2408 may use a flat file, database, linked list, tree, executable code, script, or other data structure to store information. In some implementations, the data store 2408 or a portion of the data store 2408 may be distributed across one or more other devices including other devices 110, system(s) 120, network attached storage devices, and so forth.

A communication component 2440 may be configured to establish communication with other devices, such as other devices 110, an external server of the system(s) 120, a docking station, and so forth. The communications may be authenticated, encrypted, and so forth.

Other modules within the memory 2406 may include a safety component 2429, the mapping component 2430, the navigation map component 2435, the autonomous navigation component 2436, the one or more components 2441, a speech processing component 2437, or other components.

The components may access data stored within the data store 2408, including safety tolerance data 2446, sensor data 2447, inflation parameters, other data, and so forth.

The safety component 2429 may access the safety tolerance data 2446 to determine within what tolerances the autonomously motile device 110 may operate safely within the environment 390. For example, the safety component 2429 may be configured to stop the autonomously motile device 110 from moving when an extensible mast of the autonomously motile device 110 is extended. In another example, the safety tolerance data 2446 may specify a minimum sound threshold which, when exceeded, stops all movement of the autonomously motile device 110. Continuing this example, detection of sound such as a human yell would stop the autonomously motile device 110. In another example, the safety component 2429 may access safety tolerance data 2446 that specifies a minimum distance from an object that the autonomously motile device 110 is to maintain. Continuing this example, when a sensor 2454 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 2429 may be implemented as hardware, software, or a combination thereof.

The safety component 2429 may control other factors, such as a maximum speed of the autonomously motile device 110 based on information obtained by the sensors 2454, precision and accuracy of the sensor data 2447, and so forth. For example, detection of an object by an optical sensor may include some error, such as when the distance to an object comprises a weighted average between an object and a background. As a result, the maximum speed permitted by the safety component 2429 may be based on one or more factors such as the weight of the autonomously motile device 110, nature of the floor, distance to the object, and so forth. In the event that the maximum permissible speed differs from the maximum speed permitted by the safety component 2429, the lesser speed may be utilized.

The navigation map component 2435 uses the occupancy map data 2449 as input to generate the navigation map data 2450. The navigation map component 2435 may produce the navigation map data 2450 to inflate or enlarge the obstacles 383 indicated by the occupancy map data 2449. One or more inflation parameters may be used during operation. The inflation parameters provide information such as inflation distance, inflation adjustment values, and so forth. In some implementations the inflation parameters may be based at least in part on the sensor field-of-view, sensor blind spot, physical dimensions of the autonomously motile device 110, and so forth.

The speech processing component 2437 may be used to process utterances of the user. Microphones may acquire audio in the presence of the autonomously motile device 110 and may send raw audio data 2443 to an acoustic front end (AFE). The AFE may transform the raw audio data 2443 (for example, a single-channel, 16-bit audio stream sampled at 16 kHz), captured by the microphone, into audio feature vectors that may ultimately be used for processing by various components, such as a wakeword detection module 2438, speech recognition engine, or other components. The AFE may reduce noise in the raw audio data 2443. The AFE may also perform acoustic echo cancellation (AEC) or other operations to account for output audio data that may be sent to a speaker of the autonomously motile device 110 for output. For example, the autonomously motile device 110 may be playing music or other audio that is being received from network(s) 199 in the form of output audio data. To prevent the output audio interfering with the device's ability to detect and process input audio, the AFE or other component may perform echo cancellation to remove the output audio data from the input raw audio data 2443, or other operations.

The AFE may divide the raw audio data 2443 into frames representing time intervals for which the AFE determines a number of values (i.e., features) representing qualities of the raw audio data 2443, along with a set of those values (i.e., a feature vector or audio feature vector) representing features/qualities of the raw audio data 2443 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 2443, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 2443) may be input into a wakeword detection module 2438 that is configured to detect keywords spoken in the audio. The wakeword detection module 2438 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 2438 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 2438 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 2443 or the audio feature vectors) to one or more server(s) of the system(s) 120 for speech processing. The audio data corresponding to audio obtained by the microphone may be processed locally on one or more of the processors 2404, sent to a server for routing to a recipient device or may be sent to the system(s) 120 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 2435, prior to sending to the server and/or the system(s) 120, and so forth.

The speech processing component 2437 may include or access an ASR module. The ASR module may accept as input raw audio data 2443, audio feature vectors, or other sensor data 2447 and so forth and may produce as output the input data comprising a text string or other data representation. The input data comprising the text string or other data representation may be processed by the navigation map component 2435 to determine the command to be executed. For example, the utterance of the command "robot, come here" may result in input data comprising the text string "come here". The wakeword "robot" may be omitted from the input data.

The autonomous navigation component 2436 provides the autonomously motile device 110 with the ability to navigate within the environment 390 without real-time human interaction. The autonomous navigation component 2436 may implement, or operate in conjunction with, the mapping component 2430 to determine the occupancy map data 2449, the navigation map data 2450, or other representation of the environment 390. In one implementation, the mapping component 2430 may use one or more simultaneous localization and mapping ("SLAM") techniques. The SLAM algorithms may utilize one or more of maps, algorithms, beacons, or other techniques to navigate. The autonomous navigation component 2436 may use the navigation map data 2450 to determine a set of possible paths along which the autonomously motile device 110 may move. One of these may be selected and used to determine path plan data 2452 indicative of a path. For example, a possible path that is the shortest or has the fewest turns may be selected and used to determine the path. The path is then subsequently used to determine a set of commands that drive the motors connected to the wheels. For example, the autonomous navigation component 2436 may determine the current location within the environment 390 and determine path plan data 2452 that describes the path to a destination location such as the docking station.

The autonomous navigation component 2436 may utilize various techniques during processing of sensor data 2447. For example, image data 2442 obtained from cameras 312 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 2404, in response to a command received from one or more network interfaces 2419, as determined from the sensor data 2447, and so forth. For example, the system(s) 120 may send a command that is received using the network interface 2419. This command may direct the autonomously motile device 110 to proceed to find a particular user, follow a particular user, and so forth. The autonomously motile device 110 may then process this command and use the autonomous navigation component 2436 to determine the directions and distances associated with carrying out the command. For example, the command to "come here" may result in a task component 2441 sending a command to the autonomous navigation component 2436 to move the autonomously motile device 240 to a particular location near the user and orient the autonomously motile device 110 in a particular direction.

The autonomously motile device 110 may connect to the network(s) 199 using one or more of the network interfaces 2419. In some implementations, one or more of the modules or other functions described here may execute on the processors 2404 of the autonomously motile device 110, on the system(s) 120, or a combination thereof. For example, the system(s) 120 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 2408 may store the other data as well. For example, localization settings may indicate local preferences such as language, user identifier data may be stored that allows for identification of a particular user, and so forth.

As shown in FIG. 24D, the autonomously motile device 110 may include one or more of the following sensors 2454. The sensors 2454 depicted here are provided by way of illustration and not necessarily as a limitation. It is understood that other sensors 2454 may be included or utilized by the autonomously motile device 110, while some sensors 2454 may be omitted in some configurations.

A motor encoder 2455 provides information indicative of the rotation or linear extension of a motor. The motor may comprise a rotary motor, or a linear actuator. In some implementations, the motor encoder 2455 may comprise a separate assembly such as a photodiode and encoder wheel that is affixed to the motor. In other implementations, the motor encoder 2455 may comprise circuitry configured to drive the motor. For example, the autonomous navigation component 2436 may utilize the data from the motor encoder 2455 to estimate a distance traveled.

A suspension weight sensor 2456 provides information indicative of the weight of the autonomously motile device 110 on the suspension system for one or more of the wheels or the caster. For example, the suspension weight sensor 2456 may comprise a switch, strain gauge, load cell, photodetector, or other sensing element that is used to determine whether weight is applied to a particular wheel, or whether weight has been removed from the wheel. In some implementations, the suspension weight sensor 2456 may provide binary data such as a "1" value indicating that there is a weight applied to the wheel, while a "0" value indicates that there is no weight applied to the wheel. In other implementations, the suspension weight sensor 2456 may provide an indication such as so many kilograms of force or newtons of force. The suspension weight sensor 2456 may be affixed to one or more of the wheels or the caster. In some situations, the safety component 2429 may use data from the suspension weight sensor 2456 to determine whether or not to inhibit operation of one or more of the motors. For example, if the suspension weight sensor 2456 indicates no weight on the suspension, the implication is that the autonomously motile device 110 is no longer resting on its wheels, and thus operation of the motors may be inhibited. In another example, if the suspension weight sensor 2456 indicates weight that exceeds a threshold value, the implication is that something heavy is resting on the autonomously motile device 110 and thus operation of the motors may be inhibited.

One or more bumper switches 2457 provide an indication of physical contact between a bumper or other member that is in mechanical contact with the bumper switch 2457. The safety component 2429 utilizes sensor data 2447 obtained by the bumper switches 2457 to modify the operation of the autonomously motile device 110. For example, if the bumper switch 2457 associated with a front of the autonomously motile device 110 is triggered, the safety component 2429 may drive the autonomously motile device 110 backwards.

A floor optical motion sensor 2458 provides information indicative of motion of the autonomously motile device 110 relative to the floor or other surface underneath the autonomously motile device 110. In one implementation, the floor optical-motion sensors 2458 may comprise a light source such as light-emitting diode (LED), an array of photodiodes, and so forth. In some implementations, the floor optical-motion sensors 2458 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 2458 may provide other information, such as data indicative of a pattern present on the floor, composition of the floor, color of the floor, and so forth. For example, the floor optical-motion sensors 2458 may utilize an optoelectronic sensor that may detect different colors or shades of gray, and this data may be used to generate floor characterization data. The floor characterization data may be used for navigation.

An ultrasonic sensor 2459 utilizes sounds in excess of 20 kHz to determine a distance from the sensor 2454 to an object. The ultrasonic sensor 2459 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 2459 may provide information indicative of a presence of an object, distance to the object, and so forth. Two or more ultrasonic sensors 2459 may be utilized in conjunction with one another to determine a location within a two-dimensional plane of the object.

In some implementations, the ultrasonic sensor 2459 or a portion thereof may be used to provide other functionality. For example, the emitter of the ultrasonic sensor 2459 may be used to transmit data and the detector may be used to receive data transmitted that is ultrasonic sound. In another example, the emitter of an ultrasonic sensor 2459 may be set to a particular frequency and used to generate a particular waveform such as a sawtooth pattern to provide a signal that is audible to an animal, such as a dog or a cat.

An optical sensor 2460 may provide sensor data 2447 indicative of one or more of a presence or absence of an object, a distance to the object, or characteristics of the object. The optical sensor 2460 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 2460 may utilize one or more sensing elements. For example, the optical sensor 2460 may comprise a 4×4 array of light sensing elements. Each individual sensing element may be associated with a field of view that is directed in a different way. For example, the optical sensor 2460 may have four light sensing elements, each associated with a different 10° field-of-view, allowing the sensor to have an overall field-of-view of 40°.

In another implementation, a structured light pattern may be provided by the optical emitter. A portion of the structured light pattern may then be detected on the object using a sensor 2454 such as an image sensor or camera 312. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 2460 may operate as a depth camera, providing a two-dimensional image of a scene, as well as data that indicates a distance to each pixel.

Data from the optical sensors 2460 may be utilized for collision avoidance. For example, the safety component 2429 and the autonomous navigation component 2436 may utilize the sensor data 2447 indicative of the distance to an object in order to prevent a collision with that object.

Multiple optical sensors 2460 may be operated such that their field-of-view overlap at least partially. To minimize or eliminate interference, the optical sensors 2460 may selectively control one or more of the timing, modulation, or frequency of the light emitted. For example, a first optical sensor 2460 may emit light modulated at 30 kHz while a second optical sensor 2460 emits light modulated at 33 kHz.

A lidar 2461 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 2447 may be generated that is indicative of the presence of objects and the relative positions, shapes, and so forth that are visible to the lidar 2461. Data from the lidar 2461 may be used by various modules. For example, the autonomous navigation component 2436 may utilize point cloud data generated by the lidar 2461 for localization of the autonomously motile device 110 within the environment 390.

The autonomously motile device 110 may include a mast. A mast position sensor 2462 provides information indicative of a position of the mast of the autonomously motile device 110. For example, the mast position sensor 2462 may comprise limit switches associated with the mast extension mechanism that indicate whether the mast is at an extended or retracted position. In other implementations, the mast position sensor 2462 may comprise an optical code on at least a portion of the mast that is then interrogated by an optical emitter and a photodetector to determine the distance to which the mast is extended. In another implementation, the mast position sensor 2462 may comprise an encoder wheel that is attached to a mast motor that is used to raise or lower the mast. The mast position sensor 2462 may provide data to the safety component 2429. For example, if the autonomously motile device 110 is preparing to move, data from the mast position sensor 2462 may be checked to determine if the mast is retracted, and if not, the mast may be retracted prior to beginning movement.

A mast strain sensor 2463 provides information indicative of a strain on the mast with respect to the remainder of the autonomously motile device 110. For example, the mast strain sensor 2463 may comprise a strain gauge or load cell that measures a side-load applied to the mast or a weight on the mast or downward pressure on the mast. The safety component 2429 may utilize sensor data 2447 obtained by the mast strain sensor 2463. For example, if the strain applied to the mast exceeds a threshold amount, the safety component 2429 may direct an audible and visible alarm to be presented by the autonomously motile device 110.

The autonomously motile device 110 may include a modular payload bay. A payload weight sensor 2465 provides information indicative of the weight associated with the modular payload bay. The payload weight sensor 2465 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 2465 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 2465 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 2429 may utilize the payload weight sensor 2465 to determine if the modular payload bay has been overloaded. If so, an alert or notification may be issued.

One or more device temperature sensors 2466 may be utilized by the autonomously motile device 110. The device temperature sensors 2466 provide temperature data of one or more components within the autonomously motile device 110. For example, a device temperature sensor 2466 may indicate a temperature of one or more the batteries, one or more motors, and so forth. In the event the temperature exceeds a threshold value, the component associated with that device temperature sensor 2466 may be shut down.

One or more interlock sensors 2467 may provide data to the safety component 2429 or other circuitry that prevents the autonomously motile device 110 from operating in an unsafe condition. For example, the interlock sensors 2467 may comprise switches that indicate whether an access panel is open. The interlock sensors 2467 may be configured to inhibit operation of the autonomously motile device 110 until the interlock switch indicates a safe condition is present.

An inertial measurement unit (IMU) 2480 may include a plurality of gyroscopes 2481 and accelerometers 2482 arranged along different axes. The gyroscope 2481 may provide information indicative of rotation of an object affixed thereto. For example, a gyroscope 2481 may generate sensor data 2447 that is indicative of a change in orientation of the autonomously motile device 110 or a portion thereof.

The accelerometer 2482 provides information indicative of a direction and magnitude of an imposed acceleration. Data such as rate of change, determination of changes in direction, speed, and so forth may be determined using the accelerometer 2482. The accelerometer 2482 may comprise mechanical, optical, micro-electromechanical, or other devices. For example, the gyroscope 2481 in the accelerometer 2482 may comprise a prepackaged solid-state unit.

A magnetometer 2468 may be used to determine an orientation by measuring ambient magnetic fields, such as the terrestrial magnetic field. For example, the magnetometer 2468 may comprise a Hall effect transistor that provides output compass data indicative of a magnetic heading.

The autonomously motile device 110 may include one or more location sensors 2469. The location sensors 2469 may comprise an optical, radio, or other navigational system such as a global positioning system (GPS) receiver. For indoor operation, the location sensors 2469 may comprise indoor position systems, such as using Wi-Fi Positioning Systems (WPS). The location sensors 2469 may provide information indicative of a relative location, such as "living room" or an absolute location such as particular coordinates indicative of latitude and longitude, or displacement with respect to a predefined origin.

A photodetector 2470 provides sensor data 2447 indicative of impinging light. For example, the photodetector 2470 may provide data indicative of a color, intensity, duration, and so forth.

A camera 312 generates sensor data 2447 indicative of one or more images. The camera 312 may be configured to detect light in one or more wavelengths including, but not limited to, terahertz, infrared, visible, ultraviolet, and so forth. For example, an infrared camera 312 may be sensitive to wavelengths between approximately 700 nanometers and 1 millimeter. The camera 312 may comprise charge coupled devices (CCD), complementary metal oxide semiconductor (CMOS) devices, microbolometers, and so forth. The autonomously motile device 110 may use image data acquired by the camera 312 for object recognition, navigation, collision avoidance, user communication, and so forth. For example, a pair of cameras 312 sensitive to infrared light may be mounted on the front of the autonomously motile device 110 to provide binocular stereo vision, with the sensor data 2447 comprising images being sent to the autonomous navigation component 2436. In another example, the camera 312 may comprise a 10 megapixel or greater camera that is used for videoconferencing or for acquiring pictures for the user.

The camera 312 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 312, particularly those associated with navigation or autonomous operation, may utilize a global shutter. In other implementations, the camera(s) 312 providing images for use by the autonomous navigation component 2436 may be acquired using a rolling shutter and subsequently may be processed to mitigate image artifacts.

One or more microphones 2420 may be configured to acquire information indicative of sound present in the environment 390. In some implementations, arrays of microphones 2420 may be used. These arrays may implement beamforming techniques to provide for directionality of gain. The autonomously motile device 110 may use the one or more microphones 2420 to acquire information from acoustic tags, accept voice input from users, determine a direction of an utterance, determine ambient noise levels, for voice communication with another user or system, and so forth.

An air pressure sensor 2472 may provide information indicative of an ambient atmospheric pressure or changes in ambient atmospheric pressure. For example, the air pressure sensor 2472 may provide information indicative of changes in air pressure due to opening and closing of doors, weather events, and so forth.

An air quality sensor 2473 may provide information indicative of one or more attributes of the ambient atmosphere. For example, the air quality sensor 2473 may include one or more chemical sensing elements to detect the presence of carbon monoxide, carbon dioxide, ozone, and so forth. In another example, the air quality sensor 2473 may comprise one or more elements to detect particulate matter in the air, such as the photoelectric detector, ionization chamber, and so forth. In another example, the air quality sensor 2473 may include a hygrometer that provides information indicative of relative humidity.

An ambient light sensor 2474 may comprise one or more photodetectors or other light-sensitive elements that are used to determine one or more of the color, intensity, or duration of ambient lighting around the autonomously motile device 110.

An ambient temperature sensor 2475 provides information indicative of the temperature of the ambient environment 390 proximate to the autonomously motile device 110. In some implementations, an infrared temperature sensor may be utilized to determine the temperature of another object at a distance.

A floor analysis sensor 2476 may include one or more components that are used to generate at least a portion of floor characterization data. In one implementation, the floor analysis sensor 2476 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 2476 may be used by one or more of the safety component 2429, the autonomous navigation component 2436, the task component 2441, and so forth. For example, if the floor analysis sensor 2476 determines that the floor is wet, the safety component 2429 may decrease the speed of the autonomously motile device 110 and generate a notification alerting the user.

The floor analysis sensor 2476 may include other components as well. For example, a coefficient of friction sensor may comprise a probe that comes into contact with the surface and determines the coefficient of friction between the probe and the floor.

A caster rotation sensor 2477 provides data indicative of one or more of a direction of orientation, angular velocity, linear speed of the caster, and so forth. For example, the caster rotation sensor 2477 may comprise an optical encoder and corresponding target that is able to determine that the caster transitioned from an angle of 0° at a first time to 49° at a second time.

The sensors 2454 may include a radar 2478. The radar 2478 may be used to provide information as to a distance, lateral position, and so forth, to an object.

The sensors 2454 may include a passive infrared (PIR) sensor 2464. The PIR 2464 sensor may be used to detect the presence of users, pets, hotspots, and so forth. For example, the PTR sensor 2464 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 390 to provide landmarks for the autonomous navigation component 2436. One or more touch sensors may be utilized to determine contact with a user or other objects.

The autonomously motile device 110 may include one or more output devices. A motor (not shown) may be used to provide linear or rotary motion. A light 358 may be used to emit photons. A speaker 2412 may be used to emit sound. A display 314 may comprise one or more of a liquid crystal display, light emitting diode display, electrophoretic display, cholesteric liquid crystal display, interferometric display, and so forth. The display 314 may be used to present visible information such as graphics, pictures, text, and so forth. In some implementations, the display 314 may comprise a touchscreen that combines a touch sensor and a display 314.

In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 120 as described herein, are illustrative, and may be located as a stand-alone device or may be included, in whole or in part, as a component of a larger device or system.

As illustrated in FIG. 26, multiple devices (110a-110h and 120) may contain components of the system and the devices may be connected over a network(s) 199. The network(s) 199 may include a local or private network or may include a wide network such as the Internet. Devices may be connected to the network(s) 199 through either wired or wireless connections. As illustrated in FIG. 26, a tablet computer 110a, a smart phone 110b, a smart watch 110c, speech-detection device(s) with a display 110d, speech-detection device(s) 110e, input/output (I/O) limited device 110f, a motile device 110g (e.g., device capable of autonomous motion), and/or smart glasses 110h may be connected to the network(s) 199 through a wired and/or wireless connection. For example, the devices 110 may be connected to the network(s) 199 via an Ethernet port, through a wireless service provider (e.g., using a WiFi or cellular network connection), over a wireless local area network (WLAN) (e.g., using WiFi or the like), over a wired connection such as a local area network (LAN), and/or the like. Such devices 110a-110h (and/or other device types not expressly mentioned) may incorporate the components and operations discussed herein.

Other devices are included as network-connected support devices, such as the system(s) 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component, etc. of the system(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving environment data representing a three-dimensional map of an environment;
   moving, by a device, to a first location in the environment;
   determining a configuration of a mechanical component of the device, the mechanical component comprising a camera;
   determining first position data representing the first location and the configuration;
   receiving, from the camera, first image data representing the environment;
   performing object detection using the first image data to determine an object;
   based on determining the object, determining first stored data corresponding to a previous location of the object;
   determining, using the environment data and the first position data, a first direction in which the camera is directed while the device is at the first location;
   determining a first bounding box corresponding to a portion of the first image data representing the object;
   based at least in part on the first position data and the first direction, determining the first bounding box corresponds to a second location;
   determining second position data corresponding to the second location; and
   determining second stored data corresponding to the object being located at the second location.

2. The computer-implemented method of claim 1, further comprising:
   receiving, by the device, first audio data representing speech of a user;
   performing speech processing on the first audio data to generate speech processing data;
   determining that the speech processing data indicates the object; and
   causing an action to be performed based at least in part on the second stored data.

3. The computer-implemented method of claim 2, further comprising:
   receiving, by the device, second image data including a second representation of the environment;
   processing the second image data to determine at least one of a first direction in which a face of the user is oriented or a second direction in which the user is pointing; and
   determining that at least one of the first direction or the second direction is associated with the second stored data,
   wherein determining that the speech processing data indicates the object is based at least in part on determining that at least one of the first direction or the second direction is associated with the second stored data.

4. A computer-implemented method, the method comprising:
   moving, by a device, to a first position in an environment;
   determining first position data representing the first position;
   receiving, from at least a first image capture component of the device, first image data of the environment;

performing object detection using the first image data to determine an object;

based on determining the object, determining first stored data corresponding to a previous position of the object;

determining, using at least the first position data and the first image data, second position data corresponding to a current position of the object;

determining second stored data corresponding to the current position of the object, receiving, by the device after determining the second stored data, first audio data representing speech of a first user;

performing speech processing on the first audio data to generate speech processing data;

determining that the speech processing data indicates the object; and causing an action to be performed based at least in part on the second stored data.

5. The computer-implemented method of claim 4, wherein the first position data comprises data representing a configuration of a mechanical component of the device, the mechanical component including the first image capture component.

6. The computer-implemented method of claim 4, further comprising including time data with the second stored data.

7. The computer-implemented method of claim 4, further comprising:

performing user recognition using one or more of second image data or second audio data to determine a second user who interacted with the object; and including user data with the second stored data.

8. The computer-implemented method of claim 4, further comprising:

receiving, by the device, second image data including a second representation of the environment;

processing the second image data to determine at least one of a first direction in which a face of the first user is oriented or a second direction in which the first user is pointing; and determining that at least one of the first direction or the second direction is associated with the second stored data, wherein determining that the speech processing data indicates the object is based at least in part on determining that at least one of the first direction or the second direction is associated with the second stored data.

9. The computer-implemented method of claim 4, wherein causing the action to be performed further comprises:

determining, using the speech processing data, output data indicating the previous position of the object;

performing text-to-speech (TTS) processing using the output data to determine output audio data; and causing the device to playback the output audio data.

10. The computer-implemented method of claim 4, further comprising:

receiving environment data representing a three-dimensional map of the environment;

determining, using the environment data, a first direction in which the first image capture component is directed while the device is at the first position;

determining a first bounding box corresponding to a portion of the first image data representing the object; and based at least in part on the position data and the first direction, determining that the first bounding box corresponds to the second position data.

11. The computer-implemented method of claim 4, further comprising:

determining a first bounding box corresponding to a portion of the first image data representing the object, wherein the second stored data includes the second position data and data corresponding to the first bounding box.

12. The computer-implemented method of claim 4, wherein causing the action to be performed further comprises:

determining, using the speech processing data and the second stored data, output data indicating the current position of the object;

performing text-to-speech (TTS) processing using the output data to determine output audio data; and causing the device to playback the output audio data.

13. The computer-implemented method of claim 4, wherein causing the action to be performed further comprises:

determining, using the speech processing data and the second stored data, a first location associated with the current position of the object; and moving, by the device, to the first location.

14. A system comprising:

at least one processor; and memory including instructions operable to be executed by the at least one processor to cause the system to:

move a device to a first position in an environment;

determine first position data representing the first position, wherein the first position data comprises data representing a configuration of a mechanical component of the device, the mechanical component including a first image capture component;

receive, from at least the first image capture component of the device, first image data of the environment;

perform object detection using the first image data to determine an object;

based on determining the object, determine first stored data corresponding to a previous position of the object;

determine, using at least the first position data and the first image data, second position data corresponding to a current position of the object; and determine second stored data corresponding to the current position of the object.

15. The system of claim 14, wherein the memory further comprises instructions that, when executed by the at least one processor, further cause the system to include time data with the second stored data.

16. The system of claim 14, wherein the memory further comprises instructions that, when executed by the at least one processor, further cause the system to:

perform user recognition using one or more of second image data or audio data to determine a user who interacted with the object; and include user data with the second stored data.

17. The system of claim 14, wherein the memory further comprises instructions that, when executed by the at least one processor, further cause the system to:

receive, by the device after determining the second stored data, first audio data representing speech of a user;

perform speech processing on the first audio data to generate speech processing data;

determine that the speech processing data indicates the object; and cause an action to be performed based at least in part on the second stored data.

18. The system of claim 17, wherein the memory further comprises instructions that, when executed by the at least one processor, further cause the system to:
- receive, by the device, second image data including a second representation of the environment;
- process the second image data to determine at least one of a first direction in which a face of the user is oriented or a second direction in which the user is pointing; and
- determine that at least one of the first direction or the second direction is associated with the second stored data,
- wherein the instructions that cause the system to determine that the speech processing data indicates the object are based at least in part on a determination that at least one of the first direction or the second direction is associated with the second stored data.

19. The system of claim 17, wherein the memory further comprises instructions that, when executed by the at least one processor, further cause the system to:
- determine, using the speech processing data, output data indicating the previous position of the object;
- perform text-to-speech (TTS) processing using the output data to determine output audio data; and
- cause the device to playback the output audio data.

20. The system of claim 14, wherein the memory further comprises instructions that, when executed by the at least one processor, further cause the system to:
- receive environment data representing a three-dimensional map of the environment;
- determine, using the environment data, a first direction in which the first image capture component is directed while the device is at the first position;
- determine a first bounding box corresponding to a portion of the first image data representing the object; and
- based at least in part on the first position data and the first direction, determine that the first bounding box corresponds to the second position data.

21. The system of claim 14, wherein:
- the first image capture component is attached to a distal end of the mechanical component,
- the data representing the configuration of the mechanical component indicates at least one of a first angle and a first distance,
- the first angle represents a direction in which the first image capture component is directed, and
- the first distance indicates an amount that the first image capture component is extended from the device.

* * * * *